(12) United States Patent
Remmler

(10) Patent No.: US 9,296,381 B2
(45) Date of Patent: Mar. 29, 2016

(54) SHIFTING ARRANGEMENT WITH A CLUTCH AND SYNCHRONIZING DEVICE FOR A TRANSMISSION

(71) Applicant: GM GLOBAL TECHNOLOGY OPERATIONS LLC, Detroit, MI (US)

(72) Inventor: Mathias Remmler, Mauchenheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 14/448,275

(22) Filed: Jul. 31, 2014

(65) Prior Publication Data

US 2015/0033887 A1 Feb. 5, 2015

(30) Foreign Application Priority Data

Aug. 1, 2013 (DE) .......................... 10 2013 012 856
Aug. 1, 2013 (DE) ..................... 20 2013 006 944 U
Aug. 1, 2013 (DE) ..................... 20 2013 007 983 U
Aug. 1, 2013 (DE) ..................... 20 2013 007 987 U

(51) Int. Cl.
*F16H 59/02* (2006.01)
*F16H 3/08* (2006.01)
(Continued)

(52) U.S. Cl.
CPC ............... *B60W 10/11* (2013.01); *B60W 10/02* (2013.01); *F16D 28/00* (2013.01); *F16H 63/304* (2013.01);
(Continued)

(58) Field of Classification Search
CPC . F16H 3/006; F16H 2003/0931; F16H 3/091; F16H 47/02

USPC ............................................ 74/330, 331, 335
See application file for complete search history.

(56) References Cited

U.S. PATENT DOCUMENTS

| 4,138,006 A | 2/1979 | Benson |
|---|---|---|
| 4,485,687 A | 12/1984 | Burke et al. |

(Continued)

FOREIGN PATENT DOCUMENTS

| DE | 10160026 A1 | 6/2003 |
|---|---|---|
| DE | 102009054879 A1 | 6/2011 |

(Continued)

OTHER PUBLICATIONS

European Patent Office, European Search Report for European Application No. 14002257.5, dated Jan. 15, 2015.

(Continued)

*Primary Examiner* — Ha D Ho
(74) *Attorney, Agent, or Firm* — Ingrassia Fisher & Lorenz PC

(57) ABSTRACT

A shifting arrangement for a transmission includes a shifting sleeve, a friction clutch and an actuating element. The shifting sleeve is rotatable between a first position, wherein a first free gear is rotatable relative to a shaft, and a second position, wherein the first free gear is rotatably fixed to the shaft. The friction clutch assembly is moveable between a first position, wherein two parts are rotatable relative to one another, and a second position, wherein the two parts are frictionally coupled. The actuating element is moveable between neutral, intermediate and shifting positions. In the neutral position, the shifting sleeve and the friction clutch assembly are in their first positions. In the intermediate position, the shifting sleeve is in its second position and the friction clutch assembly in its first position. In the shifting position, the shifting sleeve and the friction clutch assembly are in their second positions.

20 Claims, 30 Drawing Sheets

(51) Int. Cl.
*B60W 10/11* (2012.01)
*B60W 10/02* (2006.01)
*F16H 63/30* (2006.01)
*F16D 28/00* (2006.01)
*F16H 3/093* (2006.01)

(52) U.S. Cl.
CPC ............ *F16H 63/3043* (2013.01); *F16H 3/093* (2013.01); *F16H 2063/3056* (2013.01); *Y10T 74/19251* (2015.01)

(56) References Cited

U.S. PATENT DOCUMENTS

| | | | |
|---|---|---|---|
| 4,807,732 A | 2/1989 | Lehle | |
| 6,802,794 B2 * | 10/2004 | Showalter | 475/269 |
| 6,905,436 B2 * | 6/2005 | Mueller et al. | 475/295 |
| 7,694,598 B2 * | 4/2010 | Kriebernegg et al. | 74/337.5 |
| 8,567,276 B2 | 10/2013 | Saitoh | |
| 8,689,656 B2 | 4/2014 | Richter et al. | |
| 2002/0142877 A1 | 10/2002 | Williams et al. | |
| 2002/0144562 A1 | 10/2002 | Forsyth | |

FOREIGN PATENT DOCUMENTS

| | | |
|---|---|---|
| DE | 102010012134 A1 | 9/2011 |
| DE | 102010039447 A1 | 2/2012 |
| DE | 102010046961 A1 | 3/2012 |
| DE | 102011107245 A1 | 3/2012 |
| DE | 102011007264 A1 | 10/2012 |
| DE | 102012003482 A1 | 8/2013 |
| EP | 0206734 A1 | 12/1986 |
| EP | 1533169 A2 | 5/2005 |
| EP | 1995106 A1 | 11/2008 |

OTHER PUBLICATIONS

German Patent Office, German Search Report for German Application No. 102013012856.0, dated Mar. 11, 2014.

* cited by examiner

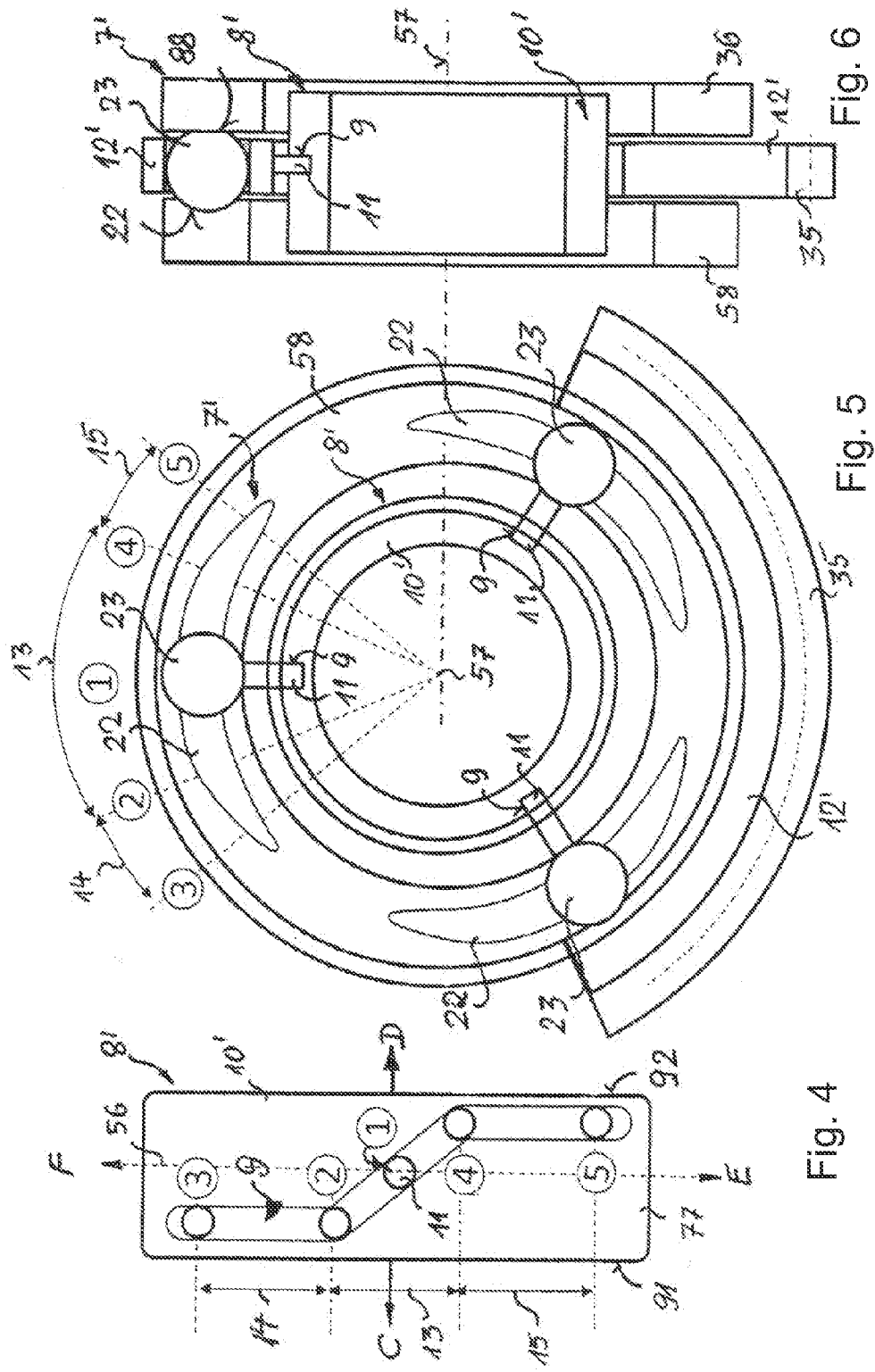

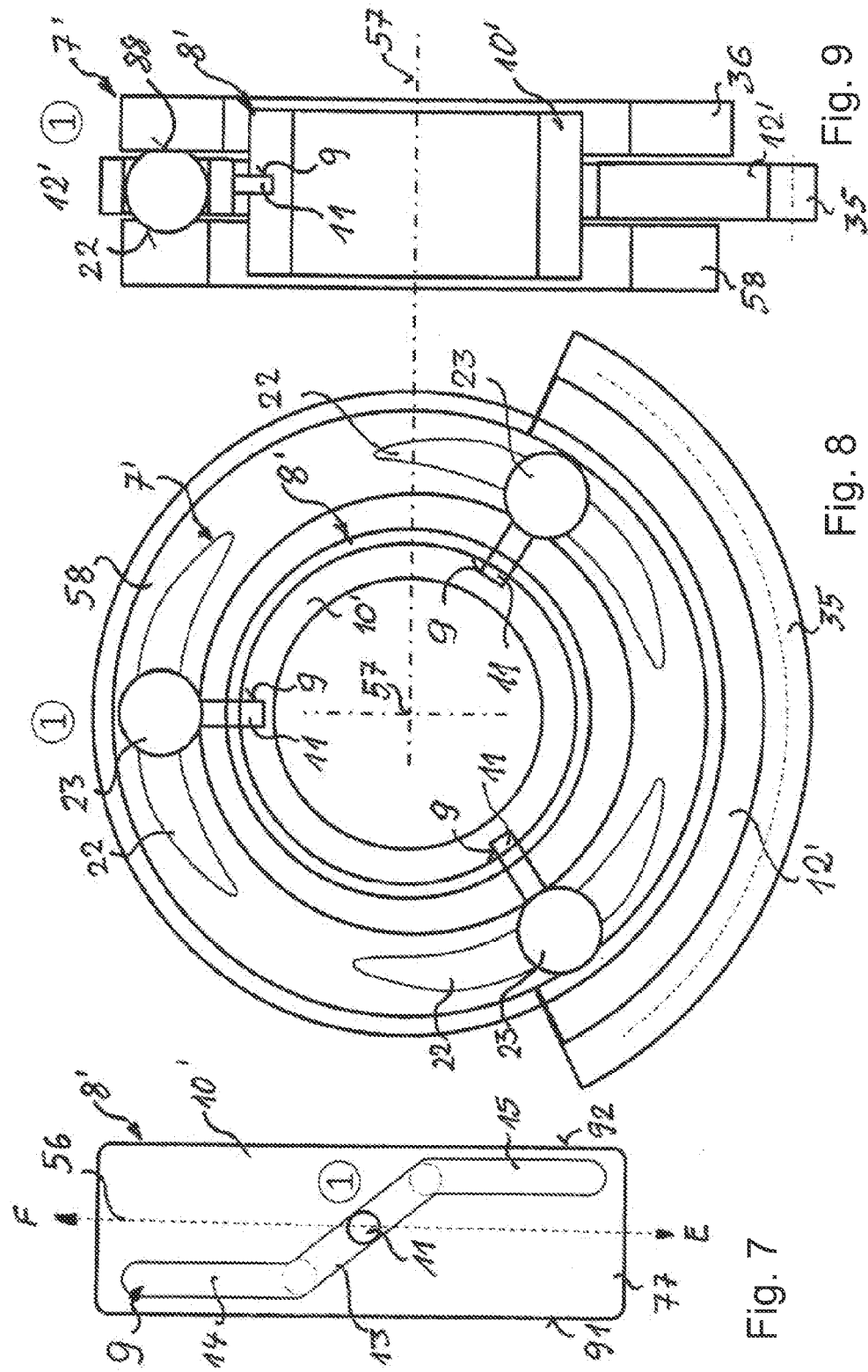

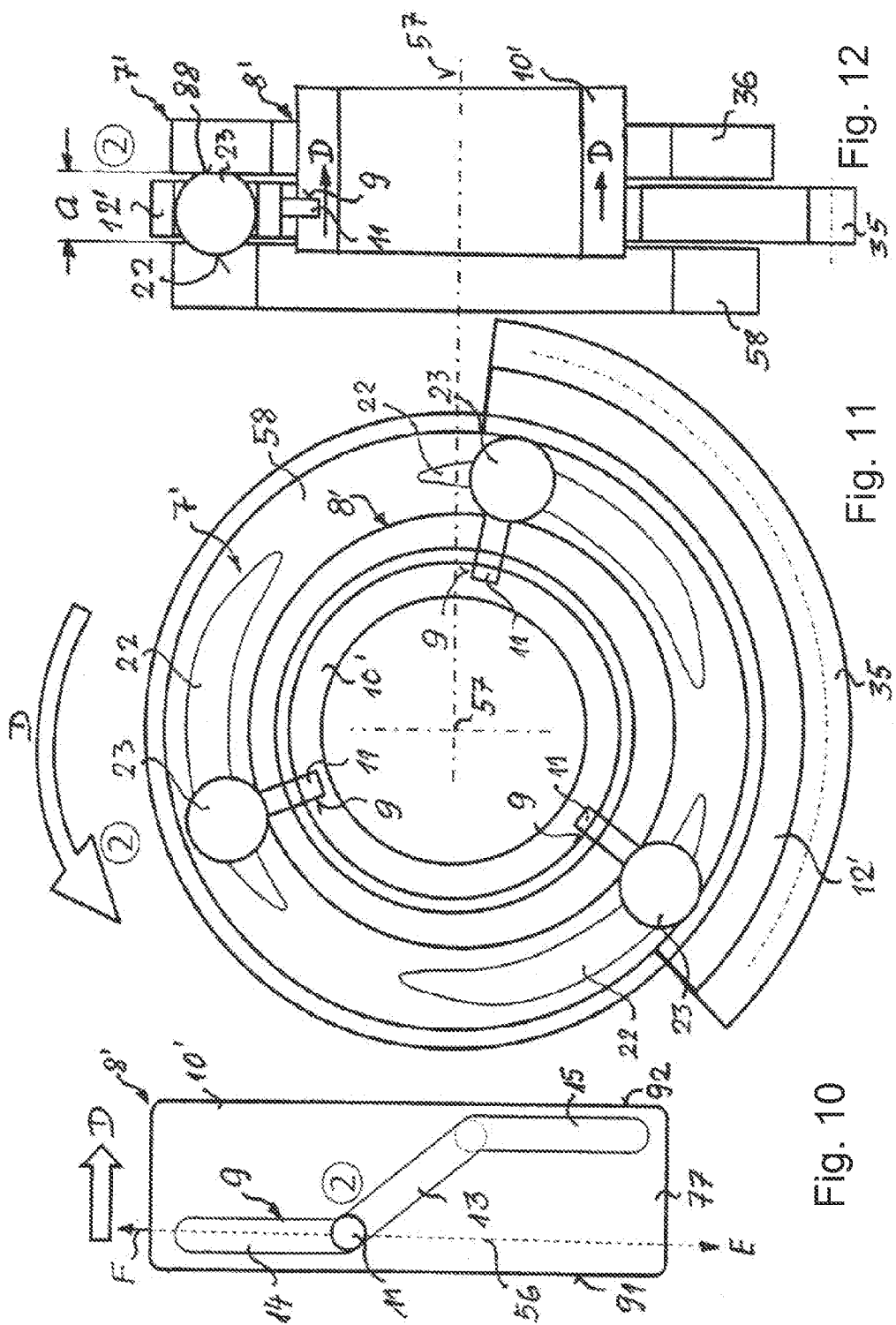

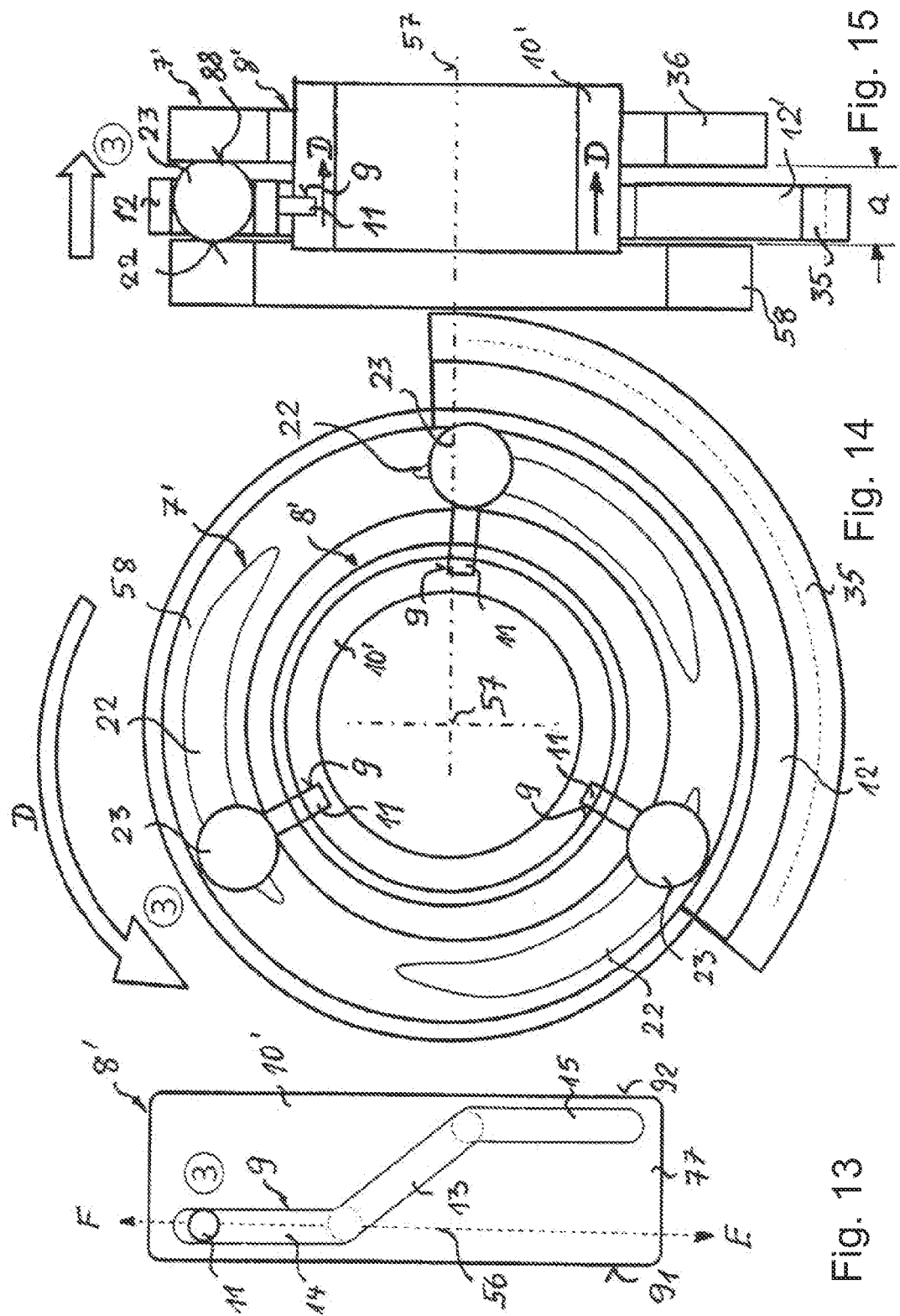

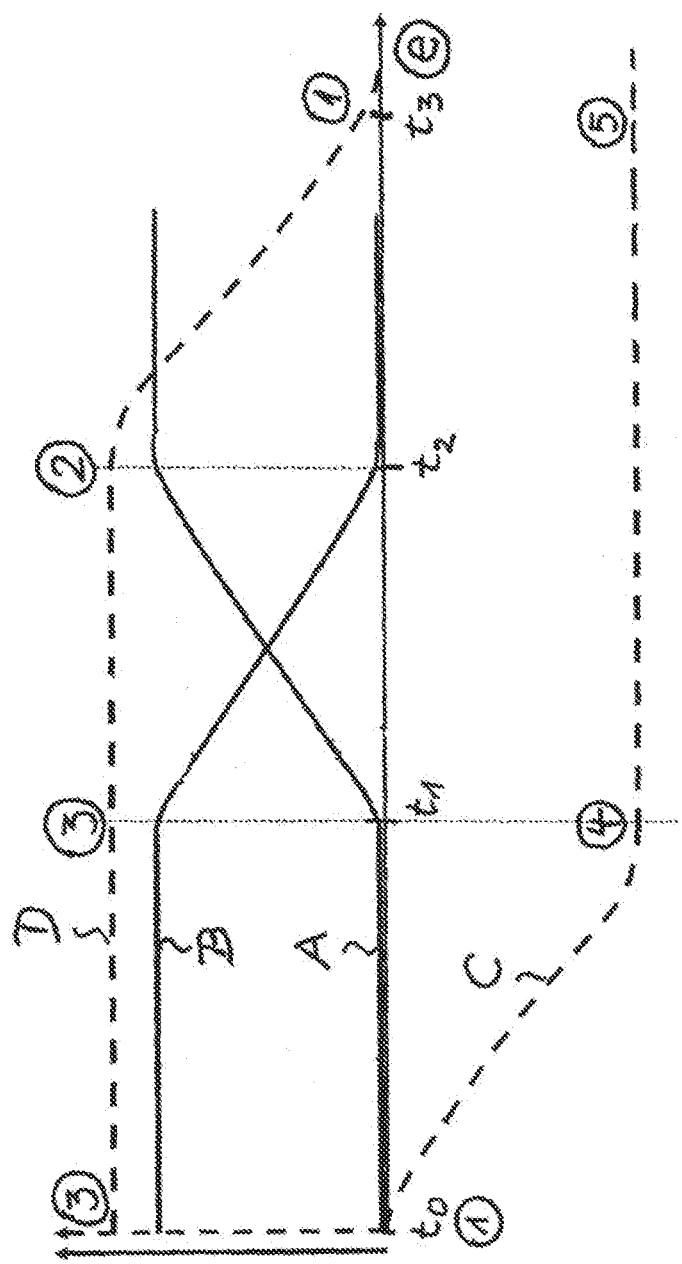

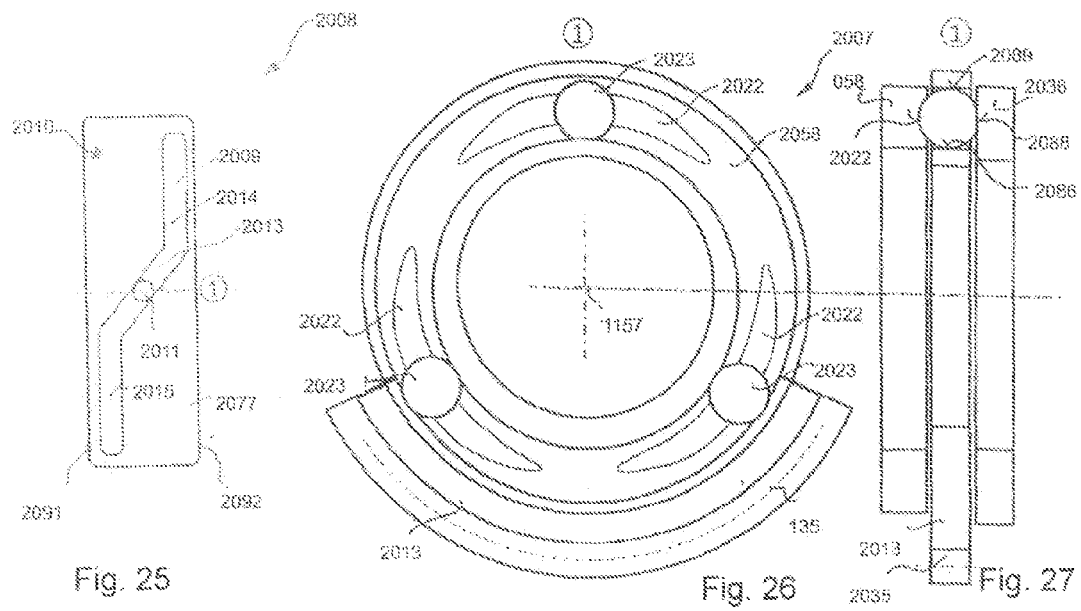

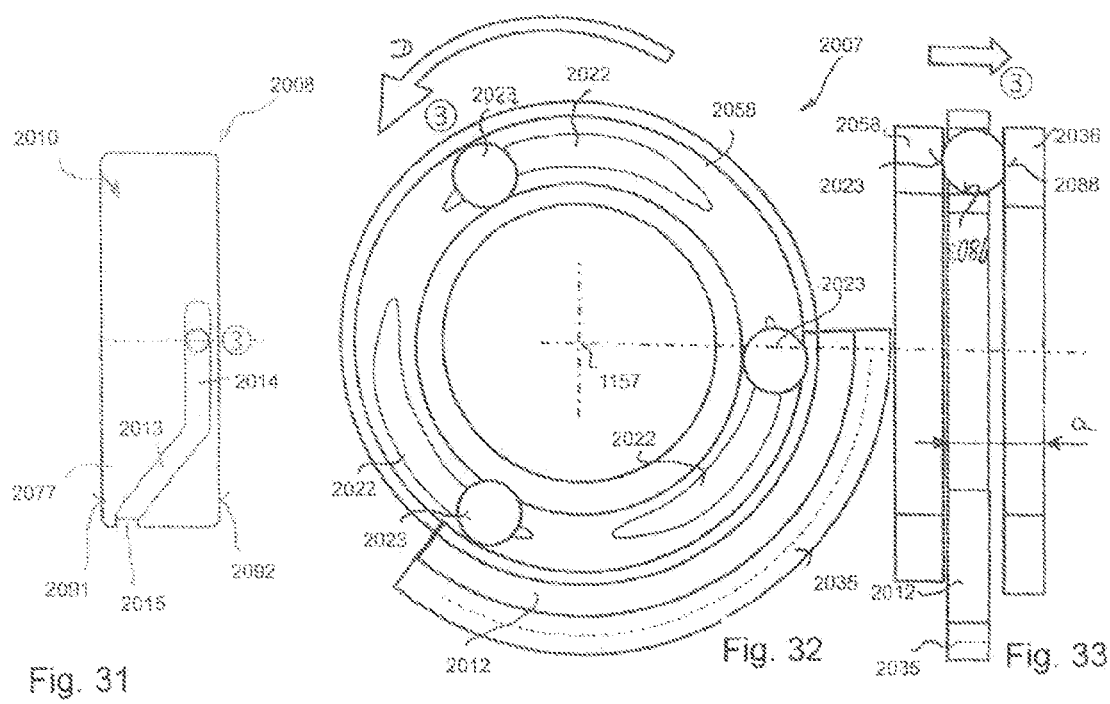

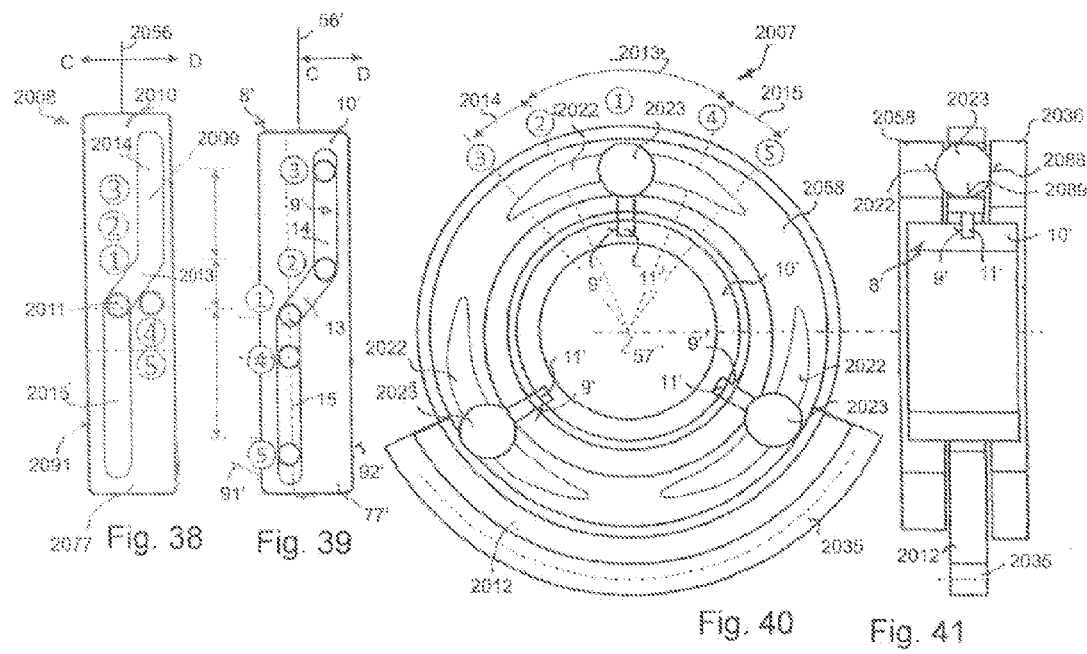

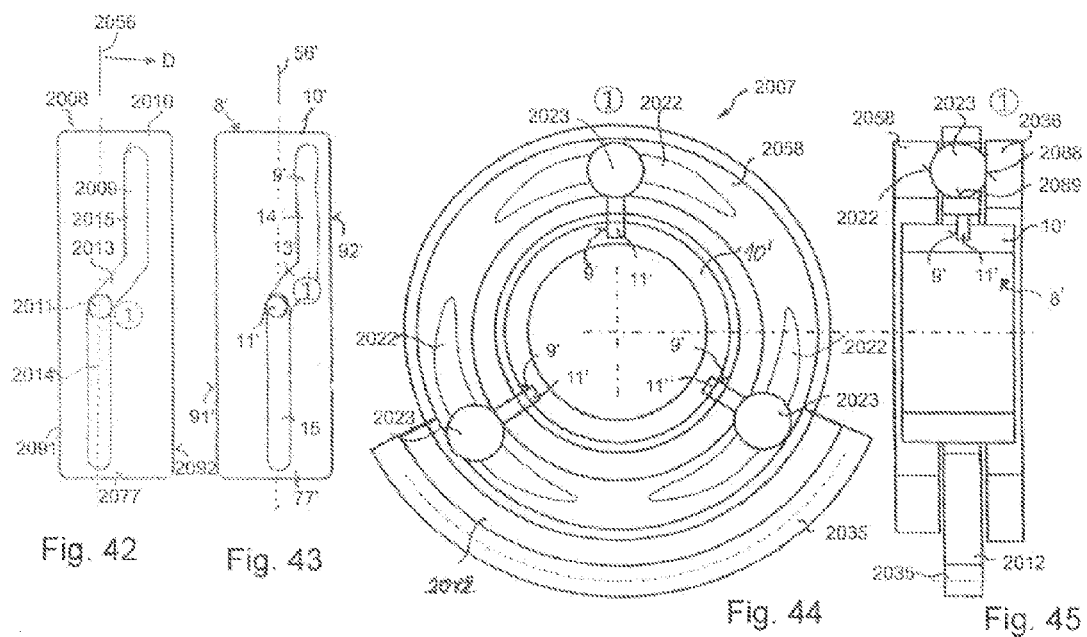

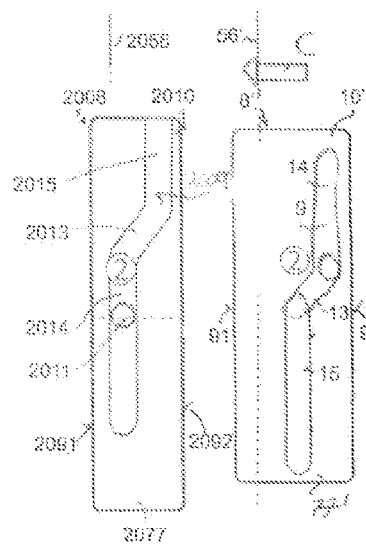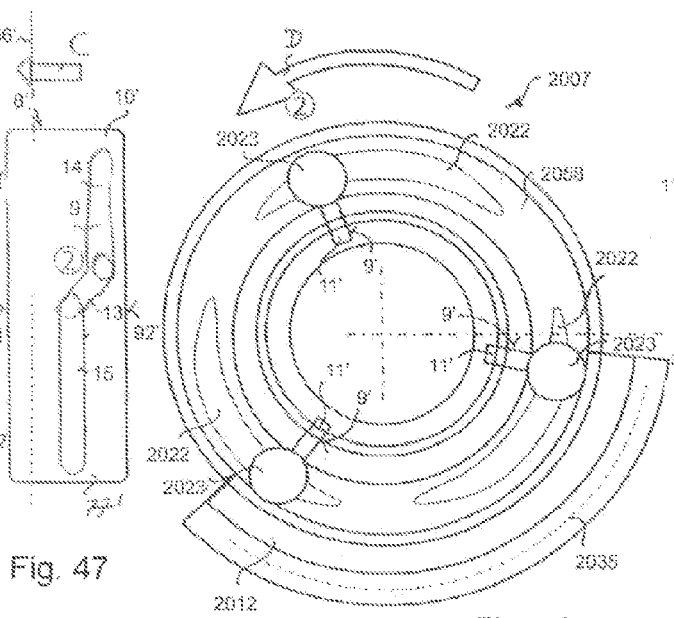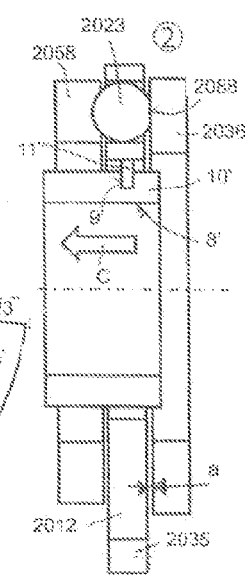
Fig. 46  Fig. 47  Fig. 48  Fig. 49

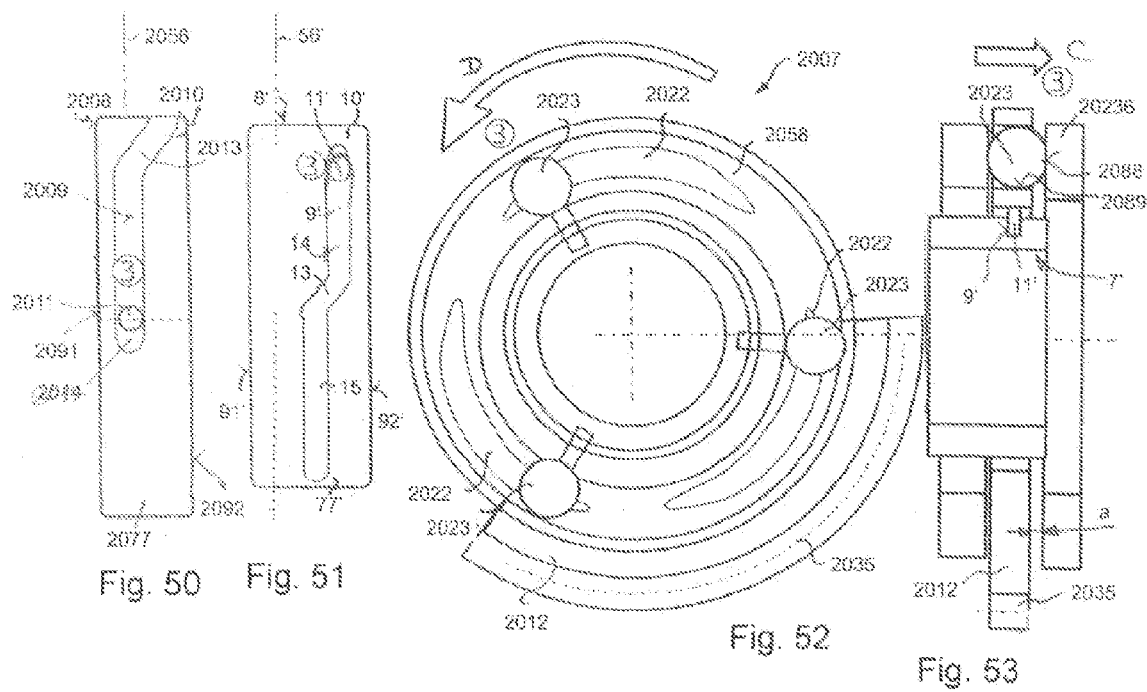

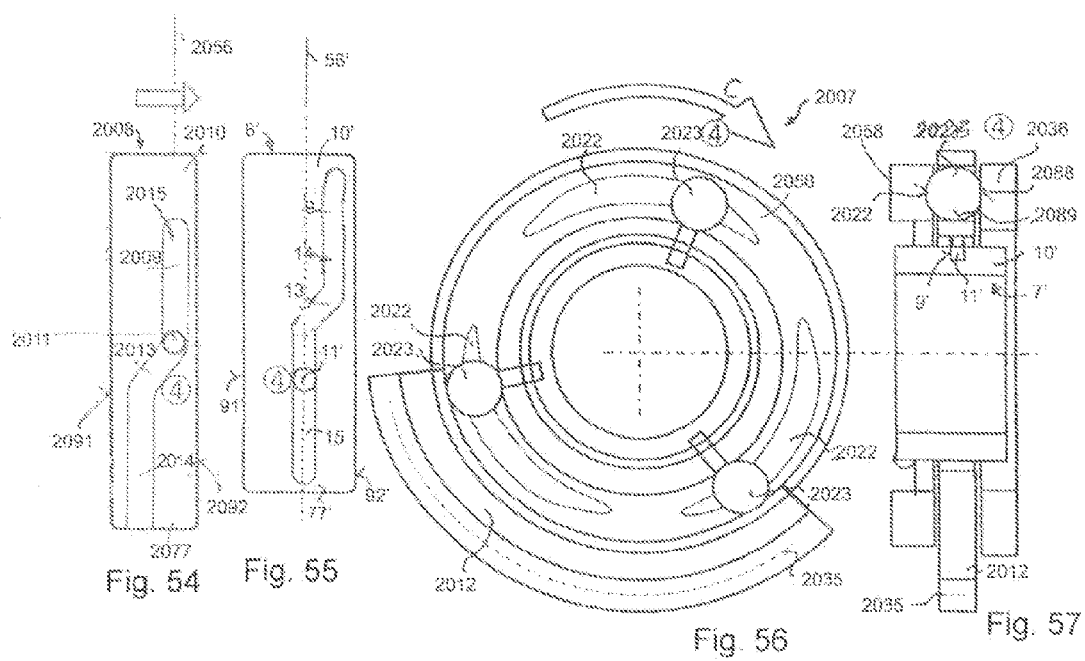

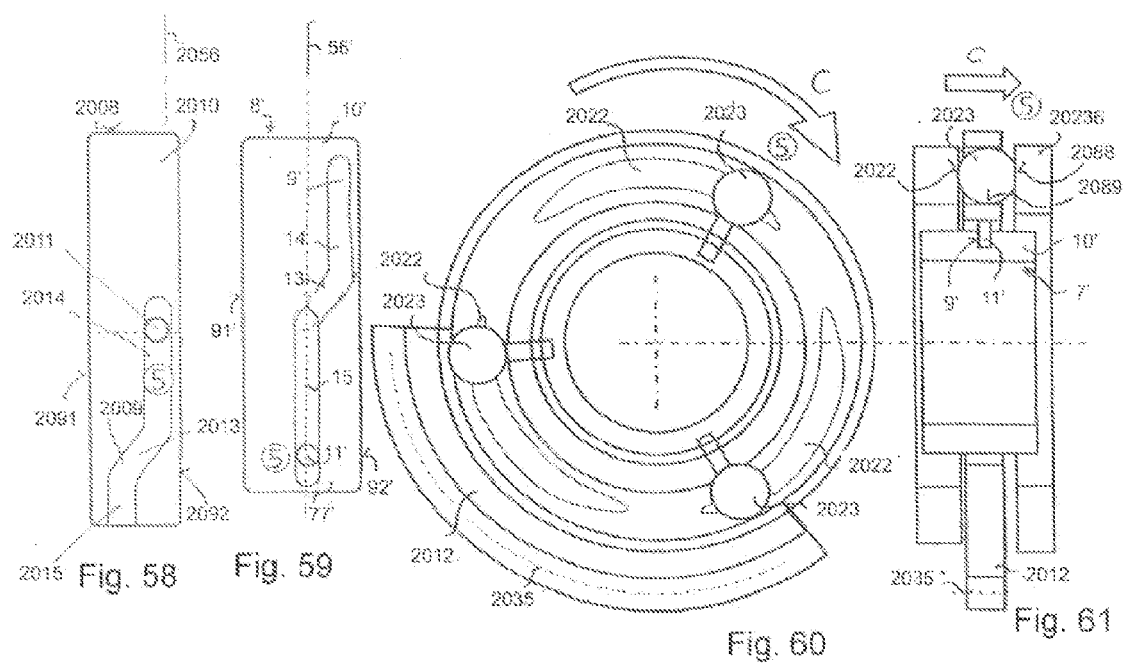

SHIFTING ARRANGEMENT WITH A CLUTCH AND SYNCHRONIZING DEVICE FOR A TRANSMISSION

CROSS REFERENCE TO RELATED APPLICATION

This application claims priority to German Patent Application No. 102013012856.0 filed Aug. 1, 2013, to German Patent Application No. 202013006944.9 filed Aug. 1, 2013, to German Patent Application No. 202013007983.5 filed Aug. 1, 2013 and to German Patent Application No. 202013007987.8 filed Aug. 1, 2013, disclosures of which are incorporated herein by reference in their entirety.

TECHNICAL FIELD

The technical field relates to a manual transmission for a motor vehicle.

BACKGROUND

Such manual transmissions are provided for example in the drive train of a motor vehicle in order to transmit the drive power of a drive unit, for example an electric motor or an internal combustion engine to a driven road wheel.

SUMMARY

The present disclosure provides an improved and simplified shifting arrangement for a manual transmission, a manual transmission, a drive train for a motor vehicle and a motor vehicle equipped therewith. According to a configuration of the present disclosure, the shifting arrangement for a shiftable transmission including a shifting sleeve movable between a first position, in which a first free gear of the shifting arrangement is rotatable relative to a shaft, and a second position, in which the first free gear is coupled to the shaft in a rotationally fixed manner; a friction clutch assembly movable between a first position, in which first and second parts of the friction clutch assembly are rotatable relative to one another, and a second position, in which the first and second parts are connected in a frictionally joined manner; and an actuating element movable in a degree of freedom between a neutral position and a first shifting position via an intermediate position. In the neutral position the shifting sleeve and the friction clutch assembly are each in their first position. In the intermediate position the shifting sleeve is in its second position and the friction clutch assembly in its first position. In the first shifting position the shifting sleeve and the friction clutch assembly are each in their second position.

Thus, the stages of engaging a gear can be gradually passed through in a continuous movement to be driven with simple means. According to a first configuration, the above mentioned shaft is an input shaft of the shifting arrangement, the first part of the friction clutch assembly is connected to the input shaft in a rotationally fixed manner, and the second part of the friction clutch assembly is connected to the shifting sleeve in a rotationally fixed manner.

According to a second configuration, the shaft is an auxiliary shaft, and the first free gear meshes with a gear of a second shaft, which via the friction clutch assembly is releasably connectable to an input shaft in a frictionally joined manner. This second shaft can in particular be a hollow shaft, which concentrically extends about the input shaft.

Both configurations can include a shifting sleeve axial actuating unit, a gear shift drum as well as a shifting pin which is guided in a control slot of the gear shift drum. When the control slot extends helically about the gear shift drum at least in one portion, a rotation of gear shift drum and shifting pin relative to one another causes an axial movement, which can be utilized for driving a movement of the shifting sleeve.

In the simplest case, the shifting pin can be connected to the actuating element in a fixed manner. This is particularly practical when the actuating element is rotatable about the same shaft, which also carries the shifting sleeve. A construction, in which the shifting sleeve axial actuating unit and the actuating element are engaged with one another via a toothing is particularly practical when the actuating element is rotatable about an axis other than that of the shifting sleeve.

The gear shift drum should be axially fixed relative to the shifting sleeve in order to transmit axial adjusting movements to the shifting sleeve. At the same time, it should be rotatable in circumferential direction relative to the shifting sleeve so as not having to follow a rotation of the shaft and the shifting sleeve carried by said shaft during the operation. When the gear shift drum is rotationally fixed on the housing side and axially movable at the same time, it can be driven to an axial movement through a rotation of the shifting pin about the axis of the gear shift drum.

In a further development of the above shifting arrangement, the actuating element is movable furthermore out of the neutral position into a second shifting position, and the shifting sleeve is axially movable between the first position and a third position, wherein in the third position a gear is connected to the shifting sleeve in a positively joined manner. Thus, depending on the direction in which the actuating element is moved out of the neutral position, two different gears can be engaged.

In this further development, the first position of the shifting sleeve can correspond to an engagement of the shifting pin in a central region of the helical portion of the control slot so that, depending on the direction in which the actuating element is deflected out of the neutral position, the shifting sleeve is axially repositioned in opposite directions.

According to an alternative further development, the actuating element can be likewise movable out of the neutral position into a second shifting position, however a second shifting sleeve is coupled to the actuating element here in order to assume a first position in which a second free gear is rotatable relative to a shaft when the actuating element is in the neutral position and to assume a second position in which it connects the second free gear to the shaft in a rotationally fixed manner when it is in the second shifting position. In this way, too, different gears can be engaged depending on the direction of the deflection.

In this further development, each shifting sleeve can be assigned a separate shifting sleeve axial actuating unit and the first position of the shifting sleeve can, in the shifting sleeve axial actuating units, in each case correspond to an engagement of the shifting pin on the border between a helical portion and a portion of the control slot extending in circumferential direction. When during a rotation the shifting pin engages in the portion extending in circumferential direction, no axial movement of shifting pin and gear shift drum relative to one another takes place. Thus, with suitable arrangement of the shifting sleeve axial actuating units it can be achieved that upon a rotation of the actuating element between the neutral position and the first shifting position only one of the shifting sleeve axial actuating units is actuated in each case and that upon a rotation between the neutral position and the second shifting position only the other shifting sleeve axial actuating unit is actuated.

The shafts of the first and second free gear can be distinct from one another. In particular the shaft, which carries the second free gear, can furthermore carry a gear which meshes with the first free gear, and/or the shaft, which carries the first free gear, can furthermore carry a gear which meshes with the second free gear.

The helical portion of the control slot in each case is followed by clutch actuating portions which run in circumferential direction of the gear shift drum, so that, when the shifting pin is moved through these portions, the shifting sleeve and the shifting pin are not axially shifted relative to one another. Thus, the shifting sleeve axial actuating unit can be kept at rest while the friction clutch assembly changes from the first into the second position.

The friction assembly can include a disc clutch, the one part of which is an assembly of first discs accommodated in a first disc carrier and the other part of which is an assembly of second discs accommodated in a second disc carrier which is in connection with the shifting sleeve. The disc carrier of the other part can be an inner disc carrier engaging in the clutch pot. Here, the designations first and second disc carrier are preferred in the following so that the description also includes their kinematic reversal from "inside" and "outside."

The degree of freedom of the actuating element is preferably a rotation degree of freedom. In order to convert the rotation of the actuating element into an axial movement for moving the friction clutch assembly between the first and the second position, the clutch axial actuating unit can include at least one—preferably spherical—actuating body, which together with the actuating element is rotatable about the axis of the latter and through contact with an actuating contour coupled to the rotation is axially movable.

In order to avoid canting of the clutch axial actuating unit, at least two, preferably three actuating bodies should be provided and preferably be distributed round about the axis of the actuating element. Frequently, an axial bearing is provided here between the actuating element and the friction clutch assembly. A bearing ring of the rolling bearing can serve as pressure plate for distributing a force transmitted to the actuating bodies in a concentrated manner over the entire circumference of the clutch assembly.

Here, the actuating contour in a first embodiment is provided in a running surface of the axial bearing located opposite the pressure plate and in this case faces the respective actuating body, wherein the actuating body is then in each case rotatably mounted on an axle, wherein the axle in turn is connected to the actuating element in a fixed manner. In another embodiment, the actuating contour is provided in or fastened to the transmission housing, wherein the actuating body is then arranged shiftable axially in the actuating element.

Here, the shifting arrangement has at least two actuating bodies. In an embodiment, three actuating bodies for example are provided. Multiple actuating bodies can also be provided, which can then be arranged evenly spaced with respect to one another. Advantageously, adjacent actuating contours are then provided which act on the actuating bodies, which in circumferential direction are spaced from one another for example by 120 degrees. As actuating bodies or rolling bodies, both balls and rollers are conceivable.

If the actuating bodies are seated in the actuating element axially fixed, the contour or the actuating contour or the ramp or groove then has to be provided on a side of the axial bearing located opposite the pressure plate and in the process faces the respective actuating body, wherein the actuating contour or the ramp as such is rotatably fixed and axially freely movable. Conversely, if the actuating contour is provided on a side of the actuating element located opposite the pressure plate, for example on the transmission housing, the actuating bodies in the actuating element have to be designed axially movable so that the stroke movement of the actuating bodies can act on the pressure plate. If the actuating contour is seated in the running surface of the axial bearing located opposite the pressure plate, this actuating contour should then be embodied axially movable, but rotatably fixed relative to the transmission housing.

The actuating contour furthermore is designed so that it has an axial extension in circumferential direction so that as a consequence of the rolling of the actuating body in circumferential direction the actuating bodies are subjected to axial shifting. Thus, the axial extension of actuating contour and actuating body together is variable through the movement of the actuating bodies in circumferential direction. Here, the actuating contour, seen in circumferential direction, can be designed symmetrically to an axis which corresponds to a neutral position of the clutch actuating unit. Independently of a symmetry of the actuating contour it has to be ensured in each case that the actuating contour in both circumferential directions extends from a middle position or neutral position in the same direction. The actuating contour can be formed both in the region of the actuating element as well as in the region of the pressure plate.

In a particular embodiment, the first free gear and the second free gear are arranged coaxially or concentrically as hollow shaft arrangement to one another, wherein in the latter case between the first free gear and the second free gear a mounting is provided. Such an embodiment can be easily produced.

The shifting sleeve to this end can have internal splines and a portion of the inner disc carrier of the disc clutch corresponding thereto can have external splines, wherein the internal splines are in engagement with the external splines. This makes possible a torque transmission to the shifting sleeve with axial movability at the same time.

As drive for the actuating element, the shifting arrangement can include in particular a hydraulic or electric control element.

The application also includes a shiftable transmission which includes at least one shifting arrangement as described above. The shiftable transmission can include a second free gear which is arranged on a hollow shaft, which is arranged within the first free gear, wherein the shifting sleeve of the shifting arrangement in a third position, i.e. "engaged" or "connected in a positively joined manner," establishes a positively joined connection between the second free gear and the friction clutch assembly.

According to a first further development, a first and a second shifting arrangement, in each case as described above, can be provided on the transmission, wherein the shaft carrying the first free gear is common to both shifting arrangements, and wherein an auxiliary shaft of the transmission furthermore carries: a first fixed gear, which is in engagement with the first free gear of the shifting arrangement; and a second fixed gear, which is in engagement with a second free gear of the second shifting arrangement.

Thus, torque can be transmitted to the auxiliary shaft optionally via the first or the second shifting arrangement. The first shifting arrangement can be arranged on a first end of the input shaft and the second shifting arrangement can be arranged on a second end of the input shaft. Because of this, a compact design of the transmission is made possible. Additionally, a second auxiliary shaft with a third fixed wheel and a fourth fixed wheel can be provided, wherein the first shifting arrangement and the second shifting arrangement each include a second free gear, which is arranged on a hollow shaft assigned in each case, which can either be connected to or unitarily formed with the first free gear, wherein the shifting sleeve of the shifting arrangement in a third position—i.e. "engaged" or "connected in a positively joined manner"— establishes a positively joined connection between the second free gear and the clutch assembly.

Here, the first fixed gear meshes with the first free gear of the first shifting arrangement, the third fixed gear meshes with the second free gear of the shifting arrangement, the second fixed gear meshes with the first free gear of the second shifting arrangement, and the fourth fixed gear meshes with the second free gear of the second shifting arrangement. The fixed gears assigned to a shifting arrangement thus mesh with correspondingly assigned gears. When all fixed gear of a shifting arrangement mesh with odd gears and when all fixed gears of the other shifting arrangement mesh with even gears, a power shifting principle can be realized in a simple manner, wherein during the shifting of a gear which is already in the force flow or torque flow into an adjacent gear, a gear assigned to this gear is initially connected in a positively joined manner to the associated shifting sleeve and wherein following this a moment transfer from the first free gear to the adjacent gear takes place through appropriate opening and closing of the two friction clutches.

In the transmission, actuation of the two shifting arrangements is then synchronized among them so that power shifting takes place. Firstly, the actuating element of the shifting arrangement of the new gear is turned so far that the gear of the new gear is connected in a positively joined manner, than the friction clutch of the shifting arrangement of the current gear is disengaged and the friction clutch of the shifting arrangement of the new gear closed at the same time, after which the positively joined connection of the previously engaged gear is disengaging. Here, inter-synchronization of the shifting arrangements can be controlled mechanically or electronically. Wear of the friction clutches can be compensated for example through an electronically controlled adaptation of the angle of rotation of the actuating element.

Instead of a complex DCT double clutch known from the prior art, two simple disc clutches are used, which can be additionally arranged floating in an oil bath. Because of this, a high performance density and favorable durability is achieved. The friction clutches used for this purpose can be used modularly within a modular system, e.g. also for transmission with only one clutch assembly.

A further feature of an advantageous transmission lies in the arrangement of the output pinion and of the first free gear on the drive side, as a result of which a more cost-effective ball bearing instead of a cylindrical roller bearing can be installed on the opposite side of the input shaft. To illustrate it has to be additionally mentioned that in the manual transmission of the application a power shifting principle can also be achieved with a single auxiliary shaft, while two shifting arrangements are nevertheless needed so that in the region of the two ends of the input shaft a shifting arrangement each is to be provided.

According to a second further development, the manual transmission likewise includes a first and a second shifting arrangement, each as described above, wherein the shaft carrying the first free gear is common to both shifting arrangements and preferably an auxiliary shaft, an input shaft carries two hollow shafts which are concentrically to it and the first free gears of the two shifting arrangements mesh with a wheel of one of the hollow shafts each.

The further developments can be combined with one another insofar as a shifting arrangement can simultaneously include two gears, which are in engagement with fixed wheels of the same auxiliary shaft, as well as a gear on the auxiliary shaft, which meshes with a wheel of one of the hollow shafts.

In order to increase the number of shiftable gears, a second shifting sleeve can be provided, wherein the shifting arrangement includes a shifting fork pre-selection actuating device, which either connects the first shifting sleeve or the second shifting sleeve with the shifting sleeve axial actuating unit.

Here, the shifting pre-selecting actuating unit can include a first region for connection with a first shifting fork, which engages into the first shifting sleeve, and additionally a second region for connection with a second shifting fork. The shifting fork pre-selection actuating unit then has a first position, in which the shifting sleeve axial actuating unit is connected with the first shifting fork, and a second position, in which the shifting sleeve axial actuating unit is connected with the second shifting fork.

The number of positions of the shifting fork pre-selection actuating units in this case corresponds to the number of the shifting sleeves, which are actuated through the shifting sleeve axial actuation. In that according to the second configuration of the shifting arrangement the first free gear is arranged on a shaft other than that of the friction clutch assembly, a highly compact transmission can be created in which an input shaft includes a hollow shaft with a first fixed gear, an auxiliary shaft includes a first free gear and the shifting arrangement as described above and the friction clutch assembly is connected to the input shaft via the outer disc carrier. The shifting sleeve axial actuating unit is connected via a mechanical connection, such as for example a linkage, to a shifting fork, which actuates the shifting sleeve. A for example electric or hydraulic actuator or drive, in particular an electric motor, is provided for actuating the clutch axial actuating unit and the shifting sleeve axial actuating unit of the shifting arrangement.

According to the above embodiments, the transmission can form part of a drive train, wherein a driveshaft of the drive train is connected to an output shaft of the transmission. Frequently, this takes place also via a differential gear connected in between. In a motor vehicle, the drive train is then arranged so that a road wheel of the motor vehicle is connected to the driveshaft of the drive train.

BRIEF DESCRIPTION OF THE DRAWINGS

The present disclosure will hereinafter be described in conjunction with the following drawing figures, wherein like numerals denote like elements.

FIG. 4 shows a control slot in a circumferential portion of a gear shift drum of a shifting sleeve axial actuating unit;

FIG. 5 shows a top view of a ramp structure of a clutch axial actuating unit with transversely sectioned gear shift drum;

FIG. 6 shows a cross-section through the shifting sleeve and clutch axial actuating unit according to FIG. 5;

FIG. 7 shows a neutral shifting position "1" of a shifting pin in a first portion of the control slot of the gear shift drum;

FIG. 8 shows shifting positions of the actuating bodies on actuating contours of the actuating ring for the shifting position "1" shown in FIG. 7;

FIG. 9 shows a cross section through the shifting sleeve and clutch axial actuating unit for the shifting position "1" shown in FIG. 7;

FIG. 10 shows a shifting position "2" of the shifting pin at a transition from the first portion to a second portion of the control slot of the gear shift drum;

FIG. 11 shows shifting positions of the actuating bodies of the actuating ring on the ramp structure for the shifting position "2" shown in FIG. 10;

FIG. 12 shows a cross section through the shifting sleeve and clutch axial actuating unit for the shifting position "2" shown in FIG. 10;

FIG. 13 shows a shifting position "3" of the shifting pin in the control slot;

FIG. 14 shows shifting positions of the actuating bodies of the actuating ring on the ramp structure for the shifting position "3" show in FIG. 13;

FIG. 15 shows a cross section through the shifting sleeve and clutch axial actuating unit for the shifting position "3" shown in FIG. 13;

FIG. 17 shows an enlarged detail of a mechanically coupled clutch and synchronizing device of a shifting arrangement according to a further embodiment of the present disclosure;

FIG. 25 shows a neutral shifting position "1" of a shifting pin in a first portion of the control slot of the gear shift drum;

FIG. 26 shows shifting positions of actuating balls on actuating contours of the shifting structure for the shifting position "1" shown in FIG. 25;

FIG. 27 shows a cross section through the clutch axial actuating unit for the shifting position "1" shown in FIG. 26;

FIG. 31 shows a shifting position "3" of the shifting pin in the control slot;

FIG. 32 shows shifting positions of the actuating balls of the actuating element on the ramp structure for the shifting position "V" shown in FIG. 31;

FIG. 33 shows a cross section through the clutch axial actuating unit for the shifting position "V" shown in FIG. 32;

FIG. 38 shows shifting positions "1" to "5" of an external shifting pin in an external control slot of a circumferential portion of an external gear shift drum of an external shifting sleeve axial actuating unit;

FIG. 39 shows shifting positions "1" to "5" of an internal shifting pin in an internal control slot of a circumferential portion of an internal gear shift drum of an internal shifting sleeve axial actuating unit.

FIG. 40 shows a top view of a ramp structure of a clutch axial actuating unit;

FIG. 41 shows a cross section through the clutch axial actuating unit according to FIG. 40;

FIG. 42 shows the shifting position "1" of the external shifting pin in the external control slot of the circumferential portion of the external gear shift drum of the external shifting sleeve axial actuating unit;

FIG. 43 shows the shifting position "1" of the internal shifting pin in the internal control slot of the circumferential portion of the internal gear shift drum of the internal shifting sleeve axial actuating unit;

FIG. 44 shows the top view of the ramp structure of the clutch axial actuating unit in the shifting position "1";

FIG. 45 shows the cross section through the clutch axial actuating unit in the shifting position "1" according to FIG. 43;

FIG. 46 shows the shifting position "2" of the external shifting pin in the control slot of the circumferential portion of the external gear shift drum of the external shifting sleeve axial actuating unit;

FIG. 47 shows the shifting position "2" of the internal shifting pin in the control slot of the circumferential portion of the internal gear shift drum of the internal shifting sleeve axial actuating unit;

FIG. 48 shows the top view of the ramp structure of the clutch axial actuating unit in the shifting position "2";

FIG. 49 shows the cross section through the clutch axial actuating unit in the shifting position "2" according to FIG. 47;

FIG. 50 shows the shifting position "3" of the external shifting pin in the control slot of the circumferential portion of the external gear shift drum of the external shifting sleeve axial actuating unit;

FIG. 51 shows the shifting position "3" of the internal shifting pin in the control slot of the circumferential portion of the internal gear shift drum of the internal shifting sleeve axial actuating unit;

FIG. 52 shows the top view of the ramp structure of the clutch axial actuating position in the shifting position 'V';

FIG. 53 shows the cross section through the clutch axial actuating unit in the shifting position "3" according to FIG. 51;

FIG. 54 shows the shifting position "4" of the external shifting pin in the control slot of the circumferential portion of the external gear shift drum of the external shifting sleeve axial actuating unit;

FIG. 55 shows the shifting position "4" of the internal shifting pin in the control slot of the circumferential portion of the internal gear shift drum of the internal shifting sleeve axial actuating unit;

FIG. 56 shows the top view of the ramp structure of the clutch axial actuating unit in the shifting position "4";

FIG. 57 shows the cross section through the clutch axial actuating unit in the shifting position "4" according to FIG. 55;

FIG. 58 shows the shifting position "5" of the external shifting pin in the control slot of the circumferential portion of the external gear shift drum of the external shifting sleeve axial actuating unit;

FIG. 59 shows the shifting position "5" of the internal shifting pin in the control slot of the circumferential portion of the internal gear shift drum of the internal shifting sleeve axial actuating unit;

FIG. 60 shows the top view of the ramp structure of the clutch axial actuating unit in the shifting position "5";

FIG. 61 shows the cross section through the clutch axial actuating unit in the shifting position "5" according to FIG. 55;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
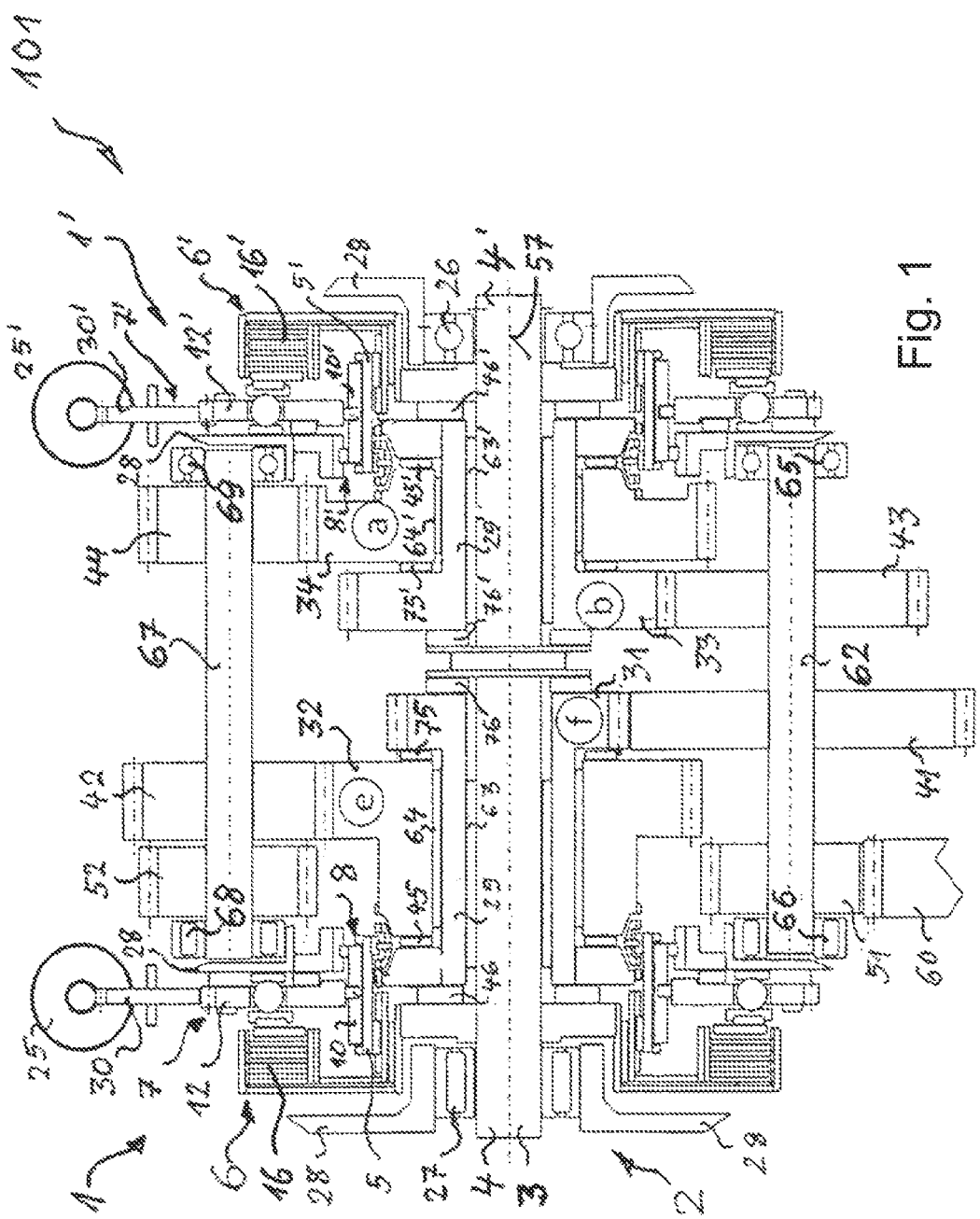
FIG. 1 shows a view of manual transmission with mechanically coupled clutch and synchronizing device of a shifting arrangement according to an embodiment of the present disclosure.

FIG. 1 shows arrangement 101 of a manual transmission 2 with a first mechanically coupled clutch and synchronizing device 1 and a second mechanically coupled clutch and synchronizing device 1' according to an embodiment of the present disclosure. The manual transmission 2 is arranged in a transmission housing 28 and includes an input shaft 3. The input shaft 3 includes a first end region 4 and a second end region 4'. Same components of FIG. 1, which are arranged on the first end region 4 and on the second end region 4' are marked with the same reference characters, but in the second end region 4' of the input shaft 3 the reference characters are additionally provided with an apostrophe.

In addition to the input shaft 3, the manual transmission 2 includes a first auxiliary shaft 62 and a second auxiliary shaft 67, which are arranged parallel to the input shaft 3. The mounting of the first auxiliary shaft 62 includes a ball rolling bearing 65 as fixed bearing and a roller rolling bearing 66 as loose bearing. The mounting of the second auxiliary shaft 67 includes a ball rolling bearing 69 as fixed bearing and a roller rolling bearing 68 as loose bearing.

On the first auxiliary shaft 62 a first fixed gear 41 and a third fixed wheel 43 are arranged. In addition, an output pinion 51, which is in engagement with an annular wheel 60 of a differential which is not shown, is arranged on the first auxiliary shaft 62.

On the second auxiliary shaft 67, a second fixed gear 42 and a fourth fixed wheel 44 are arranged. In addition, a second output pinion 52, which likewise interacts with the annular wheel 60 of the differential, is located on the second auxiliary shaft 67.

The input shaft 3 is mounted in the transmission housing 28 with a ball rolling bearing 26 as fixed bearing and a roller rolling bearing 27 as loose bearing.

Furthermore a first friction clutch assembly 6 is arranged on the first end region 4. The first friction clutch assembly 6 includes a first disc clutch 16.

In the first end region 4 a first free gear 31 is arranged on the input shaft 3. The hub of the first free gear 31 forms a first hollow shaft 29 on the input shaft 3. The first hollow shaft 29 is mounted by means of a radial bearing 63 and two axial bearings 46 and 76. On the first hollow shaft 29 of the first free gear 31 a second free gear 32 is mounted by means of a radial bearing 64 and two axial bearings 45 and 75. The gears 31, 32, 33 and 34 have helical toothing systems 73 and are able to mesh with corresponding helical toothing systems 99 of the fixed wheels 41, 42, 43 and 44, as is clearly visible in the FIGS. 2 and 3.

The shifting arrangement 101 in the second end region 4' of the input shaft 3 is constructed analogously to the first end region 4. The second end region 4' includes a second friction clutch assembly 6' which is connected to the input shaft 3 in a rotationally fixed manner. The second friction clutch assembly 6' includes a second disc clutch 16'.

A third gear 33 is mounted on the input shaft 3 by means of a radial bearing 63' and axial bearings 46' and 76'. The hub of the third gear 33 forms a second hollow shaft 29'. On the second hollow shaft 29', a fourth gear 34 is mounted by means of a radial bearing 64' and two axial bearings 45' and 75'.

The first friction clutch assembly 6 acts together with a first clutch axial actuating unit 7. This first clutch axial actuating unit 7 is operationally connected mechanically with a first shifting sleeve axial actuating unit 8 or mechanically coupled to the same. Accordingly, a second clutch axial actuating unit 7' with a second shifting sleeve axial actuating unit 8' is arranged on the second end region 4' of the input shaft 3.

The mechanically coupled first clutch and synchronizing device 1 has a first actuating element 12, which is also called actuating ring. The first actuating element 12 is connected to a first drive 25 via a first intermediate wheel 30. The second mechanically coupled clutch and synchronizing device 1' has a second actuating element 12'. The second actuating element 12' is connected to a second drive 25' via a second intermediate wheel 30'. In the embodiment of the shifting arrangement 101 shown in FIG. 1, the first drive 25 and the second drive 25' are electric motors, which are each formed with a worm drive.

A first shifting sleeve 5 is arranged in the first end region 4 of the input shaft 3 and is in FIG. 1 in a neutral shifting position between shifting toothing of the first free gear 31 and shifting toothing of the second free gear 32. A second shifting sleeve 5' is in the second end region 4' of the input shaft 3 and stands in FIG. 3 in a neutral shifting position between shifting toothing of the third gear 33 and shifting toothing of the fourth gear 43. The edges 91 and 92 of the gear shift drum 10 and analogously also the edges 91' and 92' of the other gear shift drum 10' are laterally enclosed by the respective assigned shifting sleeve 5, 5' (see for example FIGS. 1, 2 and 3), wherein the enclosures 71 act as drivers with respect to the gear shift drums.

The first gear shift drum 10 encloses the first shifting sleeve 5 and the second gear shift drum 10' encloses the second shifting sleeve 5'.

A gear a is formed with the fourth gear 34 and the fourth fixed wheel 44. A gear b is formed with the third gear 33 and the third fixed wheel 43. A gear e is formed with the second free gear 32 and the second fixed gear 32. A gear f is formed with the first free gear 31 and the first fixed gear 41.

Figure 2:
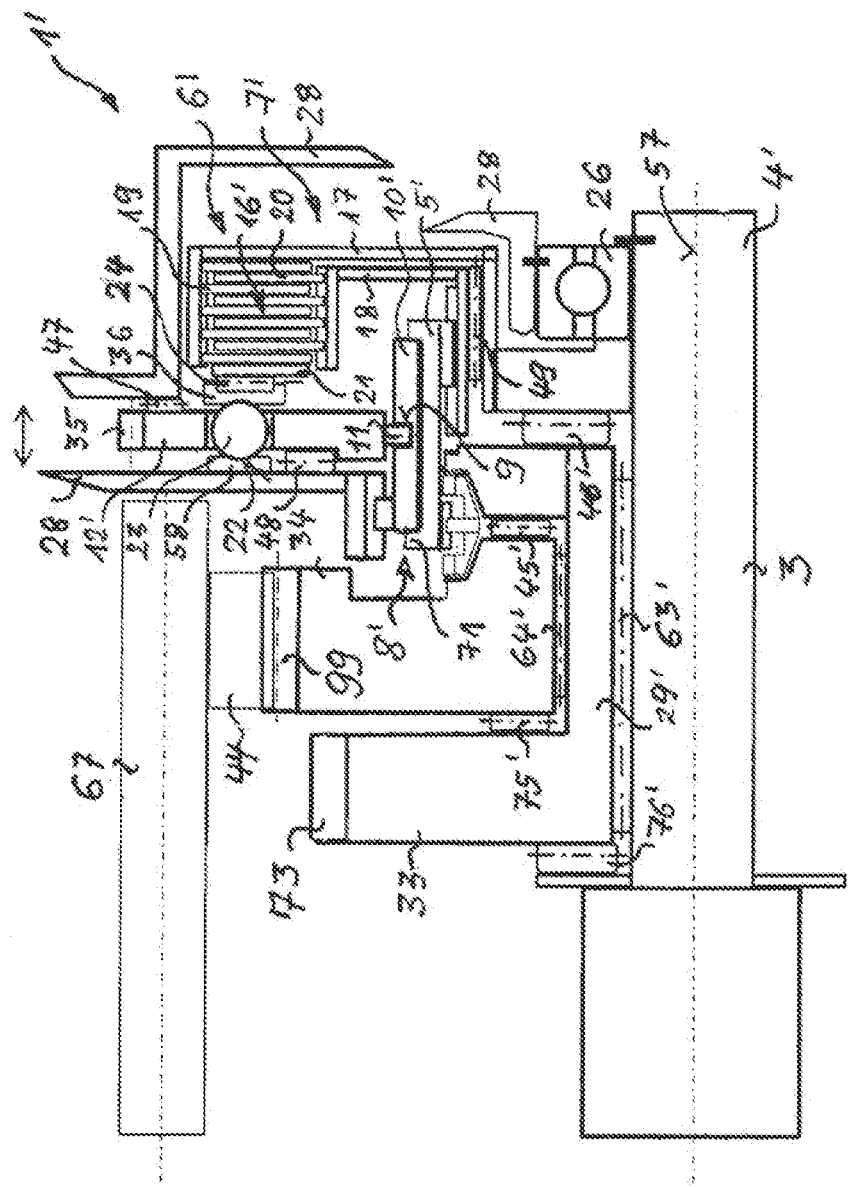
FIG. 2 shows a part view of the mechanically coupled clutch and synchronizing device according to FIG. 1.
Figure 3:
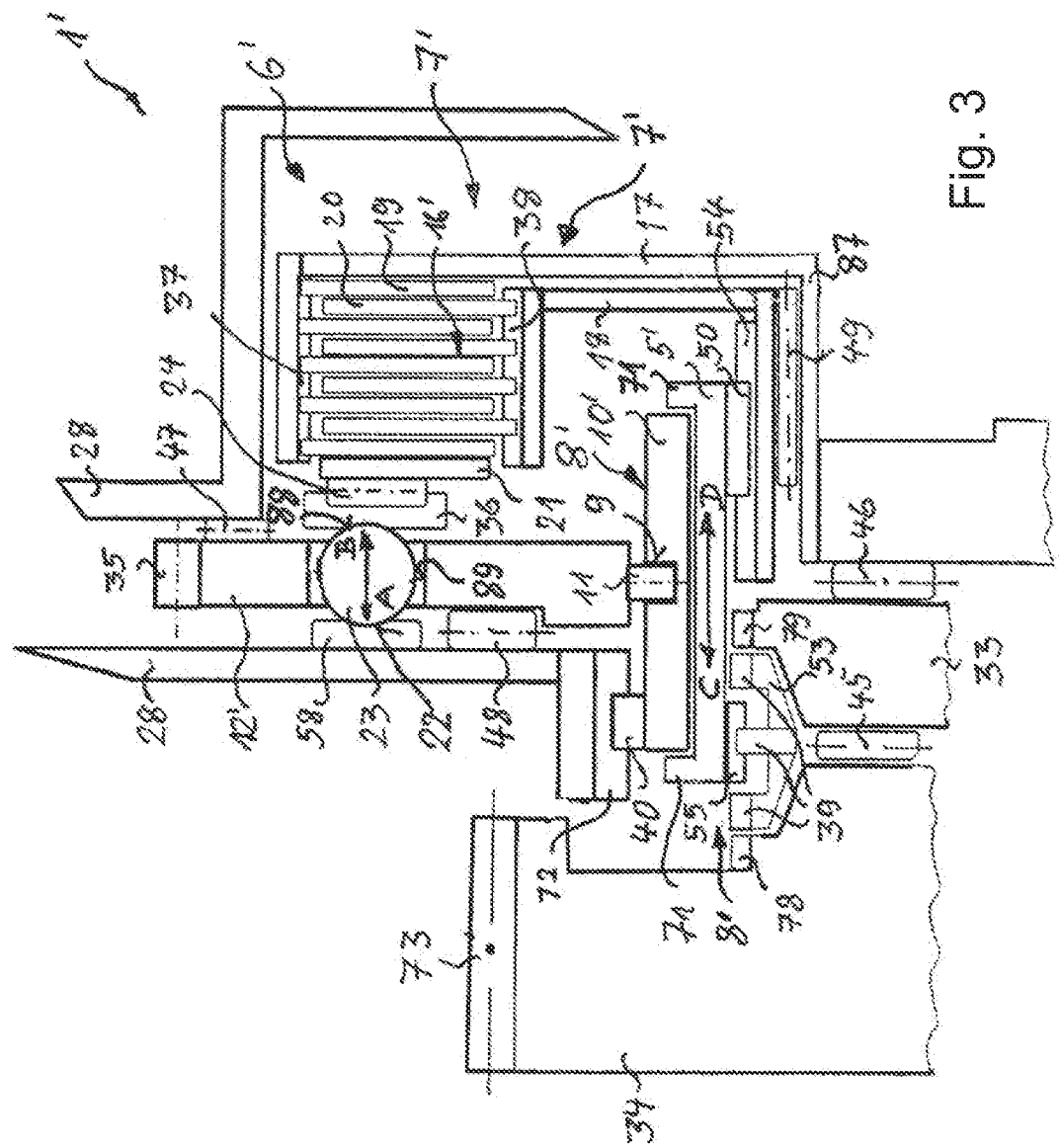
FIG. 3 shows an enlarged detail of the mechanically coupled clutch and synchronizing device according to FIG. 2.

As is evident in FIG. 2 and FIG. 3, the second mechanically coupled clutch and synchronization device 1' includes an outer disc carrier 17, which accommodates and outer disc assembly 19 of clutch discs. Furthermore, the second friction clutch assembly 6' includes an inner disc carrier 18, which has an inner disc assembly 20 of clutch discs. The clutch discs of the inner disc assembly 20 are held axially shiftably through internal disc toothing systems 38 and rotatably fixed, as is best visible in FIG. 3. The same applies to the outer disc assembly 19, the discs of which are held axially shiftably by means of outer disc toothing 37 and are rotatably fixed. A ring portion 87 of the outer disc carrier 17 is fixed on the input shaft 3. The inner disc carrier 18 is mounted on the ring portion 87 of the outer disc carrier 17 through a radial bearing 49. The inner disc carrier 18 has axial external toothing 54 in the region of the radial bearing 49.

In addition to this, the second friction clutch assembly 6' includes a pressure plate 21, which via an axial bearing 24 with an axial bearing ring 36 is operationally connected with the second actuating element 12'. To this end, an actuating body 23, which is also called actuating ball, is arranged in the second actuating element 12' in a guide bore 89.

On its outer circumference, the second actuating element 12' furthermore includes driving toothing 35, which as shown in FIG. 1 act together with the second drive 25' via a second intermediate wheel 30'. The second actuating element 12' is mounted in the transmission 28 between two axial bearings 27 and 48.

The actuating body 23 is arranged in the region of the axial bearing 24. The axial bearing ring 36 arranged on the right side of the actuating body 23 includes an annular groove 88, in which the actuating body 23 is radially guided. Axially opposite the annular groove 88, i.e. on the left side of the actuating body 23, the actuating body 23 rolls on the actuating contour 22 of the ramp structure 58, which is provided fixed on the transmission housing 28.

Out of the second actuating element 12', a shifting pin 11 radially protrudes to the inside, which is slide-shiftably arranged in a control slot 6 of the second gear shift drum 10'. The second gear shift drum 10' is arranged on the second shifting sleeve 5' axially shiftably relative to the transmission housing 28 and rotationally fixed relative to the housing. The second gear shift drum 10' for this purpose has external toothing 40, which are in engagement with internal toothing 72 of the transmission housing 28. The second gear shift drum 10' surrounds the second shifting sleeve 5'.

The second shifting sleeve 5' includes axial driver edges 71, which are in engagement with the gear shift drum 10' in order to transmit an axial movement of the gear shift drum 10' to the shifting sleeve 5' and simultaneously permit a rotation of the shifting sleeve 5' in the transmission housing 28. The second shifting sleeve 5' includes first shifting sleeve internal toothing 50 and second shifting sleeve internal toothing 55. The first shifting sleeve internal toothing 50 are in engagement with the external toothing 54 of the inner disc area 18 and the second clutch axial actuating unit 7' and is axially shiftably on the same. Between the first shifting sleeve internal toothing 50 and the second shifting sleeve internal toothing 55, axial spacing in the form of an annular recess is provided. The second shifting sleeve internal toothing 55 is in engagement in a neutral shifting position of the shifting sleeve 5' with one of the toothing systems 39 of a synchronizing ring 53, which is provided between the third gear 33 and the fourth gear 34. The third gear 33 includes shifting toothing 79 and the fourth gear 34 includes shifting toothing 78, which are arranged on the axial shifting path of the shifting sleeve 5'.

FIG. 4 shows a top view of a circumferential portion 77 of the second gear shift drum 10' from the FIGS. 1 to 3, with the control slot 9 of the second shifting sleeve axial actuating unit 8'. The control slot 9 includes three portions, namely an obliquely (or helically with respect to an axis of the input shaft 3 marked 57 in FIG. 5) running first portion 13, a straight (or in circumferential direction based on the axis 57) running second portion 14 and a straight (or in circumferential direction based on the axis 57) running third portion 15. The straight running portions 14 and 15 of the control slot 9 are arranged parallel to edges 91 and 92 of the circumferential portion 77.

A track or trajectory 56 of the shifting pin 11 is marked with interrupted line and directional arrows E and F show possible axially fixed movement directions of the shifting pin, which the shifting pin 11 can assume along the track 56. Here, this track characterizes a movement of the shifting pin 11 in circumferential direction. The shifting pin 11 thus does not follow the control slot 9, but the gear shift drum 10' with the control slot 9 follows the axially fixed movements of the shifting pin 11 along the track 56.

Along the track 56, five shifting positions "1," "2," "3," "4" and "5" are marked. A first neutral shifting position "1" is provided in the middle of the obliquely running first portion 13. The second shifting position "2" lies at the transition of the first portion 13 to the second portion 14. The third shifting position "3" lies in the region of the end of the second portion 14. The fourth shifting position "4" is provided at a transition from the first portion 13 to the third portion 15, and the fifth shifting position "5" again lies in the region of the end of the third portion 15. The second gear shift drum 10' is rotatably fixed while axially displaceable and can move in arrow direction C or D.

FIG. 5 shows a top view of the ramp structure 58 of the second clutch axial actuating unit 7' with a cross section of the gear shift drum 10'. The three portions 13, 14 and 15 of the control slot 9 in FIG. 4 in this top view of the second actuating element 12' with the stationary ramp structure 58 arranged below correspond to pivot angle regions of the second actuating element 12'. The five shifting positions "1," "2," "3," "4" and "5" correspond to five angle positions, which the second actuating element 12' with the altogether three actuating bodies 23 distributed over its circumference can assume.

The actuating bodies 23 are each guided in two directions on ramp-shaped actuating contours 22 of the ramp structure 58. In the neutral shifting position "1" shown here, the actuating contours 22 each have the deepest position of the respective ramp structure 58 with respect to the drawing plane. This deepest position extends between the shifting positions "2" and "4." In the direction of the shifting position "3" in the second portion 14 or in the direction of the shifting position "5" in the third portion 15, the actuating bodies are guided on the ramp structure 58 in the direction out of the drawing plane. The axial extension of the actuating contour 22 accordingly points in the same direction regardless of the pivot direction, i.e. independently of whether pivoting is from "1" to "2" or from "2" to "4."

The actuating element 12' has a drive toothing 35 in a limited circumferential region. The drive toothing 35 extends at least over a circumferential region corresponding to the angle between the shifting positions "3" and "5."

FIG. 6 shows the second shifting sleeve axial actuating unit 8' and the clutch axial actuating unit 7' in cross section. This view does not correspond to the representation in the FIGS. 1 to 3.

FIG. 7, FIG. 8 and FIG. 9 show views of the shifting sleeve axial actuating unit 8' and of the clutch axial actuating unit 7' in the neutral shifting position "1," in which the shifting pins 11 are arranged in the middle in the first portion 13 of the control slot 9 of the second gear shift drum 10'. The gear shift drum 10' is in a middle position.

FIG. 10, FIG. 11 and FIG. 12 show views of the shifting sleeve axial actuating unit 8' and of the clutch axial actuating unit 7' in the shifting position "2," in which the shifting pins 11 are arranged at the transition from the obliquely running first portion 13 to the straight running portion 14 of the control slot 9. The gear shift drum 10' is shifted to the right with respect to the middle position.

FIG. 13, FIG. 14 and FIG. 15 show views of the shifting sleeve axial actuating unit 8' and of the clutch axial actuating unit 7' in the shifting position "3," in which the shifting pins 11 are arranged in the vicinity of the end of the straight running second portion 14 in the control slot 9. The gear shift drum 10' is shifted to the right relative to the middle position.

In the shifting arrangement 101 shown in the FIGS. 1 to 15 with the first friction clutch 76 and the second friction clutch assembly 6' for torque transmission ratios with the gears a, b, e and f can be shifted via the first clutch axial actuating unit 7 and via the second clutch axial actuating unit 7' in interaction with the first shifting sleeve axial actuating 8 and with the second shifting sleeve axial actuating unit 8'.

In the following, the force flow when shifting the gears a, b, e and f shown in FIG. 1 is described.

For engaging gear a, the second actuating element 12' is initially pivoted about the axis 57. To this end, the drive toothing 35 of the second actuating element 12' meshes with the second intermediate wheel 30', which is driven by the second drive 25'.

The shifting pin 11 shifts the second gear shift drum 10' and via the driver 71. The second shifting sleeve 5' in arrow direction C until the synchronization is completed and the second axial toothing 55 of the second shifting sleeve 5' is in engagement with the shifting toothing 78 of the fourth gear 44.

Through further pivoting of second actuating element 12' the actuating body 23 on the actuating contour 22 is now pressed in the direction of the pressure plate of the second disc clutch 16' and the second disc clutch 16' thereby closed.

Following the closing of the second disc clutch 16', the force flow runs from the input shaft 3 via the outer disc carrier 17, via the outer disc assembly 19 and the inner disc assembly 20 to the inner disc carrier 18 and from there via the second shifting sleeve 5' to the shifting toothing 78 of the fourth gear 34. The fourth gear 34 directs the force flow via its helical toothing 73 meshing with the fourth fixed wheel 44 to the second auxiliary shaft 67, which feeds the force flow to the second output pinion 52, which meshes with the annular wheel 60 of the differential.

For engaging gear b the second actuating element 12' is initially pivoted in the other circumferential direction. To this end, the drive toothing of the second actuating element 12' meshes with the second intermediate wheel 30', which is driven by the second drive 25'. The shifting pin 11, which is slide-shiftably arranged in the control slot 9 of the second gear shift drum 10' shifts the second gear shift drum 10' and via the driver 71 the second shifting sleeve 5' in arrow direction D until synchronization is completed and the second axial toothing 55 of the second shifting sleeve 5' is in engagement with the shifting toothing 79 of the third gear 33.

Through further pivoting of second actuating element 12' the actuating ball 23 on the actuating contour 22 is pressed in arrow direction B and the second disc clutch 16' closed.

Following the closing of the second disc clutch 16', the force flow runs from the input shaft 3 via the outer disc carrier 17, via the outer disc assembly 19 to the inner disc assembly 20, and from there to the inner disc carrier 18 and from there via the second shifting sleeve 5' to the shifting toothing 79 of the third gear 33. From the shifting toothing 79, the force flow is fed to the third gear 33 via the hub which is formed as second hollow shaft 29'. The third gear 33 directs the force flow via its helical toothing meshing with the third fixed wheel 43 to the first auxiliary shaft 62, which feeds the force flow to the first drive pinion 51, which meshes with the annular wheel 60 of the differential.

For engaging gear e the first actuating element 12 is initially pivoted about the axis 57. To this end, the drive toothing 35 of the first actuating element 12 meshes with the first intermediate wheel 30, which is driven by the first drive 25.

The shifting pin 11, which is slide-shiftably arranged in the control slot 9 of the first gear shift drum 10 shifts the first gear shift drum 10 and via the driver 71 the first shifting sleeve 5 until synchronization is completed, in which the second axial toothing of the first shifting sleeve 5 is in engagement with the shifting toothing of the second free gear 32.

Through further pivoting of the first actuating element 12 the actuating body 23 on the actuating contour 22 is now pressed in the direction of the pressure plate of the first disc clutch 16 and the first disc clutch 16 thus closed.

After the closing of the first disc clutch 16, the force flow runs from the input shaft 3 via the outer disc carrier 17, via the outer disc assembly 19 and the inner disc assembly 20 to the inner disc carrier 18, and from there via the first shifting sleeve 5 to the shifting toothing of the second free gear 32. The second free gear 32 directs the force flow via its helical toothing meshing with the second fixed gear 42 to the second auxiliary shaft 67, which feeds the force flow to the second output pinion 52, which meshes with the annular wheel 60 of the differential.

For engaging gear f, the first actuating element 12' is initially pivoted about the axis 57. To this end, the drive toothing 35 of the first actuating element 12 meshes with the first intermediate wheel 13, which is driven by the first drive 25.

The shifting pin 11 shifts the first gear shift drum 10 and via the driver 71 the first shifting sleeve 5 until synchronization is completed and the second axial toothing 55 of the first shifting sleeve 5 is in engagement with the shifting toothing of the second free gear 32.

Through further pivoting of the first actuating element 12, the actuating ball 23 on the actuating contour 22 is then pressed in the direction of the pressure plate of the first disc clutch 16 and the first disc clutch 16 actuated.

Following the closing of the first disc clutch 16, the force flow runs from the input shaft 3 via the outer disc carrier 17, and via the outer disc assembly 19 to the inner disc assembly 20, from there on to the inner disc carrier 18 and from there via the first shifting sleeve 5 to the shifting toothing of the first free gear 31. From the shifting toothing, the force flow is fed to the first free gear 31 via the hub formed as first hollow shaft 29. The first free gear 31 directs the force flow via its helical toothing meshing with the first fixed gear 41 to the first auxiliary shaft 62, which feeds the force flow to the first output pinion 51, which meshes with the annular wheel 60 of the differential.

Actuating the shifting sleeve 5, 5' and the friction clutch assembly 6, 6' in this case takes place in detail as shown in the following with the help of the FIGS. 5 to 15.

As is readily visible in FIG. 5, the actuating bodies 23 for displacing the second gear shift drum 10' are simultaneously moved about the axis 57 during the pivoting of the second actuating element 12'. In the process, the actuating bodies 23 roll on the ramp structure 58 connected to the transmission housing 28. The three actuating contours 22 in this case have a lowest position in the ramp structure 58 between shifting positions "1" and "2" and "4" respectively, so that the actuating bodies 23 in this region do not exert any or only little pressure on the axial bearing ring 36. Thus, the inner disc assembly 20 and the outer disc assembly 19 are separated from one another as shown in the FIGS. 1 to 3.

Here, the shifting pin 11 moves from a middle neutral shifting position "1," as shown by FIG. 4, on a straight track or trajectory 56 in the direction E or in the direction F. Here, this track characterizes a movement of the shifting pin 11 in circumferential direction. When the shifting pin 11 in the first obliquely running portion 13 is either moved to E or to F, the second gear shift drum 10', because of the inclined design of the control slot 9, axially moves in arrow direction C or axially in arrow direction D. When the shifting pin 11 on its track 56 moves in the direction of the shifting position "2," the second gear shift drum 10' is axially shifted in the direction D and takes with it the second shifting sleeve 5', so that following synchronizing of the rotational speeds of the inner disc carrier 18 and of the associated disc assembly 20 with the fourth gear 34 a positively joined connection between the input shaft 3 and the fourth gear 34 is established. Here, the second inner toothing 55 of the second shifting sleeve 5' is pressed onto the shifting toothing 79 of the third gear 33 via the toothing of the synchronizing ring 39. During this shifting operation the second gear shift drum 10' is in engagement with an inner toothing 72 of the transmission housing 28 through axial toothing 40 and is thus rotatably fixed yet axially displaceable nevertheless.

Further pivoting of the second actuating element 12' through the drive toothing 35 in the position "3" in FIG. 4 and FIG. 5 does not cause any axial shifting of the second gear shift drum 10' any longer because of the configuration of the control slot 9, but merely actuation of the friction clutch assembly 6'.

The friction clutch assembly 6 in this case is actuated as follows. In order to transmit a torque, the disc assemblies 19 and 20 of the second disc clutch 16' are compressed by the pressure plate 21. To this end, the second actuating element 12' is pivoted into the position "3" through the driver toothing 35 in such a manner that the actuating body 23 rolls on the actuating contour 22 of the ramp structure 58 which is connected to the transmission housing 28 in a fixed manner. During the rolling on the actuating contour 22 of the ramp structure 58, the actuating body 23 is moved in arrow direction, as is best visible in FIG. 3. Here, the actuating body 23 exerts a contact pressure on the discs of the inner disc assembly 20 and the discs of the outer disc assembly 19 via the axial bearing ring 36, the axial bearing 24 and via the pressure plate 21. For disengaging the frictionally joined connection between the discs of the inner disc assembly 20 and the discs of the outer disc assembly 19, the second actuating element 12' is pivoted back into its starting position "2" through the drive toothing 35 in such a manner that the actuating body 23 can move in arrow direction A. The previously acting axial force is removed to a minimum during the course of resetting the actuating element.

In the other direction, the clutch and synchronization device 1' functions identically. When the shifting pin 11 because of an actuating of the second actuating element 12' is moved from its neutral shifting position "1" in the direction of the shifting position "4," the second gear shift drum 10' conversely moves in arrow direction C. In the shifting position "4," a synchronization operation is completed and a positively joined connection between the third gear 33 and the inner disc carrier 18 established. Pivoting the second actuating element 12' in the position "5" subsequently brings about a closing of the friction clutch assembly 6'.

The five shifting positions "1," "2," "3," "4" and "5" shown in FIG. 5 can be achieved in that a second intermediate wheel 3 shown in FIG. 1, which is driven by an electric motor with worm drive, engages in the drive toothing 35 and adjusts the second actuating element 12' about the axis 57. The drive toothing 35 to this end can include a part region of the outer circumference of the second actuating element 12'.

FIG. 7 shows a neutral shifting position "1" of the shifting pin 11 in the first portion 13 of the control slot 9 in closer detail. Starting out from the neutral shifting position "1" of the shifting pin 11, the fourth gear 34 or the third gear 3 can be coupled to the inner disc carrier 18 depending on movement of the shifting pin 11 in arrow direction F or in arrow direction E.

Through axial shifting in arrow direction D, the second inner toothing 55 of the second shifting sleeve 5' is brought into engagement with the shifting toothing 79 of the third gear 33. Upon axial shifting of the second shifting sleeve 5' in arrow direction D, the second inner toothing 55 of the second shifting sleeve 5' is brought into engagement with the shifting toothing 78 of the fourth gear 34.

FIG. 10 shows a shifting position "2" of the shifting pin 11 in the control slot 9 upon axial shifting of the second gear shift drum 10' in arrow direction D. In this position, synchronization between the inner disc carrier 18 and third gear 33 is completed and a positively joined engagement established. Because of the configuration of the control slot 9, an axial movement of the second gear shift drum 10' along the second portion 14 is blocked. Following this, an increasing force can be exerted via the axial bearing ring 36 and the axial bearing 24 on the pressure plate 21 of the second disc clutch 16 through upward rolling of the actuating bodies 23 in the ramp-shaped actuating contour 22, which leads to the closing of the friction clutch assembly 6'.

In this respect it is clearly visible in FIG. 11 that the ramp structure 58 is connected in a fixed and immovable manner to the transmission housing 28 and its shifting position does not change while through the drive toothing 35 the actuating bodies 23 move out of the drawing plane for as long as the direction of rotation about the axis 57 in arrow direction D is continued. FIG. 12 shows the gear shift drum 10', which axially moves out of its neutral shifting position in arrow direction D.

FIG. 13 shows a shifting position "3" of the shifting pin 11 in the control slot 9 in closer detail, wherein the shifting pin 11 has almost reached the end of the second portion 14 of the control slot 9. No axial shifting of the gear shift drum 10' takes place in portion 14. As is visible in FIG. 14 and particularly in FIG. 15, the actuating bodies 13 are lifted relative to the position "2" compared with FIG. 12.

In this position, the actuating balls 23 exert a force on the pressure plate 21 of the second disc clutch 16'. This increase of the force commences only when the synchronization phase of the inner toothing 55 of the second shifting sleeve 5' with the axial toothing 79 of the third gear 33 is completed. In the shifting position "3," the actuating bodies 23 through the rotation of the second actuating element 12' are located in a position in which the desired clutch force is attained and acts in arrow direction. This is also shown in FIG. 15, in which a spacing a between the axial bearing ring 36 and the ramp structure 58 fixed on the transmission housing 28 is shown enlarged compared with the representation in the FIGS. 9 and 12.

Figure 16:
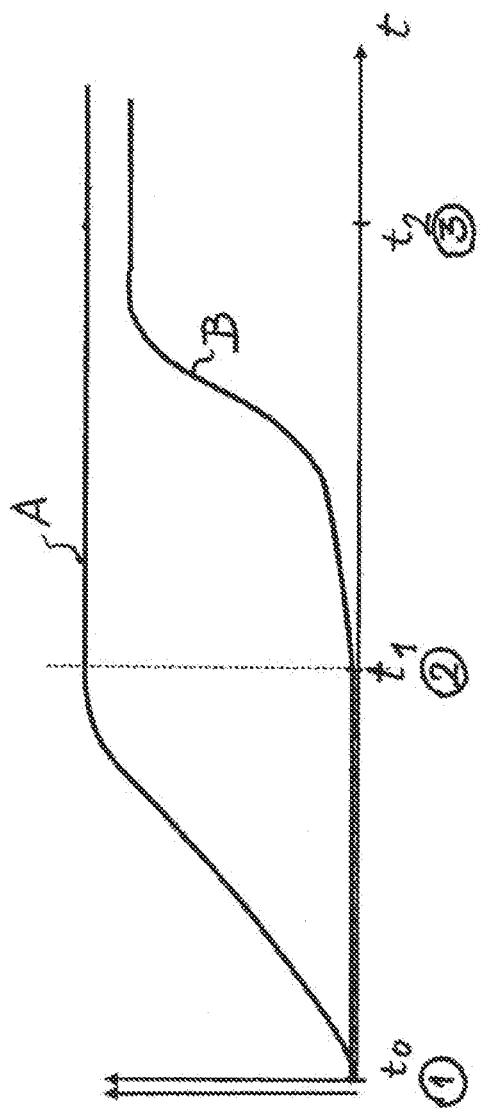
FIG. 16 shows an enlarged detail of a mechanically coupled clutch and synchronizing device of a shifting arrangement according to a further embodiment of the present disclosure.

FIG. 16 shows a diagram with the course of the axial movement of the second shifting sleeve 5' as shown by the FIGS. 9, 12 and 15 compared with the course of an axial force acting on an actuating body 23 of the second actuating element 12' during the shifting of a gear. The graph A represents the course of the axial movement of the second shifting sleeve 5', while the graph B shows the axial force pointing to the actuating bodies 23. In the direction of the ordinate, the respective force or the respective path is plotted and in the direction of the abscissa, the time t.

At the time t=t0, the shifting pin 11 is in the neutral shifting position "1." From the time t0, the axial shifting of the second shifting sleeve 5' increases because of the movement of the second gear shift drum 10', as shown by the graph A. The axial force, which acts on the actuating ball 23 by means of the actuating contour 22 remains zero in this time interval from t0 to t1, i.e. no force acts on the actuating body 23.

On reaching the time t1 in the shifting position "2," the axial shifting of the second shifting sleeve 5' ends, as shown by the graph A. By contrast, the axial force on the actuating bodies 23 increases since with the shifting position "2" at the time t1 a ramp region of the actuating contour 22 is reached. The axial force of the actuating body 23 on the pressure plate 21 increases until in the shifting position "3" at the time t2 a desired force or a target value for the force is attained.

FIG. 17 shows a diagram of the torque transmission during load changes from the first friction clutch assembly 6 to the second friction clutch assembly 6' and the course of the disengaging and engaging of gears "a" and "e," which are associated with the first and the second friction clutch assembly 6 and 6' respectively. The torque transmission of the first friction clutch assembly 6 is shown with the graph A with continuous line as a function of the time t and the torque transmission of the second friction clutch assembly 6' is shown with the graph B with continuous line as a function of the time t. The movement of the first shifting sleeve 5 is shown with the graphs C with interrupted line as a function of the time t and the movement of the second shifting sleeve 5' is shown with the graphs D with interrupted line as a function of the time t.

At the time t0, the first friction clutch assembly 6 is disengaged, i.e. not frictionally connected and it does not transmit any torque, as shown by the graph A, since no force is exerted on the first pressure plate 21 by the actuating bodies 23. The first gear shift drum 10 with the first shifting sleeve 5 is in the neutral shifting position "1" at this time t0. The process of engaging a gear A commences, as shown by the graph C, and is completed at the time t1, when the first shifting sleeve 5 has reached the shifting position "4."

At the time t0, the second friction clutch assembly 6' is closed and transmits the full torque, as shown by graph D. The second shifting sleeve 5' is in the shifting position "3" throughout the time interval from t0 to t1, so that the full torque is transmitted via the second fixed gear 42.

At the time t1, a reduction of the torque transmission of the second friction clutch assembly 6' commences, while the torque transmission of the first friction clutch assembly 6 already increases as shown by the graphs A and B in the time interval between t1 and t2. At the same time, the second gear shift drum with the second shifting sleeve 5' moves from the shifting position "3" to the shifting position "2," however without disengaging the gear e. Only when the shifting position "2" is left at the time t2 does the disengaging of the gear e into the shifting position "1" commence. This makes possible stepless shifting and coupling between the gears e and a.

In principle, the described shifting arrangement functions with only a single auxiliary shaft, although a transmission with two auxiliary shafts is shown here.

The actuating ball 23 in the FIGS. 11 to 15 is to be radially and tangentially guided in the actuating element 12 with little play in order to ensure good functioning. The actuating ball 23 furthermore runs in a circumferential contour in the axial bearing ring 36, which is designed as circumferential groove.

For the rotatory coupling of shifting sleeve and inner disc carrier, axial toothing is to be preferred.

In the exemplary embodiment described above it has to be emphasized that the gear shift drum is arranged axially fixed with respect to the shifting sleeve but rotatable with respect to the same.

Once the gears have been shifted, the respective shifted gear co-rotates with the input shaft, namely with the same rotational speed. The gear which has not been shifted is driven "from the back" corresponding to its transmission ratio, namely via the other fixed wheel of the second shaft concerned.

Synchronization in the preceding Figs. is only shown schematically since it is not of primary concern for the function of the arrangement. The important point is that with engaged shifting sleeve toothing in the shifting toothing the respective gear is connected to the input shaft in a fixed manner.

Figure 18:
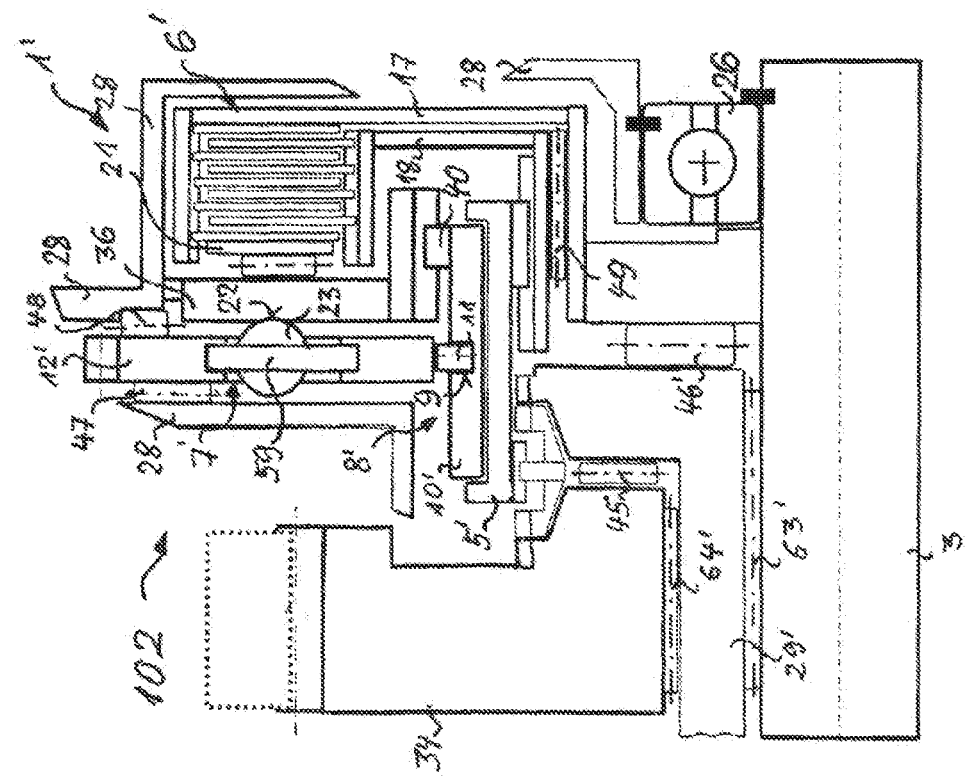
FIG. 18 shows a diagram with the course of the axial movement of a shifting sleeve compared to the course of an axial force acting on an actuating element when engaging a gear.

FIG. 18 shows an enlarged detail of a second mechanically coupled clutch and synchronizing device 1' of a shifting arrangement 102 according to a second embodiment of the present disclosure. In this second embodiment of the present disclosure, an actuating ring is also provided as second actuating element 12', wherein this actuating ring with respect to the transmission housing 28 is mounted with axial bearings 47 and 48. The actuating body 23 rolls on a ramp ring, which has an actuating contour 22. In this embodiment, the ramp ring is simultaneously the axial bearing ring 36 of the axial bearing 24, which is arranged between the second actuating element 12' and a pressure plate 21 of the second friction clutch assembly 6'. The actuating body 23 is guided axially fixed to an actuating body axis 59 but rotatable about itself in the second actuating element 12'.

The actuating contour 22 in this case is provided in the running surface of the axial bearing 24 located opposite the pressure plate 21, which running surface in this case is designed as surface of the axial bearing ring, which as such is rotatably fixed but axially displaceable relative to the transmission housing 28. This can be ensured through a toothing or through a radial pin in the axial bearing outer ring 36, which runs in an axial groove in the housing 28.

Figure 19:
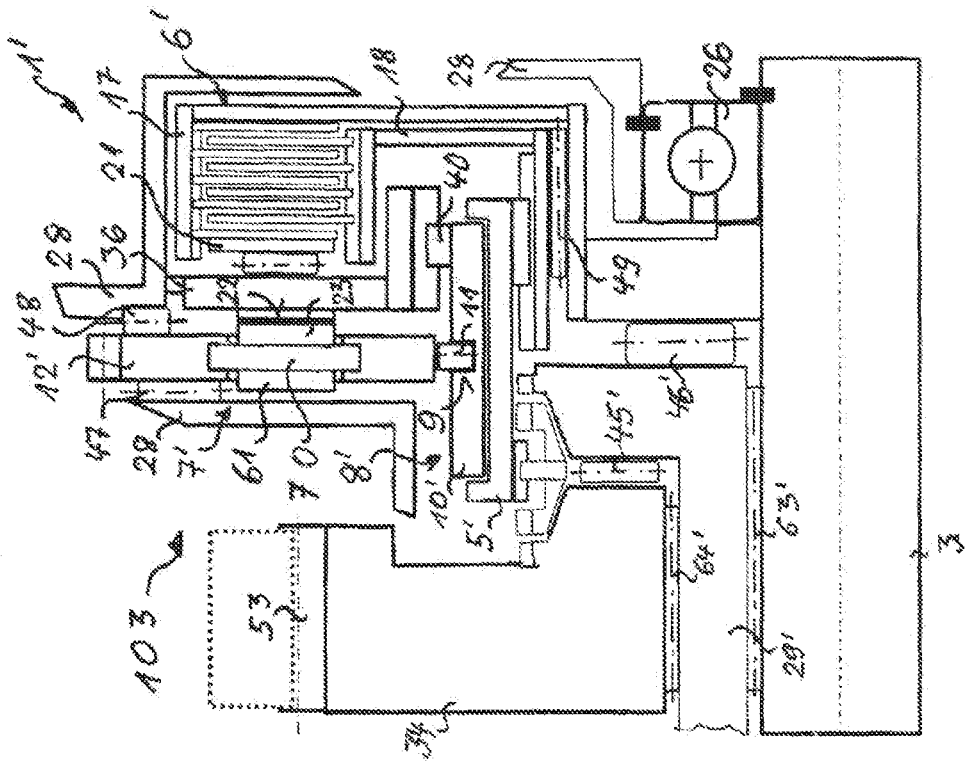
FIG. 19 shows a diagram of the torque transmission during the changing from a first friction clutch assembly to a second friction clutch assembly and the course of disconnecting and engaging of gears assigned to the first and second friction clutch assemblies.

FIG. 19 shows an enlarged detail of a second mechanically coupled clutch and synchronizing device 1' of a shifting arrangement 103 according to a further embodiment of the present disclosure. With this embodiment of the present disclosure, the components of the mechanically coupled second clutch and synchronizing device 1' are the same as in FIG. 18, however a cylindrical actuating roller 61 is provided as actuating body 23.

The actuating roller 61 is rotatably integrated in the second actuating element 12' and includes an axle 70. The actuating body 23 rolls on a ramp ring with flat surface, which includes a ramp-shaped actuating contour 22.

Figure 20:
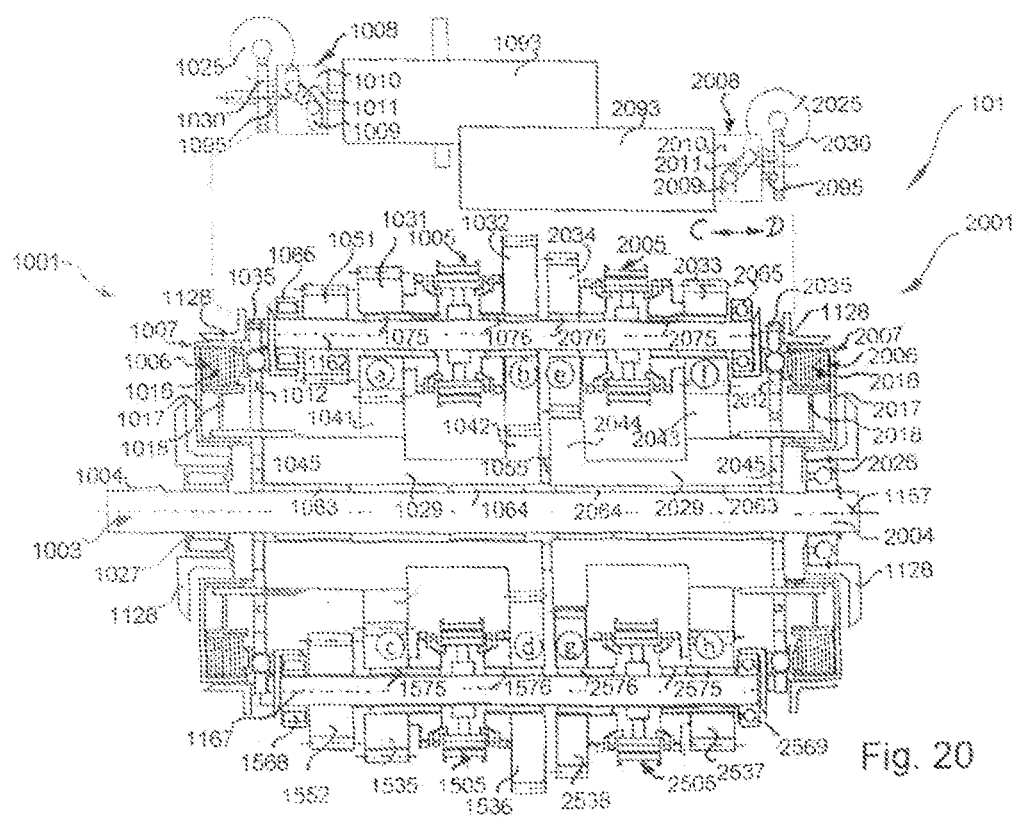
FIG. 20 shows a view of a manual transmission with mechanically coupled clutch and synchronizing device of a shifting arrangement according to an embodiment of the present disclosure.

The FIGS. 20-35 deal with a second configuration of the present disclosure. FIG. 20 shows a shifting arrangement 101 for a manual transmission, with a first mechanically coupled clutch and synchronizing device 1001 and a second mechanically coupled clutch and synchronizing device 2001.

The shifting arrangement 101 is arranged in a transmission housing 1128 and has an input shaft 1003. The input shaft 1003 is mounted in a grooved rolling bearing 1126 as fixed bearing and in a roller rolling bearing 1027 as loose bearing. The input shaft 1003 has a first end region 1004 on the left side of the drawing and a second end region 2004 on the right half of the drawing.

The transmission furthermore includes a first auxiliary shaft 1162 and a second auxiliary shaft 1167, which are arranged parallel to the input shaft 1003. Reference numbers of same components of FIG. 20, which are arranged in the region of the first end region 1004 and in the region of the second end region 2004 differ through a system which follows a symmetry in the arrangement. The first digit of the four-digit reference number includes a "1," when the component concerned is provided in the region of the first end region 1004, while the first digit of the four-digit reference number includes a "2," when the component concerned is provided in the region of the second end region 2004. The third and fourth digit of the reference numbers of these components coincide.

Reference numbers of same components of FIG. 20, which are arranged in the region of the first auxiliary shaft 1162 and in the region of the second auxiliary shaft 1167 likewise differ through a system which follows a further symmetry in the arrangement. The second digit of the four-digit reference number includes a "0," when the component concerned is provided in the region of the first auxiliary shaft 1162, while the second digit of the four-digit reference number includes a "5," when the component concerned is provided in the region of the second auxiliary shaft 1167. The third and fourth digit of the reference numbers of these components coincide.

The mounting of the first auxiliary shaft 1162 includes a ball rolling bearing 2065 as fixed bearing and a roller rolling bearing 1066 as loose bearing. The mounting of the second auxiliary shaft 1167 includes a ball rolling bearing 2569 as fixed bearing and a roller rolling bearing 1568 as loose bearing.

On the input shaft 1003 a first hollow shaft 1029 is provided in the first end region 1004. The first hollow shaft 1029 is mounted on the input shaft 1003 with radial bearings 1063 and 1064 as well as between a first axial bearing 1045 and a second axial bearing 1055. On the first hollow shaft 1029, a first fixed gear 1041 and a second fixed gear 1042 are arranged.

In the second end region 2004, a second hollow shaft 2029 is arranged. The second hollow shaft 2029 is mounted on the input shaft 1003 with radial bearings 2063 and 2064 as well as axially between a third axial bearing 2045 and the second axial bearing 1055. On the second hollow shaft 2029 a third fixed wheel 2043 and a fourth fixed wheel 2044 are arranged.

On the first auxiliary shaft 1162, a first free gear 1031 is arranged on a radial bearing 1075, a second free gear 1032 is arranged on a radial bearing 1076, a third gear 2033 is arranged on a radial bearing 2075 and a fourth gear 2034 is arranged on a fourth radial bearing 2076. Between the first free gear 1031 and the second free gear 1032 a first shifting sleeve 1005 acting on both sides is arranged on the first auxiliary shaft 1162. Between the third gear 2033 and the fourth gear 2034 a second shifting sleeve 2005 acting on both sides is arranged on the first auxiliary shaft 1162. Furthermore, a first output pinion 1051 is connected to the first auxiliary shaft 1162 in a fixed manner.

On the second auxiliary shaft 1167, a fifth gear 1535 is mounted on a radial bearing 1575, a sixth gear 1536 on a radial bearing 1576, a seventh gear 2537 on a radial bearing 2575 and an eighth gear 2538 on a radial bearing 2576. Between the fifth gear 1535 and the sixth gear 1536 a shifting sleeve 1505 acting on both sides is arranged. Between the seventh gear 2537 and the eighth gear 2538 a fourth shifting sleeve 2505 acting on both sides is arranged. A second output pinion 1552 is connected to the second auxiliary shaft 1167 in a fixed manner. The second output pinion 1552 and the first output pinion 1051 mesh with a toothing of an annular wheel of a differential which is not shown here.

A gear a is formed with the first free gear 1031 and the first fixed gear 1041. A gear b is formed with the second free gear 1032 and the second fixed gear 1042. A gear c is formed with the fifth gear 1535 and the first fixed gear 1041. A gear d is formed with the sixth gear 1536 and the second fixed gear 1042. A gear e is formed with the fourth gear 2034 and the fourth fixed wheel 2044. A gear f is formed with the third gear 2033 and the third fixed wheel 2043. A gear g is formed with the eight gear 2538 and the fourth wheel 2044. A gear h is formed with the seventh gear 2537 and the third fixed wheel 2043.

Figure 21:
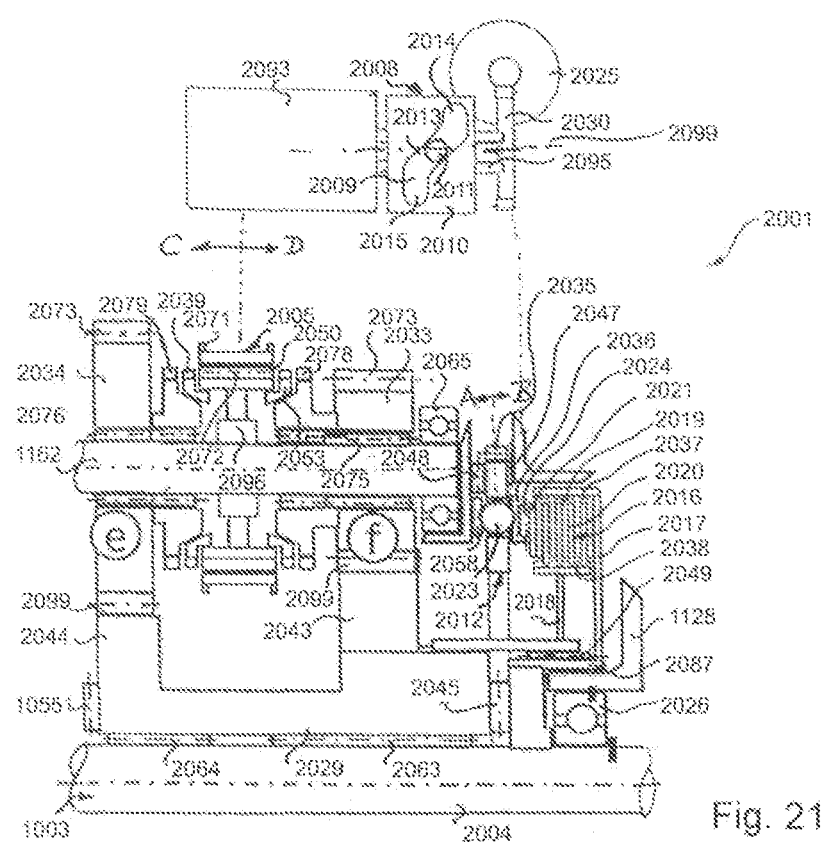
FIG. 21 shows a part view of the mechanically coupled clutch and synchronizing device according to FIG. 20.

The gears have helical tooth systems 2073 which mesh with helical tooth systems 2099 of the fixed wheels, as shown in FIG. 21.

On the first end region 1004 of the input shaft 1003 a first friction clutch assembly 1006 with a first disc clutch 1016 is arranged. An outer disc carrier 1017 of the first disc clutch 1016 is connected to the input shaft 1003 in a fixed manner. An inner disc carrier 1018 is connected to the first hollow shaft 1029 in a rotationally fixed manner.

For actuating the first friction clutch assembly 1006, a first clutch axial actuating unit 1007 is provided. The first clutch axial actuating unit 1007 includes a first actuating element 1012 with a first drive toothing 1035. The first drive toothing 1035 is operationally connected to a first drive 1025 via a first intermediate wheel 1030 of a first shifting sleeve axial actuating unit 1008.

The first intermediate wheel 1030 is provided on a first actuating shaft 1095 with an axis of symmetry 1099, on which a first gear shift drum 1010 is arranged axially fixed and rotatably movable. The first gear shift drum 1010 has a first control slot 1009, in which a first shifting pin 1011 fixed on the housing is arranged rotatably with respect to the transmission housing 1128 and slide-shiftably. The first shifting pin 1011 is operationally connected to a shifting fork pre-selection actuating device 1093, which in turn is operationally connected selectively to the first shifting sleeve 1005 and the third shifting sleeve 1505.

On the second end region 2004 of the input shaft 1003, a second friction clutch assembly 2006 with a second disc clutch 2016 is arranged. An outer disc carrier 2017 of the first disc clutch 2016 is connected to the input shaft 1003 in a fixed manner. An inner disc carrier 2018 is connected to the second hollow shaft 2029 in a rotationally fixed manner.

For actuating the second friction clutch assembly 2006, a second clutch axial actuating unit 2007 is provided. The second clutch axial actuating unit 2007 includes a second actuating element 2012 with a second drive toothing 2035. The second drive toothing 2035 is operationally connected to a second drive via a second intermediate wheel 2030 of a second shifting sleeve axial actuating unit 2008.

The second intermediate wheel 2030 is provided on a second actuating shaft with an axis of symmetry 2099, on which a second gear shift drum 2010 is arranged axially fixed and rotatably movable. The second gear shift drum 2010 has a first control slot 2009, in which a shifting pin 2011 is arranged axially movable with respect to the transmission housing 1128 and rotatably fixed in a slide-displaceable manner. The second gear shift drum 2010 is operationally connected to a shifting fork selection actuating device 2093, which in turn is operationally connected selectively with the second shifting sleeve 2005 and the fourth shifting sleeve 2505.

FIG. 21 shows the second clutch and synchronizing device 2001 from FIG. 20 in enlarged representation.

The second clutch and synchronizing device 2001 acts together with the second shifting sleeve 2093 via a shifting fork which is not shown here and in FIG. 20 via a second shifting fork pre-selection actuating device 2003.

As is particularly favorably noticeable here, the second shifting sleeve 2005 has an internal toothing 2050, which is in engagement axially shiftably with an outer toothing 2072 of a second hub 2096, which is connected to the first auxiliary shaft 1162 in a fixed manner. Starting out from the neutral position shown here, the second shifting sleeve 2005 can either be connected to a shifting toothing 2078 of the third gear 2033 or to a shifting toothing 2079 of the fourth gear 2034 via second synchronizing rings 2053 with toothing systems 2039.

In the neutral position shown here, the second shifting sleeve 2005 is neither in engagement with the shifting toothing 2078 of the third gear 2033 nor with the shifting toothing 2079 of the fourth gear 2034.

The second drive 2025 is designed as an electric motor with a worm drive. As is clearly seen here, the second control slot 2009 is divided into three portions 2013, 2014 and 2015.

FIG. 21 also shows the second disc clutch 2016 in closer detail. The inner disc carrier 2018 is mounted on an annular shoulder 2087 via a radial bearing 2049. Discs of an outer disc assembly 2019 are axially shiftably guided in an outer disc toothing 2037 in the outer disc carrier 2017. The discs of an inner disc assembly 2018 are axially shiftably guided in an inner disc toothing 2038 in the inner disc carrier 2018. The discs of the outer disc assembly 2019 and the discs of the inner disc assembly 2018 are in contact with one another and are loaded by a pressure plate 2021. The pressure plate 2021 is operationally connected with an actuating body 2023 formed as an actuating ball via an axial bearing 2024 and an axial bearing ring 2036.

The actuating body 2023 is arranged between a ramp structure 2058 arranged on the transmission housing 1128 and an axial bearing ring 2036 of an axial bearing 2024.

As can be clearly seen, the second drive toothing 2035 of the second actuating element 2012 meshes with the toothing of the second intermediate wheel 2030. Here, the second actuating element 2012 is pivotally mounted in the transmission housing 1128 by means of an axial bearing 2048 and an axial bearing 2047.

Figures 22, 23, 24:
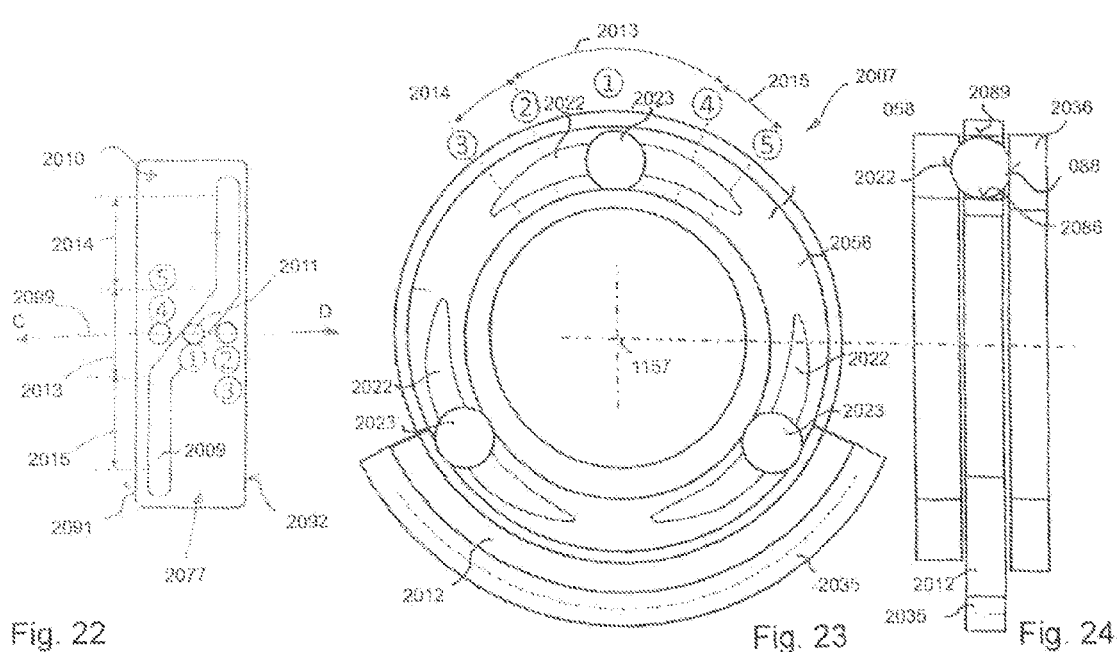
FIG. 22 shows a control slot in a circumferential portion in a gear shift drum of a shifting sleeve axial actuating unit.
FIG. 23 shows a top view of a ramp structure of a clutch axial actuating unit.
FIG. 24 shows a cross section through the clutch axial actuating unit according to FIG. 23.

FIG. 22 shows a top view of a circumferential portion 2077 of the second gear shift drum 2010 from the FIGS. 20 and 21, with the control slot 2009 of the second shifting sleeve axial actuating unit 2008. The control slot 2009 has three portions, namely an obliquely running first portion 2013, a straight running second portion 2014 and a straight running third portion 2015. The straight running portions 2014 and 2015 of the control slot 2009 are arranged parallel to edges 2091 and 2092 of the circumferential portion 2077 and have no or only little axial extension.

A track of the shifting pin 2011 is marked with interrupted line, and direction arrows C and D indicate possible axial movement directions which the shifting pin 2011 can assume along the track. The shifting pin 2011 thus only follows the control slot 2009 in axial direction and the rotatoric movement of the axially fixed gear shift drum 2010 with the control slot 2009 brings about the axial movements of the shifting pin 2011.

Along the track, five shifting positions "1," "2," "3," "4" and "5" are marked. A first neutral shifting position "1" is provided in the middle of the obliquely running first portion 2013. The second shifting position "2" materializes at the transition of the first portion 2013 to the second portion 2014. The third shifting position "3" materializes in the vicinity of the end of the second portion 2014. The fourth shifting position "4" materializes at a transition from the first portion 2013 to the third portion 2015, and the fifth shifting position "5" materializes in the vicinity of the end of the third portion 2015. The second gear shift drum 2010 is rotatably movable while axially fixed, the shifting pin 2011 can move in arrow direction C or D.

As is clearly visible here, the axis of symmetry of the second gear shift drum 2010 coincides with the axis of symmetry 2099 of the second intermediate wheel 2030 and the second actuating shaft 2095.

FIG. 23 shows a top view of a ramp structure 2058 of the second clutch axial actuating unit 2007. As is clearly visible here, the axis of symmetry of the second actuating element 2012 coincides with the axis of symmetry of the input shaft 2003. The three portions 2013, 2014 and 2015 of the control slot 2009 in FIG. 22, in this top view of the second actuating element 2012 with the housing-fixed ramp structure 2058, correspond to pivot angle regions of the second actuating element 2012. The five shifting positions "1," "2," "3," "4" and "5" correspond to five angle positions which the second actuating element 2012 with the altogether three actuating bodies 2023 distributed over its circumference can assume.

The actuating bodies 2023 are each guided in axial directions on ramp-shaped actuating contours 2022 of the ramp structure 2058. In the neutral shifting position "1" shown here, the actuated contours 2022 each have the same axial position as in "2" and "3" on the respective ramp structure 2058 with respect to the drawing plane, which corresponds to the deepest position of the actuating contour 2022. This deepest position extends between the shifting positions "2" and "4." In the direction of the shifting position "3" in the second portion 2014 or in the direction of the shifting position "5" in the third portion 2015, the actuating bodies are guided on the ramp structure 2058 in the direction out of the drawing plane.

The actuating element has a drive toothing 2035 in a limited circumferential region. The drive toothing 2035 extends at least over a circumferential region corresponding to the angle between shifting position "3" and "5."

As is clearly visible in FIG. 23, the actuating bodies 2023, during the pivoting of the second actuating element 2012 for rotating the second gear shift drum 2010, because of mechanical coupling, are simultaneously rotated about the axis 1157. In the process, the actuating bodies 2023 roll on the ramp structure 1058 connected to the transmission housing 1128. The three actuating contours 2022 in this case have a deepest position in the ramp structure 2058 between shifting positions "1" and "2" and "4" respectively so that the actuating bodies 2023 in this region do not exert any or only little force on the axial bearing ring 2036. Thus, the inner disc assembly 2020 and the outer disc assembly 2019 are disengaged from one another as is shown in the FIGS. 20 and 21.

On account of the rotation of the gear shift drum 2010 the shifting pin 2011 moves from a middle neutral shifting position "1," as is shown by FIG. 22, in the direction C or in the direction D. When the gear shift drum 2010 rotates and the control slot 2009 thus moves in circumferential direction, the shifting pin 2011 in the first obliquely running portion 2013 either moves to C or to D. If the shifting pin 2011 on its track moves in the direction of the shifting position "2," the shifting pin 2011 is axially shifted for example in the direction D and it drives for example the second shifting sleeve 2005 so that for example following synchronizing of the rotational speeds of the hollow shaft 2029 with the third gear 2033 a positively joined connection between the hollow shaft 2029 and the third gear 2033 is established. Here, the inner toothing of the second shifting sleeve 2005 is pressed onto the shifting toothing of the third gear 2033 via a toothing of the synchronizing ring. During this shifting process, the shifting pin 2011 is in engagement with an internal toothing of the transmission housing 1128 through axial toothing and is thus rotatably fixed yet axially displaceable.

Further pivoting of the second actuating element 2012 through the driver toothing 2035 into the position "3" in FIG. 22 and FIG. 23 no longer causes any axial movement of the shifting pin 2011 because of the configuration of the control slot 2009, but merely an actuating of the friction clutch assembly 2006.

Here, the friction clutch assembly 2006 is actuated as follows. In order to transmit a torque, the pressure plate 2021 compresses the best assemblies 2019 and 2020 of the second disc clutch 2016. To this end, the second actuating element 2012 is pivoted through the drive toothing 2035 into the position '3" in such a manner that the actuating body 2023 on the actuating contour 2022 of the ramp structure 2058 which is connected to the transmission housing 1128 in a fixed manner. While rolling on the actuating contour 2022 of the ramp structure 2058, the actuating body 2023 is moved in such a manner that the actuating body 2023 exerts a contact pressing force via the axial bearing ring 2036, the axial bearing 2024 and via the pressure plate 2021 on the inner disc of the inner disc assembly 2020 and on the discs of the outer disc assembly 2019. For disengaging the frictionally joined connection between the discs of the inner disc assembly 2020 and the discs of the outer disc assembly 2019 the second actuating element 2012 is pivoted back into its starting position "2" through the drive toothing 2035, as a result of which the actuating body 2023 does not exert any or only little force on the second friction clutch assembly 2006.

In the other direction, the clutch and synchronizing device 101 functions exactly the same. The shifting pin 2011, because of an actuation of the second actuating element 2012 and of the gear shift drum 2010 is moved from the neutral position "1" in the direction of the shifting position "4," namely on account of the rotation of the second gear shift drum 2010. In the shifting position "4" a synchronization process is completed and a positively joined connection between the fourth gear 2034 and the hollow shaft 2029 established. Pivoting the second actuating element 2012 in the position "5" subsequently causes the friction clutch assembly 2006 to close.

The five shifting positions "1"," "2," "3," "4," and "5" can be achieved in that a second intermediate wheel 2030 as shown in FIG. 21, which is driven by an electric motor which worm drive, engages in the drive toothing 2035, adjusting the second actuating element 2012 about the axis 1157.

FIG. 24 shows the clutch axial actuating unit 2007 in cross section. This view is only of a schematic type and does not exactly correspond to the representation in the FIGS. 20 and 21.

FIG. 25, FIG. 26 and FIG. 27 show corresponding views of the shifting sleeve axial actuating unit 2008 and of the clutch axial actuating unit 2007 in the neutral shifting position "1" in which the shifting pins 2011 are arranged in the middle in the first portion 2013 of the control slot 2009 of the second gear shift drum 2010. The shifting pin 2011 is located in a middle position.

Figures 28, 29, 30:
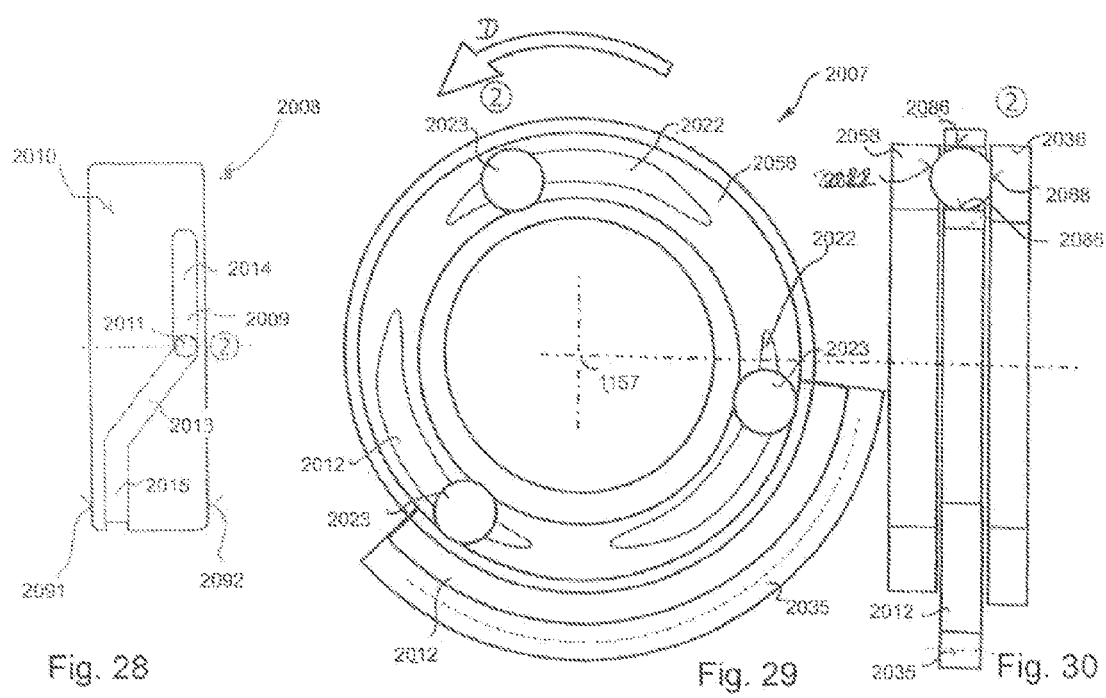
FIG. 28 shows a shifting position "2" of the shifting pin at a transition from the first portion to a second portion of the control slot of the gear shift drum.
FIG. 29 shows shifting positions of the actuating balls of the actuating elements on the ramp structure for the shifting position "2" shown in FIG. 28.
FIG. 30 shows a cross section through the clutch axial actuating unit for the shifting position "2" shown in FIG. 29.

FIG. 28, FIG. 29 and FIG. 30 show corresponding views of the shifting sleeve axial actuating unit 2008 and of the clutch axial actuating unit 2007 in the shifting position "2," in which the shifting pin 2011 is arranged at the transition from the obliquely running first portion 2013 to the straight running portion 2014 of the control slot 2009. The shifting pin 2011 is shifted to the right with respect to the middle position.

FIG. 31, FIG. 32 and FIG. 33 show corresponding views of the shifting sleeve axial actuating unit 2008 and the clutch axial actuating unit 2007 in the shifting position "3," in which the shifting pins 2011 are arranged in the control slot 2009 in the vicinity of the end of the straight running second portion 2014. The shifting pin 2011 is shifted to the right with respect to the middle position. FIG. 31 in this case shows a shifting position "3" of the shifting pin 2011 in the control slot 2009 in closer detail, wherein the shifting pin 2011 has almost reached the end of the second portion 2014 of the control slot 2009. In the portion 2014 no axial shifting of the shifting pin 2011 takes place. As is visible in FIG. 32 and in particular in FIG. 33, the actuating bodies 2023 are lifted with respect to the position "2" or shifted to the right in comparison with FIG. 30.

In this position, the actuating balls 2023 exert a force on the pressure plate 2021 of the second disc clutch 2016. This increase of the force commences only when the synchronization phase of the inner toothing of the second shifting sleeve 2005 or 2505 with the axial toothing of the third gear 2023 is completed. In the shifting position "3" the actuating bodies 2023 are in a shifting position through the prior rotation of the second actuating element 2012. Furthermore, a force transmission of the actuating bodies 2023 on the second friction clutch assembly 2006 is exerted via the ramp structure 2058 and its ramp geometry by pivoting the actuating element 2012. This is also shown in FIG. 33, in which a spacing a between the axial bearing ring 2036 and the ramp structure 2058 which is fixed on the transmission housing 1128 is shown enlarged relative to the representation in the FIGS. 27 and 30.

By way of the output torque of the drive 2025, the force on the clutch can be determined here via the transmission ratios from worm to worm wheel and the transmission ratio from intermediate wheel 2030 to the actuating element 2012, via the angle of the actuating contour 2022 in the contact point with the actuating body 2023. By way of the friction conditions of the clutch and its geometry, the clutch moment that can be transmitted can be determined.

In the shifting arrangement 101 shown in the FIGS. 20 to 33 with the first friction clutch assembly 1006 and the second friction clutch assembly 2006, eight torque transmission ratios with the gears a, b, c, d, e, f, g and h can be shifted via the first clutch axial actuating unit 1007 and via the second clutch axial actuating unit 2007 in interaction with the first shifting sleeve axial actuating unit 1008 and with the second shifting sleeve axial actuating unit 2008.

For engaging gear a, the first actuating element 1012 is initially pivoted about the axis 1157. To this end, the drive toothing 1035 of the first actuating element 1012 meshes with the first intermediate wheel 1030, which is driven by the first drive 1025. The first intermediate wheel 1030 to this end rotates the first gear shift drum 1010, which because of the interaction of the first control slot 1009 with the first shifting pin 1011 leads to axial shifting of the first shifting pin 1011.

The axially fixed gear shift drum 1010 thus shifts the axially movable first shifting pin 1011 and—selected by the first shifting fork pre-selection actuating device 1093—with a shifting fork which is not shown here, the first shifting sleeve 1005 in arrow direction C, until the synchronization is completed and the axial toothing of the first shifting sleeve 1005 is in engagement with the shifting toothing of the first free gear 1031.

Through further pivoting of the first actuating element 1012, the first disc clutch 1016 is now closed.

Following the closing of the first disc clutch 1016, the force flow runs from the input shaft 1003 via the outer disc carrier 1017, via the outer disc assembly 1019 and the inner disc assembly 1020 to the inner disc carrier 1018 and from there via the first hollow shaft 1029 to the first fixed gear 1041. The first fixed gear 1041 directs the force flow via its helical toothing meshing with the first free gear 1031 to the first auxiliary shaft 1162, which feeds the force flow to the first output pinion 1051, which meshes with the annular wheel of the differential.

For engaging gear b the first actuating element 1012 is pivoted about the axis 1157.

The axially fixed gear shift drum 1010 shifts the axially movable shifting pin 1011 and—selected through the first shifting fork pre-selection actuating device 1093—with a shifting fork which is not shown here, the first shifting sleeve 1005 in arrow direction B until synchronization is completed and the axial toothing of the first shifting sleeve 1005 is in engagement with the shifting toothing of the second free gear 1032.

Through further pivoting of the first actuating element 1012 the first disc clutch 1016 is closed.

Following the closing of the first disc clutch 1016, the force flow runs from the input shaft 1003 via the outer disc carrier 1017, via the outer disc assembly 1019 and the inner disc assembly 1020 to the inner disc carrier 1018 and from there via the first hollow shaft 2029 to the second fixed gear 1042. The second fixed gear 1042 directs the force flow via its helical tooting meshing with the second free gear 1032 to the first auxiliary shaft 1162, which feeds the force flow to the first output pinion 1051, which meshes with the annular wheel of the differential.

For engaging gear c the first actuating element 1012 is pivoted about the axis 1157.

The axially fixed gear shift drum 1010 shifts the axially movable shifting pin 1011 and—selected through the first shifting fork pre-selection actuating device 1093—with a shifting fork which is not shown here, the third shifting sleeve 1505 in arrow direction C until synchronization is completed and the axial toothing of the third shifting sleeve 1505 is in engagement with the shifting toothing of the fifth gear 1535.

Through further pivoting of the first actuating element 1012 the first disc clutch 1016 is closed.

Following the closing of the first disc clutch 1016, the force flow runs from the input shaft 1003 via the outer disc carrier 1017, via the outer disc assembly 1019 and the inner disc assembly 1020 to the inner disc carrier 1018 and from there via the first hollow shaft 1029 to the first fixed gear 1041. The first fixed gear 1041 directs the force flow via its helical toothing meshing with the fifth gear 1535 to the second auxiliary shaft 1162, which feeds the force flow to the second output pinion 1552, which meshes with the annular wheel of the differential.

For engaging gear d, the first actuating element 1012 is pivoted about the axis 1157.

The axially fixed gear shift drum 1010 shifts the axially movable first shifting pin 1011 and—selected through the shifting fork pre-selection actuating device 1093—with a shifting fork which is not shown here, the second shifting sleeve 1505 in arrow direction D, until synchronization is completed and the axial toothing of the third shifting sleeve 1505 is in engagement with the shifting toothing of the sixth gear 1536.

Through further pivoting of the first actuating element 1012 the first disc clutch 1016 is closed.

Following the closing of the first disc clutch 1016, the force flow runs from the input shaft 1003 via the outer disc carrier 1017, via the outer disc assembly 1019 and the inner disc assembly 1020 to the inner disc carrier 1018 and from there via the first hollow shaft 1029 to the second fixed gear 1042. The second fixed gear 1042 directs the force flow via its helical toothing meshing with the sixth gear 1536 to the second auxiliary shaft 1167, which feeds the force flow to the second output pinion 1552, which meshes with the annular wheel of the differential.

For engaging gear e, the second actuating element 2012 is pivoted about the axis 1157. To this end, the drive toothing 2035 of the second actuating element 2012 meshes with the second intermediate wheel 2030, which is driven by the second drive 2025. The second intermediate wheel 2030 to this end rotates the second gear shift drum 2010, which, because of the interaction of the second control slot 2009 with the second shifting pin 2011, leads to axial shifting of the shifting pin 2011.

The axially fixed gear shift drum 2010 thus shifts the axially movable shifting pin 2011 and—selected through the second shifting fork pre-selection actuating device 2093—with a shifting fork which is not shown here, the second shifting sleeve 2005 in arrow direction C, until synchronization is completed and the axial toothing of the second shifting sleeve 2005 is in engagement with the shifting toothing of the fourth gear 2034.

Through further pivoting of the second actuating element 2012 the second disc clutch 2016 is now closed.

Following the closing of the second disc clutch 2016, the force flow runs from the input shaft 1003 via the outer disc carrier 2017, via the outer disc assembly 2019 and the inner disc assembly 2020 to the inner disc carrier 2018 and from there via the second hollow shaft 2029 to the fourth fixed wheel 2044. The fourth fixed wheel 2044 directs the force flow via its helical toothing meshing with the fourth gear 2034 to the first auxiliary shaft 1162, which feeds the force flow to the first output pinion 1051, which meshes with the annular wheel of the differential.

For engaging gear f, the second actuating 2012 is pivoted about the axis 1157.

The axially fixed gear shift drum 2010 shifts the axially movable shifting pin 2011 and—selected through the second shifting fork pre-selection actuating device 2093—with a shifting fork which is not shown here, the second shifting sleeve 2005 in arrow direction D, until synchronization is completed and the axial toothing of the second shifting sleeve 2005 is in engagement with the shifting toothing of the third gear 2033.

Through further pivoting of the second actuating element 2012, the second disc clutch 2016 is now closed.

Following the closing of the second disc clutch 2016, the force flow runs from the input shaft 1003 via the outer disc carrier 2017, via the outer disc assembly 2019 and the inner disc assembly 2020 to the inner disc carrier 2018 and from there via the second hollow shaft 2029 to the third fixed wheel 2043. The third fixed wheel 2043 directs the force flow via its helical toothing meshing with the third gear 2033 to the first auxiliary shaft 1162, which feeds the force flow to the first output pinion 1051, which meshes with the annular wheel of the differential.

For engaging gear g the second actuating element 2012 is pivoted about the axis 1157.

The axially fixed gear shift drum 2010 shifts the axially movable shifting pin 2011 and—selected through the second shifting fork pre-selection actuating device 2093—with a shifting torque which is not shown here, the fourth shifting sleeve 2505 in arrow direction C, until synchronization is completed and the axial toothing of the fourth shifting sleeve 2505 is in engagement with the shifting toothing of the eighth gear 2538.

Through further pivoting of the second actuating element 2012 the second disc clutch 2016 is now closed.

Following the closing of the second disc clutch 2016, the force flow runs from the input shaft 1003 via the outer disc carrier 2017, via the outer disc assembly 2019 and the inner disc assembly 2020 to the inner disc carrier 2018 and from there via the second hollow shaft 2029 to the fourth fixed wheel 2044. The fourth fixed wheel 2044 directs the force flow via its helical toothing meshing with the eighth gear 2538 to the second auxiliary shaft 1167, which feeds the force flow to the second output pinion 1552, which meshes with the annular wheel of the differential.

For engaging gear h the second actuating element 2021 is pivoted about the axis 1157.

The axially fixed gear shift drum 2010 shifts the axially movable shifting pin 2011 and—selected through the second shifting for pre-selection actuating device 2093—with a shifting fork which is not shown here, the fourth shifting sleeve 2505 in arrow direction D, until synchronization is completed and the axial toothing of the fork shifting sleeve 2505 is in engagement with the shifting toothing of the seventh gear 2537.

Through further pivoting of the second actuating element 2012, the second disc clutch 2016 is now closed.

Following the closing of the second disc clutch 2016, the force flow runs from the input shaft 1003 via the outer disc carrier 2017, via the outer disc assembly 2019 and the inner disc assembly 2020 to the inner disc carrier 2018 and from there via the second hollow shaft 2029 to the third fixed wheel 2043. The third fixed wheel 2043 directs the force flow via its helical toothing meshing with the seventh gear 2537 to the second auxiliary shaft 1167, which feeds the force flow to the second output pinion 1552, which meshes with the annular wheel of the differential.

Figure 34:
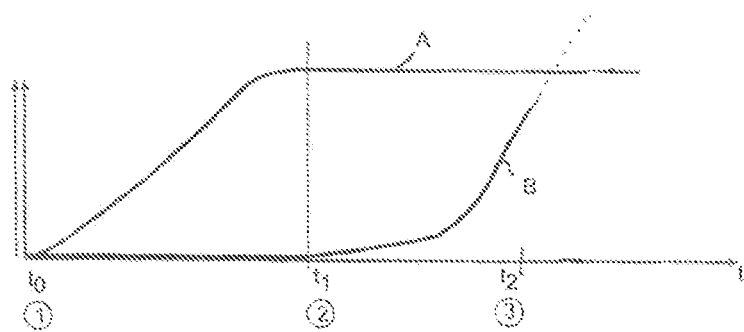
FIG. 34 shows a diagram with the course of the axial movement of a shifting sleeve compared with the course of an axial force acting on an actuating element when engaging a gear.

FIG. 34 shows a diagram with the course of the axial movement of the second shifting sleeve 2005 as shown by the FIGS. 27, 30 and 33 compared with the course of an axial force acting on an actuating body 2023 of the second actuating element 2012 when shifting a gear. The graph A represents the sequence of the axial movement of the second shifting 2005, while the graph B shows the axial force on the actuating body 2023. The respective force or the respective path is plotted in the direction of the ordinate and the time t in the direction of the abscissa.

At the time t=t0, the shifting pin 2011 is in the neutral shifting position "1." From the time t0, the axial shifting of the second shifting sleeve 2005 because of the movement of the second shifting pin 2011 increases as shown by the graph A. The axial force, which acts on the actuating balls 2023 by means of the actuating contours 2022 remains zero in this time interval from t0 to t1, i.e. no force acts on the actuating bodies 2023.

The axial shifting of the second shifting sleeve 2005 ends in the shifting position "2" on reaching the time t1, as shown by the graph A. By contrast, the axial force on the actuating bodies 2023 grows since with the shifting position "2" in the time t1 a ramp region of the actuating contour 2022 is reached. The axial force of the actuating bodies 2023 on the pressure plate 2021 increases until in the shifting position "3" at the time t2 a set point value is reached.

Figure 35:
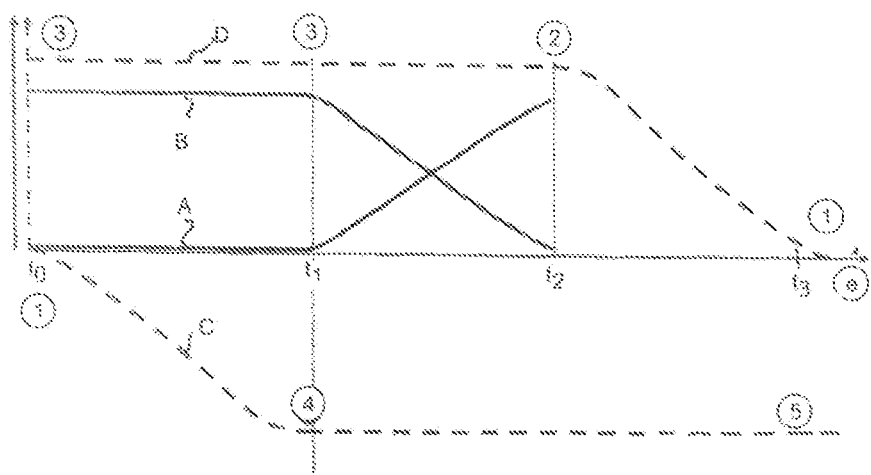
FIG. 35 shows a diagram of the torque transmission during the changing from a first friction clutch assembly to a second friction clutch assembly and the course of the disengaging and the engaging of gears assigned to the first and second friction clutch arrangements.

FIG. 35 shows a diagram of the torque transmission during load changing from the first friction clutch assembly 1006 to the second friction clutch assembly 2006 and the course of the disengaging and engaging of gears "a" and "e," which are assigned to the first and the second friction clutch assembly 1006 and 2006 respectively. The torque transmission of the first friction clutch assembly 1006 is shown with the graph A with continuous line as a function of the time t, and the torque transmission of the second friction clutch assembly 2006 is shown with the graph B with continuous line as a function of the time t. The movement of the first shifting sleeve 1005 is shown with the graph C with interrupted line as a function of the time t, and the movement of the second shifting sleeve 2005 is shown with the graph D with interrupted as a function of the time t.

At the time t0, the first friction clutch assembly 1006 is disengaged, i.e. not frictionally joined, and it does not transmit any torque, as shown by the graph A, since no force is exerted on the first pressure plate 1021 by the actuating bodies 1023. The first gear shift drum 1010 with the first shifting sleeve 1005 is in the neutral shifting position "1" at this time t0. The process of engaging a gear a commences at the time t0, as shown by the graph C, and it is completed at the time t1, when the first shifting sleeve 1005 has reached the shifting position "W."

At the time t0, the second friction clutch assembly 2006 is closed and it transmits the full torque as shown by graph B. The second shifting sleeve 2005 is in the shifting position "3" throughout the entire time interval from t0 to t1, so that the full torque is transmitted via the fourth fixed wheel 2044.

At the time t1, a reduction of the torque transmission of the second friction clutch assembly 2006 commences, while the torque transmission of the first friction clutch assembly 1006 already increases as shown by the graphs A and B in the time interval between t1 and t2. After t2, the second shifting pin 2011 with the second shifting sleeve 2005 moves from the shifting position "4" into the shifting position "1."

The described shifting arrangement basically functions also with only a single auxiliary shaft, although a transmission with two auxiliary shafts is shown here.

As far as possible, The actuating ball 2023 in the FIGS. 20 to 34 is to be radially and tangentially guided free of play in the actuating element 2012 in order to ensure proper functioning. The actuating ball 2023 furthermore runs in a circumferential contour in the axial bearing ring 2036, which is designed as a circumferential groove.

For rotatably coupling the hollow shafts to the respective inner disc carrier, axial toothing can be used.

Synchronization is only schematically shown in the preceding Figs. since this is not of primary importance for the function of the arrangement. It is important that with engaged shifting sleeve toothing in the shifting toothing the respective gear is connected to the auxiliary shaft in a fixed manner.

The moment curve is likewise only shown qualitatively in FIG. 35.

Figure 36:
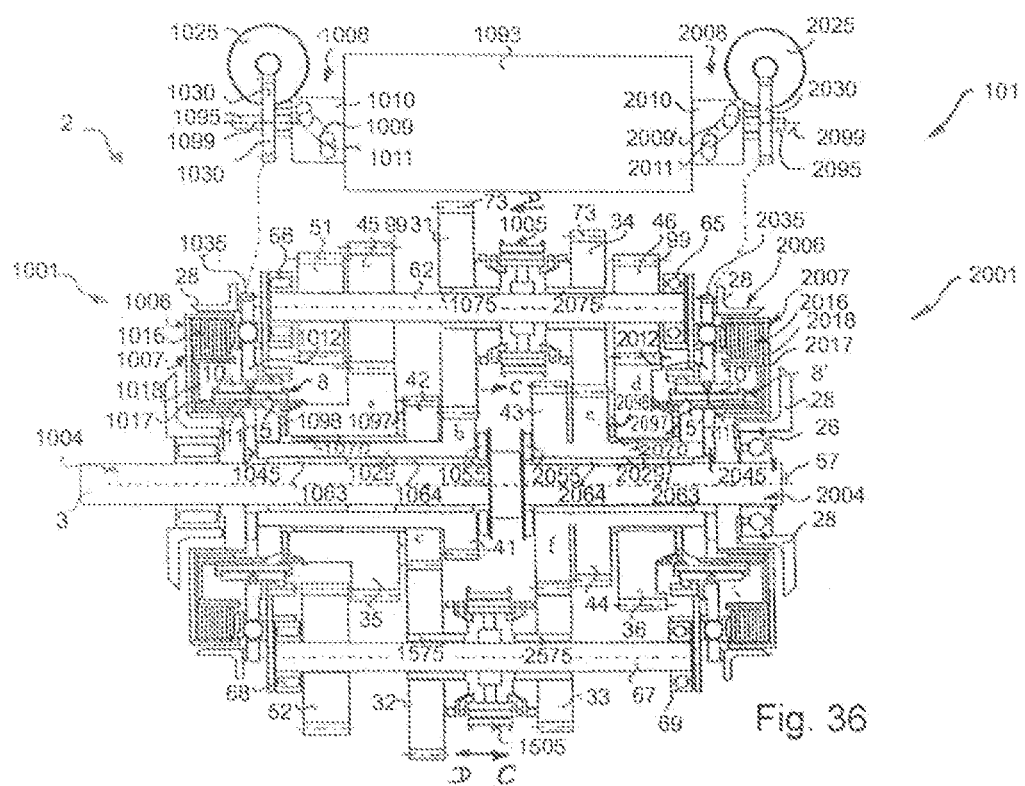
FIG. 36 shows a view of a transmission with mechanically coupled clutch and synchronizing devices of a shifting arrangement according to an embodiment of the present disclosure.

FIG. 36 shows a shifting arrangement 101 for a transmission 2, with a first mechanically coupled clutch and synchronization device 1001 and a second mechanically coupled clutch and synchronization device 2001.

The shifting arrangement 101 is arranged in a transmission housing 28 and includes an input shaft 3 with an axis of symmetry 57. The input shaft 3 is mounted in the housing 23 in a ball rolling bearing 26 as fixed bearing and a roller rolling bearing 27 as loose bearing. The input shaft 3 on the left side of the drawing has a first end region 1004 and on the right side of the drawing a second end region 2004.

Furthermore, the transmission 2 includes a first auxiliary shaft 62 and a second auxiliary shaft 67, which are arranged parallel to the input shaft.

Reference numbers of same components of FIG. 1, which are arranged in the region of the first end region 1004 and in the region of the second end region 2004 differ through a system which follows a symmetry in the arrangement. The first digit of the four-digit reference number has a "1" when the component concerned is provided in the region of the first end region 1004, while the first digit of the four-digit reference number includes a "2," when the component concerned is provided in the region of the second end region 2004. The third and fourth digit of the reference numbers of these components coincide.

Reference numbers of same components of FIG. 1, which are arranged in the region of the first auxiliary shaft 62 and in the region of the second auxiliary shaft 67 likewise differ through a system, which follows a further symmetry in the arrangement. The second digit of the four-digit reference number includes a "0," when the component concerned is provided in the region of the first auxiliary shaft 62, while the second digit of the four-digit reference number includes a "5," when the component concerned is provided in the region of the second auxiliary shaft 67. The third and fourth digit of the reference numbers of these components coincide.

Same components of FIG. 36, which are arranged on the first end region 1004 and on the second end region 2004 are marked with the same reference numbers, but in the second end region 2004 of the input shaft 3 the reference numbers concerned are additionally provided with an apostrophe (').

The mounting of the first auxiliary shaft 62 includes a ball rolling bearing 65 as fixed bearing and a roller rolling bearing 66 as loose bearing. The mounting of the second auxiliary shaft 67 includes a ball rolling bearing 69 as fixed bearing and a roller rolling bearing 68 as loose bearing.

On the input shaft 3, a first hollow shaft 1029 is provided in the first end region 1004. The first hollow shaft 1029 is mounted on the input shaft 3 with radial bearings 1063 and 1064 and between a first axial bearing 1045 and a second axial bearing 1055. On the first hollow shaft 1029, a first fixed gear 41 and a second fixed gear 42 are arranged.

In the second end region 2004, a second hollow shaft 2029 is arranged. The second hollow shaft 2029 is mounted on the input shaft 3 with radial bearings 2063 and 2064 as well as axially between a third axial bearing 2045 and the fourth axial bearing 2055. On the second hollow shaft 2029, a third fixed wheel 43 and a fourth fixed wheel 44 are arranged.

On the first hollow shaft 1029, a fifth gear 35 is arranged furthermore. The fifth gear 35 is mounted on a radial bearing 1070 and between axial bearings 1097 and 1098. Accordingly, a sixth gear 36 is mounted on the second hollow shaft 2029 on a radial bearing 2070 and between axial bearings 2097 and 2098.

On the first auxiliary shaft 62, a first free gear 31 meshing with the first fixed gear 41 is arranged on a radial bearing 1075 and a fourth gear 34 meshing with the fourth fixed wheel 44 is arranged on a radial bearing 2075. Between the first free gear 31 and the fourth gear 34, a first external shifting sleeve 1005 acting on both sides is arranged on the first auxiliary shaft 62.

On the first auxiliary shaft 62, a fifth fixed wheel 45 meshing with the fifth gear 35 and a sixth fixed wheel 46 meshing with the sixth gear 36 is arranged furthermore. A first output pinion 51 is connected to the first auxiliary shaft 62 in a fixed manner, which output pinion 51 meshes with an annular when of a differential which is not shown here.

On the second auxiliary shaft 67, a second free gear 32 meshing with the second fixed gear 42 is arranged on a radial bearing 1575 and a third gear 33 meshing with the third fixed wheel 43 is arranged on a radial bearing 1575. Between the second free gear 32 and the third gear 33, a second external shifting sleeve 1505 acting on both sides is arranged on the second auxiliary shaft 67.

Furthermore, a second output pinion 52 is connected to the second auxiliary shaft 67 in a fixed manner, which output pinion 52 meshes with the annular wheel of the differential which is not shown here.

A gear a is formed with the fifth gear 35 and the fifth fixed wheel 45. A gear b is formed with the first free gear 31 and the first fixed gear 41. A gear c is formed with the second free gear 32 and the second fixed gear 42. A gear d is formed with the sixth gear 36 and the sixth fixed wheel 46. A gear e is formed with the fourth gear 44 and the fourth fixed wheel 44. A gear f is formed with the third gear 33 and the third fixed wheel 43.

The gears have helical tooth systems 73, which mesh with helical tooth systems of the fixed wheels, as is shown in more detail in FIG. 2. In the region of the first end region 1004 of the input shaft 3, a first friction clutch assembly 1006 with a first disc clutch 1016 is arranged. An outer disc carrier 1017 of the first disc clutch 1016 is connected to the input shaft 3 in a fixed manner. An inner disc carrier 1018 of the first disc clutch 1016 is connected to the first hollow shaft 1029 in a rotationally fixed manner.

For actuating the first friction clutch assembly 1006, a first clutch axial actuating unit 1007 is provided. The first clutch axial actuating unit 1007 includes a first actuating element 1012 with a first drive toothing 1035. The first drive toothing 1035 is operationally connected to a first drive 1025 via a first intermediate wheel 1030 of a first external shifting sleeve axial actuating unit 1008.

The first intermediate wheel 1030 is provided on a first actuating shaft 1095 with an axis of symmetry 1099, on which a first external gear shift drum 1010 is axially fixed but freely movable in circumferential direction with respect to the housing 28 via a toothing which is not shown here. The first external gear shift drum 1010 has a first external control slot 1009, in which a first external shifting pin 1011 is slide-shiftably arranged. The first external gear shift drum 1010 is connected to the rotating intermediate wheel 1030 in a rotationally fixed manner.

The first external shifting pin 1011 is operationally connected to a shifting fork selection actuating device 1093, which in turn is operationally connected selectively with the first external shifting sleeve 1005 and the second external shifting sleeve 1505.

In the region of the second end region 2004 of the input shaft 3, a second friction clutch assembly 2006 with a second disc clutch 2016 is arranged. An outer disc carrier 2017 of the second disc clutch 2016 is connected to the input shaft 3 in a fixed manner. An inner disc carrier 2018 is connected to the second hollow shaft 2029 in a rotationally fixed manner.

Or actuating the second friction clutch assembly 2006, a second clutch axial actuating unit 2007 is provided. The second clutch axial actuating unit 2007 includes a second actuating element 2012 with a second drive toothing 2035. The second drive toothing 2035 is operationally connected with a second drive 2025 via a second intermediate wheel 2030 with a second external shifting sleeve axial actuating unit 2008. The second intermediate wheel 2030 is provided on a second actuating shaft 2095 with a second axis of symmetry 2099, on which a second external gear shift drum 2010 is axially fixed but freely movable in circumferential direction. The second external gear shift drum 2010 has a second external control slot 2009, in which a rotatably fixed but axially freely movable second external shifting pin 2011 is slide-shiftably arranged.

Figure 37:
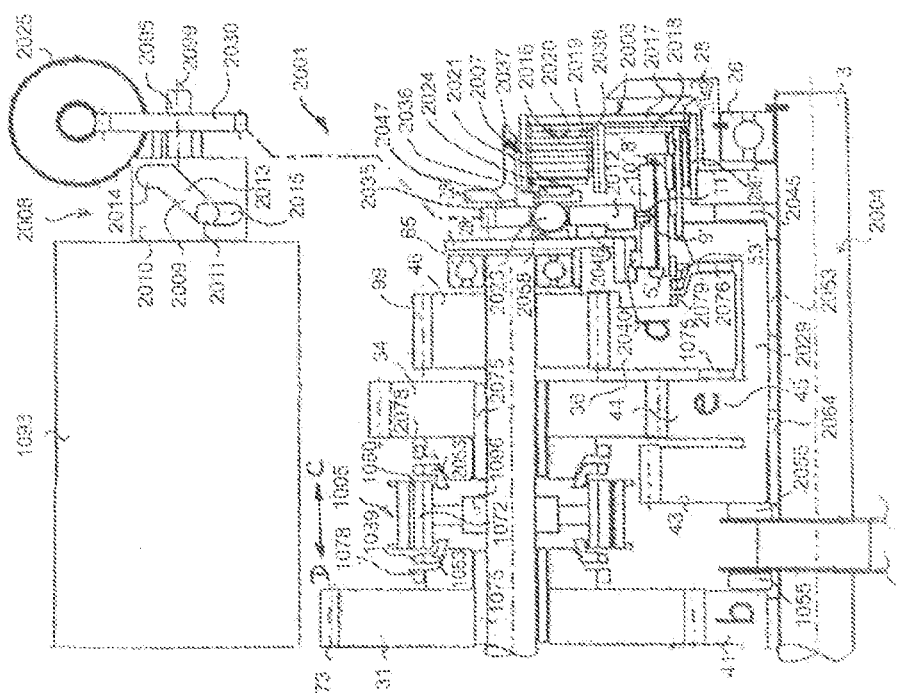
FIG. 37 shows a part view of a mechanically coupled clutch and synchronizing device according to FIG. 36.

As is clearly visible in FIG. 37, the axis of symmetry of the second gear shift drum 2010 coincides with the axis of symmetry 2099 of the second intermediate wheel 2030 and of the second actuating shaft 2095. As is clearly visible here, the second external control slot 2009 is divided into three portions 2013, 2014 and 2015.

The second shifting pin 2011 is operationally connected to the shifting fork selection actuating device 1093, which in turn is operationally connected selectively with the first external shifting sleeve 1005 on the first auxiliary shaft 62 and the second external shifting sleeve 1505 on the second auxiliary shaft 67. FIG. 2 shows the second clutch and synchronization device 2001 from FIG. 36 in enlarged representation.

The second clutch and synchronization device 2001 acts together via the shifting fork pre-selection actuating device 1093 with the first external shifting sleeve 1005 on the first auxiliary shaft 62 and the second external shifting sleeve 1505. On the second auxiliary shaft 67 via shifting forks which are not shown here and in FIG. 36.

As is clearly seen, the first external shifting sleeve 1005 on the first auxiliary shaft 62 is designed as a shifting sleeve 1005 acting on two sides. The first external shifting sleeve 1005 has an internal toothing 1050, which is axially shiftably in engagement with an outer toothing 1072 of a first hub 196. The first hub 196 is connected to the first auxiliary shaft 62 in a fixed manner. The first external shifting sleeve 1005 can, starting out from the neutral position shown here, be connected via a first synchronizing ring 1053 either to the synchronizing toothing 1039 of a first shifting toothing 1078 of the first free gear 31 or via a second synchronizing ring 2053 to a second shifting toothing 2078 of the fifth gear 35.

In the neutral position shown here, the first external shifting sleeve 1005 is neither in engagement with the first shifting toothing 1078 of the first free gear 31 nor with the second shifting toothing 2078 of the fifth gear 35.

The second drive 2025 is designed as electric motor with a worm drive.

As is clearly visible in FIG. 36, the first friction clutch assembly 1006 acts together with the first clutch axial actuating unit 1007, which in turn is operationally connected mechanically with a first shifting sleeve axial actuating unit 8 or mechanically coupled to the same. Accordingly, a second clutch axial actuating unit 2007 with a second shifting sleeve axial actuating unit 8' is arranged on the second end region 2004 of the input shaft 3.

A first internal shifting sleeve 5 is arranged in the first end region 1004 of the input shaft 3 and is located in FIG. 36 in a neutral shifting position in front of a shifting toothing of the fifth gear 31 which is not shown here, without entering into engagement with the same.

A second internal shifting sleeve 5 is arranged in the second end region 2004 of the input shaft 3 and stands in FIG. 1 on a neutral shifting position in front of a shifting toothing 2079 of the sixth gear 36 which is best visible in FIG. 2, without entering into engagement with the same.

The face regions of the internal gear shift drum 10" shown in FIG. 37 and analogously also the face regions of the other internal gear shift drum 10 are laterally enclosed by the respective assigned internal shifting sleeve 5, 5', their edges in turn acting as axial driver with respect to the gear shift drums 10, 10." The first shifting sleeve 5 thus encloses the first gear shift drum 10 and the second shifting sleeve 5' thus encloses the second gear shift drum 10', as a result of which these are axially guided with respect to the respective gear shift drum, but is rotatable in circumferential direction with respect to the same.

Out of the first actuating element 1012, a first internal shifting pin 11 protrudes radially to the inside, which is slide-shiftably arranged in a first internal control slot 9 of the first internal gear shift drum 10. The first internal gear shift drum 10 is arranged on the first internal shifting sleeve 5 axially shiftably with respect to the transmission housing 28 and rotationally fixed to the housing 28. The first internal gear shift drum 10 for this purpose has an outer toothing which is not shown here or another rotatoric fixing to the housing, which is in engagement with an inner toothing of the transmission housing 28 which is not shown here or another rotatoric fixing to the transmission housing 28.

As is best visible in FIG. 37, a second internal shifting pin 11" protrudes out of the second actuating element 2012 radially to the inside, which is slide-shiftably arranged in a second internal control slot 9" of the second internal gear shift drum 10'. The second internal gear shift drum 10' is arranged axially shiftably with respect to the transmission housing 28 and rotationally fixed to the housing 28 on the second internal shifting sleeve 5'. The second internal gear shift drum 10' for this purpose has an outer toothing which is not shown here, which is in engagement with an inner toothing of the transmission housing 28 which is not shown here.

FIG. 37 shows the second disc clutch 2016 in closer detail. The outer disc carrier 2017 is connected to the input shaft 3 in a fixed manner. The inner disc carrier 2018 is mounted on an annular shoulder 2087 of the outer disc carrier 2017 of the input shaft 3, namely via a radial bearing 2049.

Discs of an outer disc assembly 2019 are axially shiftably guided in an outer disc toothing 2037 in the outer disc carrier 2017. The discs of an inner disc assembly 2020 are axially shiftably guided in an inner disc toothing in the inner disc carrier 2018. The discs of the outer disc assembly 2019 and the discs of the inner disc assembly 2020 contact one another and are axially loaded by a pressure plate 2021 in a closing position of the second disc clutch 2016.

The pressure plate 2021 is operationally connected with an actuating body 2023 formed as actuating ball via an axial bearing 2024 and an axial bearing ring 2036.

The actuating body 2023 is arranged between a ramp structure 2058 arranged on the transmission housing 28 and an axial bearing ring 2036 of an axial bearing 2024.

As is clearly seen, the second drive toothing 2035 of the second actuating element 2012 meshes with the toothing of the second intermediate wheel 2030. Here, the second actuating element 2012 is pivotally mounted in the transmission housing 28 by means of an axial bearing 2048 and an axial bearing 2047.

In FIG. 37 it is clearly visible, furthermore, that the inner disc carrier 2018 of the second disc clutch 2016 is permanently connected to the second hollow shaft 2029 in a fixed manner.

In the neutral position shown in FIG. 37, the second internal shifting sleeve 5' is in engagement with an outer toothing of the inner disc carrier 2018 via an inner toothing. The second internal shifting sleeve 5' can be brought into engagement with a shifting toothing 2079 of the gear 36 via a synchronizing ring 53'.

FIG. 38 shows a top view of a circumferential portion 2077 of the second external gear shift drum 2010 from the FIGS. 36 and 37, with the second external control slot 2009 of the second external shifting sleeve axial actuating unit 2008. The second external control slot 2009 includes three portions, namely an obliquely running first portion 2013, a straight running second portion 2014 and a straight running third portion 2015. The straight running portions 2014 and 2015 of the second external control slot 2009 have no axial extension, they are arranged parallel to edges 2091 and 2092 of the circumferential portion 2077.

The second external shifting pin 2011 follows the second external control slot 2009 in axial direction the axially fixed rotatoric movements of the second external gear shift drum 2010, which is arranged on and connected to the second axis of symmetry 2099 of the second intermediate wheel 2030. Here, the second external shifting pin 2011 assumes five shifting positions "1," "2," "3," "4" and "5." A first neutral shifting position "1" is already provided at a transition from the obliquely running first portion 2013 to the second straight running second portion 2014. The second shifting position "2" lies in the second portion 2014. The third shifting position "3" lies at the end of the second portion 2014. The fourth shifting position "4" is provided at a transition from the first portion 2013 to the third portion 2015, and the fifth shifting position "5" lies at the end of the third portion 2015. The second external shifting pin 2011 can move to and fro in arrow direction C or D as a function of the circumference-based shifting positions "1" to "5" of the second external gear shift drum 2010.

This axial movement is transmitted via the shifting fork pre-selection actuating device 1093 and a shifting fork, which is not shown here to the pre-selected first external shifting sleeve 1005 on the first auxiliary shaft 62 or to the pre-selected second external shifting sleeve 1505 on the second auxiliary shaft 67.

FIG. 39 shows a top view of a circumferential portion 77' of the second internal gear shift drum 10' from the FIGS. 1 and 2, with the second internal control slot 9' of the second internal shifting sleeve axial actuating unit 8'. The second internal control slot 9' has three portions, namely a obliquely running first portion 13, a straight running second portion 14 and a straight running third portion 15. The straight running portions 14 and 15 of the second internal control slot 9' are arranged parallel to edges 91' and 92' of the internal circumferential portion 77' of the second internal gear shift drum 10' and have no axial extension.

The second internal gear shift drum 10' with the second internal control slot 9' axially follows the axially fixed but rotatably free movements of the second internal shifting pin 11'. Here, the second internal shifting pin 11' assumes five shifting positions "1," "2," "3," "4" and "5." A first neutral shifting position "1" is provided at a transition from the obliquely running first portion 13 to the straight running third portion 15. The second shifting position "2" lies at the transition of the first portion 13 to the second portion 14. The third shifting position "3" lies at the end of the second portion 14. The fourth shifting position "4" already lies within the third portion 2015, and the fifth shifting position "5" lies at the end of the third portion 2015. The second internal gear shift drum 10' can move to and fro in arrow direction C or D.

The second internal gear shift drum 10' is in engagement with the second internal shifting sleeve 5' acting on only one side. Corresponding to this, the third straight running portion 15 of the second internal control slot 9' is aligned parallel to an edge 92', however not in the vicinity of the edge 92," but rather in the middle of the circumferential surface 77' shown here. The control slot has no axial extension in this portion.

FIG. 40 shows a top view of a ramp structure 2058 of the second clutch axial actuating unit 2007 and the internal shifting sleeve axial actuation. As is clearly seen here, the axis of symmetry of the second actuating element 2012 coincides with the axis of symmetry 57 of the input shaft 3.

The three portions 13, 14 and 15 of the second internal control slot 9' in FIG. 39 in this top view of the second actuating element 2012 with the housing-fixed ramp structure 2058 arranged below, correspond to pivot angle regions of the second actuating element 2012. The five shifting positions '1', "2," "3," "4" and "5" correspond to five angle positions which the second actuating element 2012 with the altogether three actuating bodies 2023 distributed over its circumference can assume.

The actuating bodies 2023 in this case are spherical and are each guided in two directions on ramp-shaped actuating contours 2022 of the ramp structure 2058. In the neutral shifting position "1" shown here, the actuating contours 2022 each have the deepest position of the respective ramp structure 2058 with respect to the drawing plane. This deepest position extends between the shifting positions "2" and "4" of the second internal gear shift drum 10', as shown by FIG. 5. In the direction of the shifting position "3" in the second portion 14 or in the direction of the shifting position "5" in the third portion 15, the actuating bodies on the ramp structure 2058 are guided in the direction out of the drawing plane.

The second actuating element 2012 has a drive toothing 2035 in a limited circumferential region. The drive toothing 2035 extends at least over a circumferential region which corresponds to the angle between shifting position "3" and "5." As is clearly visible in FIG. 40, the actuating bodies 2023 because of mechanical coupling are moved about the axis 57 during the pivoting of the second actuating element 2012 for the axial shifting of the second internal gear shift drum 10'. Here, the actuating bodies 2023 roll on the ramp structure 2058 which is connected to the transmission housing 28. The three actuating contours 2022 in this case have a deepest position in the ramp structure 2058 between shifting positions "1" and "2" and "1" and "4" respectively, so that the actuating bodies 2023 in this region do not exert any or only a little unchanging force on the axial bearing ring 2036. Thus, the inner disc assembly 2020 and the outer disc assembly 2019 are disengaged from one another as is shown in the FIGS. 36 and 37.

Here, the second internal shifting pin 11' moves from a middle neutral shifting position "1," as shown by FIG. 4, on a straight track in the second internal control slot 9'. When the second internal shifting pin 11' is moved in the first obliquely running portion 2013 in the direction of the shifting position "2," the second internal gear shift drum 10' axially moves in arrow direction C because of the oblique design of the second internal control slot 9', taking along the second internal shifting sleeve 5' so that for example following synchronizing of the rotational speeds of the inner disc carrier 2018, a positively joined connection between the inner disc carrier 2018 and the sixth gear 36 is established.

Here, the inner toothing of the second internal shifting sleeve 5' is pressed via the toothing of the synchronizing ring 53' onto the shifting toothing 2079 of the sixth gear 36.

Further pivoting of the second actuating element 2012 through the drive toothing 2035 in the position "3" in FIG. 4 does not bring about any further axial movement of the second gear shift drum 10' any longer because of the configuration of the second internal control slot 9', but merely an actuation of the friction clutch assembly 2006.

The friction clutch assembly 2006 in this case is actuated as follows. In order to transmit a torque, the pressure plate 2021 compresses the disc assemblies 2019 and 2020 of the second disc clutch 2016. To this end, the second actuating element 2012 is pivoted through the drive toothing 2035 in the position "3" in such a manner that the actuating body 2023 rolls on the actuating contour 2022 of the ramp structure 2058 which is connected to the transmission housing 28 in a fixed manner.

During the rolling of the actuating contour 2022 of the ramp structure 2058, the actuating body 2023 is axially moved in such a manner that the actuating body 2023 via the axial bearing ring 2036, the axial bearing 2024 and via the pressure plate 2021 exert a contact pressing force on the inner discs of the inner disc assembly 2020 and on the discs of the outer disc assembly 2019. For disengaging the frictionally joined connection between the discs of the inner disc assembly 2020 and the discs of the outer disc assembly 2019, the second actuating element 2012 is pivoted through the drive toothing 2035 back into its starting position "2" in such a manner that the actuating bodies 2023 no longer exert any axial force on the clutch.

In the other direction, the clutch and synchronizing device 2001 functions similarly. If the internal shifting pin 11' because of an actuation of the second actuating element 2012 is moved from its shifting position "1" in the direction of the shifting position "4" and then of "5," the second internal gear shift drum 10' then does not move in axial direction. From the shifting position "4," pivoting of the second actuating element 2012 into the shifting position "5" commences and subsequently brings about a closing of the second friction clutch assembly 2006, similar to the movement from the shifting position "2" into the shifting position "4." The five shifting positions '1', "2," "3," "4" and "5" shown in FIG. 39, can be attained in that a second intermediate wheel 2030 as shown in FIG. 37, which is driven by an electric motor with worm drive, engages into the drive toothing 2035 and adjusts the second actuating element 2012 about the axis 57.

FIG. 41 shows the second clutch axial actuating unit 2007 with the second internal shifting sleeve axial actuating unit 8' in cross section, wherein the second internal shifting pin 11" is in the shifting position "1."

FIG. 42, FIG. 43, FIG. 44 and FIG. 45 show corresponding views of the second external shifting sleeve axial actuating unit 2008 and of the second internal shifting sleeve axial actuating unit 8' and of the second clutch axial actuating unit 2007 in the neutral shifting position "1." In this shifting position, the second internal shifting pin 8" and the second external shifting pin 2011 respectively are arranged at a transition between the first portion 13 and 2013 respectively and the second portion 15 and 2014 respectively of the second internal control slot 9' and of the second external control slot 2009 respectively of the second internal gear shift drum 10' and of the second external gear shift drums 2010. The second external gear shift drum 2010 and the second internal gear shift drum 10' in this case are located in a middle position.

FIG. 46, FIG. 47, FIG. 48 and FIG. 49 show corresponding views of the second external shifting sleeve axial actuating unit 2008 and of the second internal shifting sleeve axial actuating unit 8' and of the second clutch axial actuating unit 2007 in the shifting position "2." In this shifting position, the second external shifting pin 2011 and the second internal shifting pin 11" respectively are arranged at the transition from the obliquely running first portion 13 and 2013 and in the middle of the straight running portion 2014 of the second internal control slot 9' and the second external control slot 2009 respectively. The second internal gear shift drum 10' is shifted relative to the middle position to the left in arrow direction C, as shown by FIG. 14. The second external gear shift drum 2010 now as before is located in the middle position according to FIG. 42 because of the configuration of the second external control slot 2009.

FIG. 50, FIG. 51, FIG. 52 and FIG. 53 show corresponding views of the second external shifting sleeve axial actuating unit 2008 and of the second internal shifting sleeve axial actuating unit 8' and of the second clutch axial actuating unit 2007 in the shifting position "3." In this shifting position, the external shifting pins 2011 and 11' respectively are arranged at the end of the straight running second portion 14 and 2014 respectively in the second internal control slot 9' and the second external control slot 2009 respectively. The gear shift drum 10' is shifted to the left relative to the middle position in arrow direction C, as shown by FIG. 18. The axial bearing ring is shifted to the right. The second external gear shift drum 2010 now as before is located in the middle position according to FIGS. 42 and 46 because of the configuration of the second external control slot 2009.

FIGS. 50 and 51 in this case show a shifting position "3" of the second external shifting pin 2011 and of the second internal shifting pin 11' respectively in the second external control slot 2009 and the second internal control slot 9' respectively in closer detail. In this shifting position, the second external shifting pin 2011 and the second internal shifting pin 11' respectively have almost reached the end of the second portion 2014 and 14 respectively of the second external control slot 2009 and the second internal control slot 9' respectively. In the portion 2014 and 14' respectively, no further axial shifting of the second external gear shift drum 2010 with respect to the shifting position "2" takes place. As is visible in FIG. 53 compared with FIG. 52, the actuating bodies 2013 are lifted into the shifting position "3" with respect to the shifting position "2." At the transition from the shifting position "2" to the shifting position "3" the actuating balls 2023 start exerting a force on the second pressure plate 2021 of the second disc clutch 2016. The increase of the force in this case only commences after the shifting position "2," when the synchronizing phase of the inner toothing of the second internal shifting sleeve 5' with the axial toothing 2079 of the fourth gear 34 is completed.

In the shifting position "3," the actuating bodies 2023 are in a shifting position through the rotation of the second actuating element 2012 in arrow direction D—see FIG. 52—in which they exert a major force on the pressure plate 2021 of the second disc clutch 2016. This is also shown in FIG. 53, in which the spacing a between the axial bearing ring 2036 and the ramp structure 2058 which is fixed on the transmission housing has become larger compared with the representation in FIG. 49.

FIG. 54, FIG. 55, FIG. 56 and FIG. 57 show corresponding views of the second external shifting sleeve axial actuating unit 2008 and of the second internal shifting sleeve axial actuating unit 8' as well as of the second clutch axial actuating unit 2007 in the shifting position "4." In this shifting position "4," the second external shifting pin 2011 is located at the transition from the obliquely running first portion 2013 to the straight running portion 2015 of the second external control slot 2009. The second internal gear shift drum 10' is located in the neutral position and is not shifted. In the portion 2013 and 13 respectively, there is axial shifting with respect to the shifting position "2" of the second external gear shift drum 2010 to the right in arrow direction "D."

This axial movement of the shifting pin 2011 of the external shifting sleeve axial actuation is transmitted via the shifting fork pre-selection actuating device 1093 and a shifting fork which is not shown here to the pre-selected first external shifting sleeve 1005 on the first auxiliary shaft 62 or to the pre-selected second external shifting sleeve 1505 on the second auxiliary shaft 67.

FIG. 58, FIG. 59, FIG. 60 and FIG. 61 show corresponding views of the second external shifting sleeve axial actuating unit 2008 and of the second internal shifting sleeve axial actuating unit 8' and of the second clutch axial actuating unit 2007 in the shifting position "5," in which the second external shifting pin 2011 is located at the end of the third portion 2015. The second internal gear shift drum 10' has remained in the middle position since the second internal control slot 9' in the middle of the internal gear shift drum 10' runs in the middle and straight in the third portion 15. The second external gear shift drum 2010 is located in the same axial position as in the shifting position "4" shown in FIG. 54. Similar to FIG. 53, the actuating bodies 2023 in the shifting position "5" are located in a shifting position through the rotation of the second actuating element 2012 in arrow direction C are located in a shifting position, in which they exert a major force on the pressure plate 2021 of the second disc clutch 2016. This is also shown in FIG. 61, in which the spacing between the axial bearing ring 2036 and the ramp structure 2058 fixed on the transmission housing 1128 has become larger compared with the representation in FIG. 57.

Depending on direction of rotation, either the inner shifting sleeve is actuated via the inner shifting sleeve axial actuation or an outer shifting sleeve via the outer shifting sleeve axial actuation. The actuation of the clutch via the clutch axial actuation takes place independently of direction of rotation.

In the shifting arrangement 101 shown in the FIGS. 36 to 61 with the first friction clutch assembly 1006 and the second friction clutch assembly 2006, six torque transmission ratios with the gears a, b, c, d, e and f can be shifted via the first clutch axial actuating unit 1007 and via the second clutch axial actuating unit 2007 in interaction with the first external shifting sleeve axial actuating unit 1008, the first internal shifting sleeve axial actuating unit 8 and with the second external shifting sleeve axial actuating unit 2008 and the second internal shifting sleeve axial actuating unit 8'. This is described in the following in the FIGS. 36 and 37 in each case starting out from the neutral position. For engaging gear a, the first actuating element 1012 is initially pivoted about the axis 57. To this end, the drive toothing 1035 of the first actuating element 1012 meshes with the first intermediate wheel 1030, which is driven by the first drive 1025. Here, the first internal gear shift drum 10 is shifted with the first internal shifting sleeve 5 from the neutral shifting position "1" in the direction of the shifting toothing of the fifth gear 35 in the shifting position "2."

In the shifting position "2," the fifth gear 35 with its shifting toothing is connected to the first internal disc carrier 1018 in a positively joined manner via the first internal shifting sleeve 5 and the coupling process commences. In the process, the spherical actuating bodies 1023 roll on the ramp structure 1058 in the direction of the shifting position "3" and exert an increasing contact pressing force on the pressure plate 1021 of the first disc clutch 1016, until a frictionally joined connection in the first disc clutch 1016 is achieved and the engaging of the gear a between the fifth gear 35 and the fifth fixed wheel 45 in the shifting position "3" is completed.

The force flow for the gear a following the closing of the first disc clutch 1016 runs from the input shaft 3 via the outer disc carrier 1017, via the outer disc assembly 1019 and the inner disc assembly 1020, the first internal shifting sleeve 5, the shifting toothing of the fifth gear 35 and via the helical toothing to the fifth fixed wheel 45 and via the first auxiliary shaft 62 to the first output pinion 51.

For engaging gear b, the first actuating element 1012 is initially pivoted about the axis 57.

The axially fixed external and pivotal first external gear shift drum 1010 shifts the axially movable first external shifting pin 1011 and thus—selected through the first shifting fork pre-selection actuating device 1093—with a shifting fork which is not shown here, the first external shifting sleeve 1005 on the first auxiliary shaft 62 until synchronization is completed and the axial toothing 1050 of the first external shifting sleeve 1005 is in engagement with the shifting toothing 1978 of the first free gear 31 on the first auxiliary shaft 62. Through further pivoting of first actuating element 1012 the first disc clutch 1016 is closed, as described above.

Following the closing of the first disc clutch 1016, the force flow runs from the input shaft 3 via the first outer disc carrier 1017, via the first outer disc assembly 1019 and the first inner disc assembly 1020 to the first inner disc carrier 1018 and from there via the first hollow shaft 1029 to the first fixed gear 41. The first fixed gear 41 directs the force flow via its helical toothing meshing with the gear 31 to the first auxiliary shaft 62, which feeds the force flow to the first output pinion 51.

For engaging gear c, the first actuating element 1012 is pivoted about the axis 57.

The axially fixed, pivotal first external gear shift drum 1010 shifts the only axially movable first shifting pin 1011 on the actuating shaft 1095 and thus—selected through the first shifting fork pre-selection actuating device 1093—with a shifting fork which is not shown here, the second external shifting sleeve 1505 on the auxiliary shaft 67, until synchronization is completed and the axial toothing of the first external shifting sleeve 1505 is in engagement with the shifting toothing of the second free gear 32 on the second auxiliary shaft 67. Through further pivoting of the first actuating element 1012 the first disc clutch 1016 is closed, as described above.

Following the closing of the first disc clutch 1016, the force flow runs from the input shaft 3 via the first outer disc carrier 1017, via the first outer disc assembly 1019 and the first inner disc assembly 1020 to the first inner disc carrier 1018 and from there via the first hollow shaft 1029 to the second fixed gear 42. The fixed wheel 42 directs the force flow via its helical toothing meshing with the second free gear 32 to the second auxiliary shaft 67, which feeds the force flow to the second output pinion 52. For engaging gear d the second actuating element 2012 is pivoted about the axis 57.

In the process, the second internal gear shift drum 10' with the second internal shifting sleeve 5' is shifted from the neutral shifting position "1" shown in FIG. 4 in the direction of the shifting toothing of the sixth gear 36 into the shifting position "2." The sixth gear 36 in the shifting position "2" is connected with its shifting toothing 2079 via the second internal shifting sleeve 5' to the second internal disc carrier 2018 in a positively joined manner and the coupling process starts. In the process, the spherical actuating bodies 2023 on the ramp structure 2058 roll in the direction of the shifting position "3" and exert an increasing contact pressing force on the pressure plate 2021 of the second disc clutch 2016, until a frictionally joined connection in the second disc clutch 2016 is achieved and the engaging of gear d between the sixth gear 36 and the sixth fixed wheel 46 in the shifting position 3 is completed.

Following the closing of the second disc clutch 2016, the force flow runs from the input shaft 3 via the second outer disc carrier 2017, via the second outer disc assembly 2019 and the second inner disc assembly 2020, the second internal shifting sleeve 5', the shifting toothing 2079 of the sixth gear 36 and via the helical toothing with the sixth fixed wheel 46 and via the first auxiliary shaft 62 to the first output pinion 51.

For engaging gear e, the second actuating element 2012 is pivoted about the axis 57 in that the second drive 2025 drives the second intermediate wheel 2030, the toothing of which is in engagement with the second drive toothing 2035 of the second actuating element 2012.

The axially movable second external shifting pin 2011, because of its rotation of the axially fixed and rotatably freely movable second external gear shift drum 2010 and—selected through the first shifting fork pre-selection actuating device 1093—with a shifting fork which is not shown here, shifts the first external shifting sleeve 1005 in arrow direction C until synchronization is completed and the axial toothing 1050 of the first external shifting sleeve 1005 is in engagement with the shifting toothing of the fourth gear 34.

Through further pivoting of the second actuating element 2012, the second disc clutch 2016 is closed.

Following the closing of the second disc clutch 2016, the force flow runs from the input shaft 3 via the first outer disc carrier 2017, via the first outer disc assembly 2019 and the first inner disc assembly 2020 to the first inner disc carrier 2018 and from there via the second hollow shaft 2029 to the fourth fixed wheel 44. The fourth fixed wheel 44 directs the force flow via its helical toothing meshing with the fourth gear 34 to the first auxiliary shaft 62, which feeds the force flow to the first output pinion 51.

For engaging gear f, the second actuating element 2012 is pivoted about the axis 57 in that the second drive 2025 drives the second intermediate wheel 2030, the toothing of which is in engagement with the second drive toothing 2035 of the second actuating element 2012.

The axially movable and rotatably fixed second external shifting pin 2011, through the rotation of the axially fixed and rotatably movable second external gear shift drum 2010—selected through the first shifting fork pre-selection actuating device 1093—with a shifting fork which is not shown here, shifts the second external shifting sleeve 1505 on the second auxiliary shaft 67 in arrow direction C until synchronization is completed and the axial toothing of the second external shifting sleeve 1505 on the second auxiliary shaft 67 is in engagement with the shifting toothing of the third gear 33.

Through further pivoting of the first actuating element 1012, the second disc clutch 2016 is closed.

Following the closing of the second disc clutch 2016, the force flow runs from the input shaft 3 via the second outer disc carrier 2017, via the second outer disc assembly 2019 and the second inner disc assembly 2020 to the second inner disc carrier 2018 and from there via the second hollow shaft 2029 to the third fixed wheel 43. The third fixed wheel 43 directs the force flow via its helical toothing meshing with the third gear 33 to the second auxiliary shaft 67, which feeds the force flow to the second output pinion 52.

Figure 62:
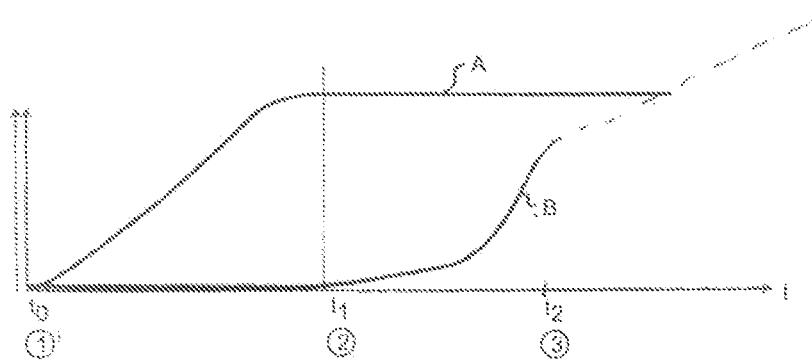
FIG. 62 shows a diagram with the course of the axial movement of an external or internal shifting sleeve compared with the course of an axial force acting on an actuating element when engaging a gear.

FIG. 62 shows a diagram with the course of the axial movement of the second internal shifting sleeve 5', as shown via the FIGS. 8, 12 and 16, in comparison with the course of an axial force acting on an actuating body 2023 of the second actuating element 2012 when shifting a gear. The graph A represents the sequence of the axial movement of the second internal shifting sleeve 5', while the graph B shows the axial force on the actuating bodies 2023. The respective force and the respective path are plotted in the direction of the ordinate and the time t in the direction of the abscissa.

At the time t=t0, the second internal shifting pin 11' is located in the neutral shifting position "1." From the time t0, the axial shifting of the second internal shifting sleeve 5' increases because of the movement of the second gear shift drum 10', as shown by the graph A. The axial force, which acts on the actuating ball 2023 by means of the actuating contour 2022 remains zero in this time interval from t0 to t1, i.e. no force acts on the actuating body 2023.

On reaching the time t1 in the shifting position "2," the axial shifting of the second internal shifting sleeve 5' ends, as shown by the graph A. The axial force on the actuating bodies 2023 by contrast increases because a ramp region of the actuating contour 2022 is reached with the shifting position "2" at the time t1. The axial force of the actuating bodies 2023 on the pressure plate 2021 increases until in the shifting position "3" at the time t2 a target value is reached.

Figure 63:
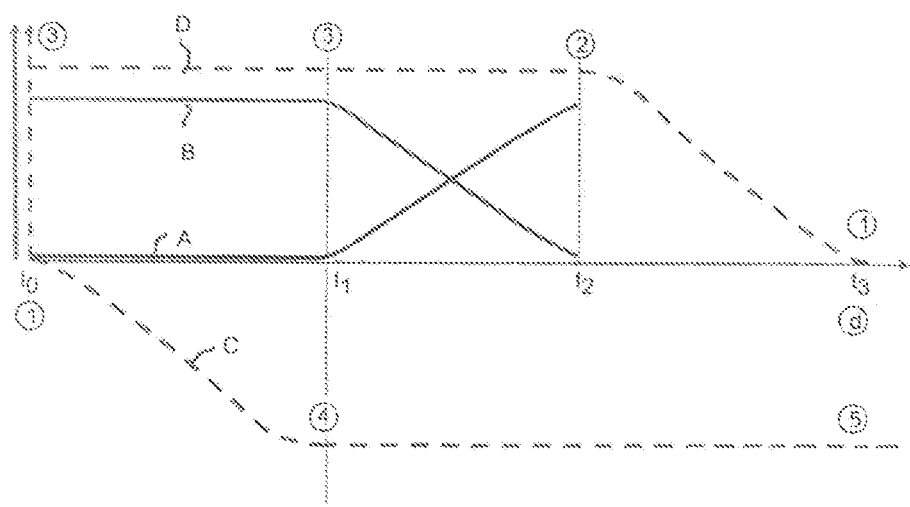
FIG. 63 shows a diagram of the torque transmission during the changing from a first friction clutch assembly to a second friction clutch assembly and the course of the disengaging and engaging of gears assigned to the first and second friction clutch assemblies.

FIG. 63 shows a diagram of the torque transmission during the load change from the first friction clutch assembly 1006 to the second friction clutch assembly 2006 and the course of the disengaging and engaging of gears "a" and "d," which are assigned to the first and the second friction clutch assembly 1006 and 2006 respectively. The torque transmission of the first friction clutch assembly 2006 is shown with the graph A with continuous line as a function of the time t and the torque transmission of the second friction clutch assembly 2006 is shown with the graph B with continuous line as a function of the time t. The movement of the first internal shifting sleeve 5 is shown with the graph C with interrupted line as a function of the time t and the movement of the second internal shifting sleeve 5 is shown with the graph D with interrupted line as a function of the time t.

At the time t0, the first friction clutch assembly 1006 is disengaged, i.e. not in frictionally joined connection, and it transmits no torque, as shown by the graph A, since no force to speak of is exerted on the first pressure plate 1021 by the actuating bodies 1023. The first internal gear shift drum 10 with the first internal shifting sleeve 5 at this time t0 is located in the neutral shifting position "1." The process of engaging a gear a commences, as shown by the graph C, and is completed at the time t1, when the first internal shifting sleeve 5 has reached the shifting position "4."

At the time t0, the second friction clutch assembly 2006 is closed and it transmits the full torque, as shown by graph D. The second internal shifting sleeve 5' is located in the shifting position "3" throughout the entire time interval from t0 to t1 so that the full torque is transmitted via the sixth fixed wheel 46.

At the time t1, a reduction of the torque transmission of the second friction clutch assembly 2006 commences while the torque transmission of the first friction clutch assembly 1006 already increases, as the graphs A and B show in the time interval between t1 and t2. At the same time, the second internal gear shift drum 10' with the second internal shifting sleeve 5' moves from the shifting position "3" into the shifting position "2," however without disengaging the gear d. Only when the shifting position "2" at the time t2 is left does disengaging of the gear d into the shifting position 'T' commence. This makes possible stepless shifting and coupling between the gears d and a.

The described shifting arrangement basically functions also with only a single auxiliary shaft although a transmission with two auxiliary shafts is shown here.

The actuating bodies 2023 in the FIGS. 1 to 26 are to be guided radially free of play in the actuating element 2012 in order to ensure good functioning. The spherical actuating bodies 2023 furthermore roll in a circumferential contour in the axial bearing ring 2036, which is formed as a circumferential groove.

For the rotatory coupling of the hollow shafts to the respective inner disc carrier, axial toothing is to be preferred.

Figure 64:
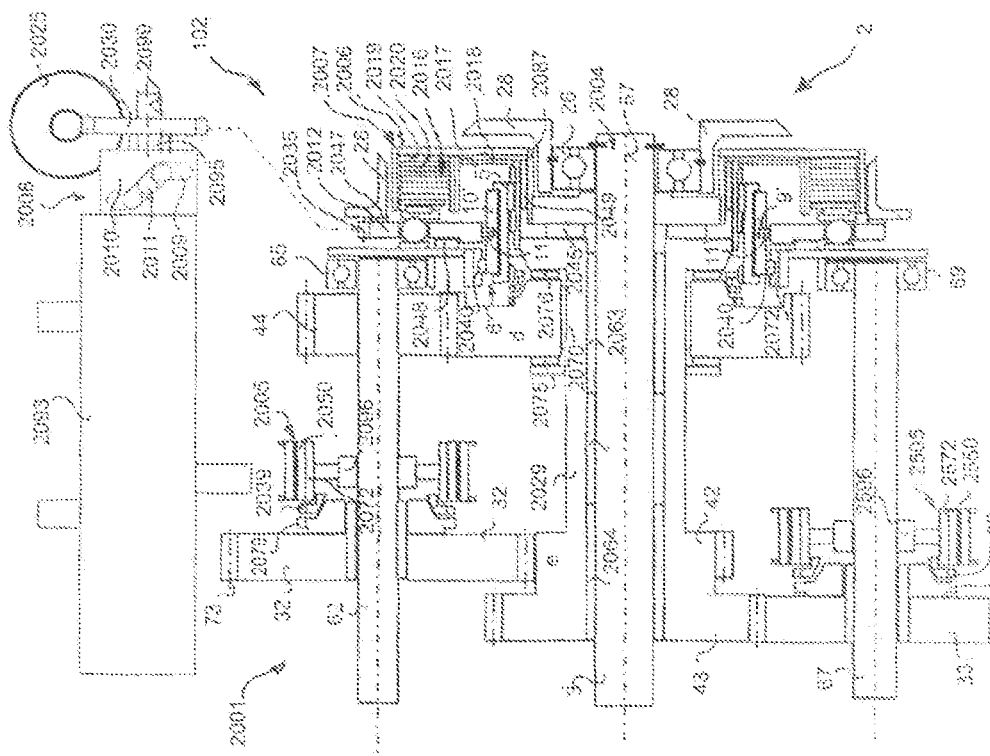
FIG. 64 shows a shifting arrangement according to a further embodiment of the present disclosure.

With the exemplary embodiment described above it must be emphasized that the internal gear shift drum is arranged axially fixed with respect to the shifting sleeve but rotatable with respect to the same. FIG. 64 shows of a shifting arrangement 102 of a transmission 2 according to a second embodiment of the present disclosure, a second clutch and synchronizing device 2001. The shifting arrangement 102 differs from the second clutch and synchronizing device 2001 of the first embodiment of the present disclosure, as it is shown in the FIGS. 36 to 61. A difference consists in that instead of the two external shifting sleeves 1005 and 1505 acting on both sides, a first external shifting sleeve 2005 acting on one side and a second external shifting sleeve 2505 acting on one side are arranged on the first auxiliary shaft 62 and the second auxiliary shaft 67.

The first external shifting sleeve 2005 acting on one side and the second external shifting sleeve 2505 acting on one side are actuated via associated external gear shift drums in interaction with shifting fork pre-selection actuating devices, of which in FIG. 29 a second shifting force pre-selection actuating device 2093 is shown.

The further shown components have same functions as in the preceding FIGS. 36 to 61 and are accordingly marked with the same reference characters. The direction of the axial shifting of the shifting sleeve is dependent on the wheel arrangement, in principle this can take place in both directions.

Figure 65:
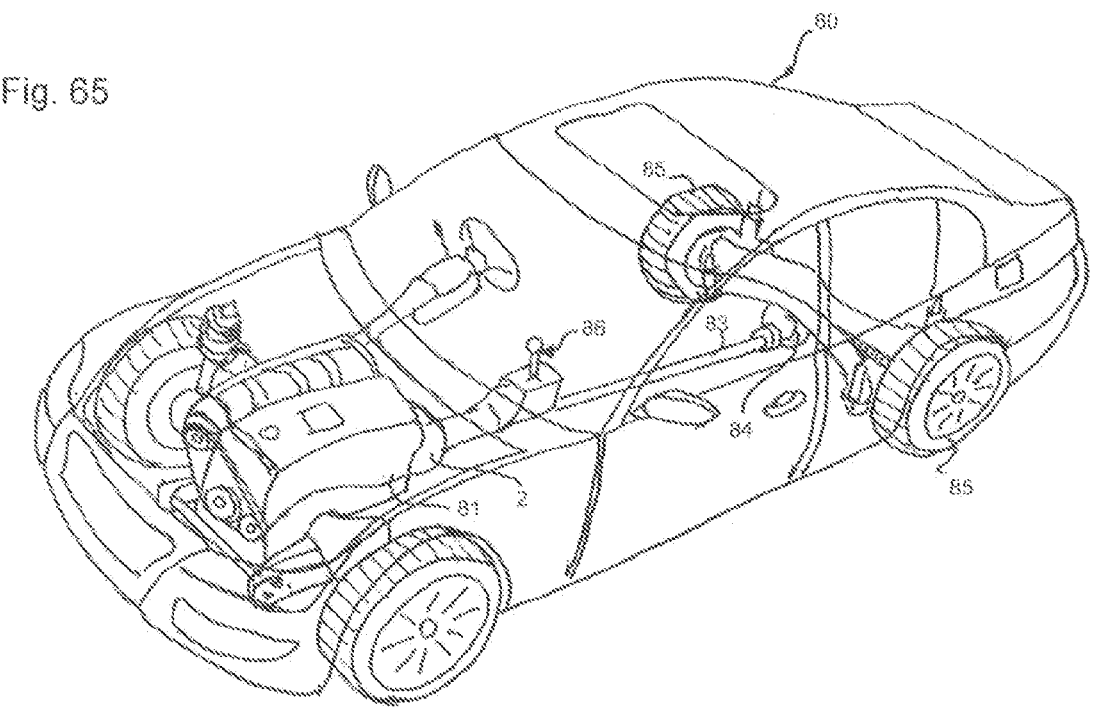
FIG. 65 shows a motor vehicle with an engine and a drive train, which interacts with a differential gear.

FIG. 65 shows a motor vehicle 80 with an engine block 81 and a drive train 82. A manual transmission 2 with a transmission housing which is not shown here and a clutch and synchronization device 1 according to the preceding Figs. is coupled to a rear region of the engine block 81. The drive train 82 includes a driveshaft 83 and a differential gear 84 for driving the rear running wheels 85. An engine torque is translated into a drive torque by means of the manual transmission 2 with mechanically coupled clutch and synchronization device and via the driveshaft 83 and the differential gear 84 fed to the rear running wheels 85.

Alternatively to this, the front running wheels of a vehicle—not shown here—can be driven by means of a suitably equipped transmission which is equipped with at least one shifting arrangement of the type described before. It is basically immaterial if the transmission shafts are arranged alongside or transversely to the travelling direction of the vehicle.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A shifting arrangement for a shiftable transmission comprising:

a shifting sleeve moveable between a first position wherein a first free gear is rotatable relative to a shaft and a second position wherein the shifting sleeve connects the first free gear to the shaft in a rotationally fixed manner;

a clutch assembly moveable between a first position wherein a pair of clutch elements are rotatable relative to one another, and a second position wherein the pair of clutch elements are connected in a rotationally coupled; and an actuating element moveable between a neutral position and a first shifting position through an intermediate position wherein in the neutral position the shifting sleeve and the clutch assembly are in their respective first positions, wherein in the intermediate position, the shifting sleeve is in the second position and the clutch assembly is in the first position, and wherein in the first shifting position the shifting sleeve and the clutch assembly are in their respective second positions.

2. The shifting arrangement according to claim 1, wherein the shaft is an input shaft and the clutch assembly comprises a first clutch element connected to the input shaft in a rotationally fixed manner and a second clutch element connected to the shifting sleeve in a rotationally fixed manner.

3. The shilling arrangement according to claim 1, wherein the shaft is an auxiliary shaft, and the shifting arrangement further comprises a gear on a second shaft and in meshing engagement with the first free gear and releasably connectable though the clutch assembly to an input shaft in a frictionally joined manner.

4. The shifting arrangement according to claim 3, wherein the second shaft comprises a hollow shaft that is concentric with respect to the input shaft.

5. The shifting arrangement according to claim 1 further comprising a shifting sleeve axial actuating unit having a gear shift drum and a shifting pin guided in a control slot of the gear shift drum, wherein at least a portion of the control slot helically extends about the gear shift drum.

6. The shifting arrangement according to claim 5, wherein the shifting pin is connected to the actuating element in a fixed manner.

7. The shifting arrangement according to claim 5, wherein the shifting sleeve axial actuating unit and the actuating element are in engagement with one another via a toothing.

8. The shifting arrangement according to claim 5, wherein the gear shift drum is axially fixed relative to the shifting sleeve, and is rotatable in circumferential direction relative to the shifting sleeve.

9. The shifting arrangement according to claim 5, wherein the gear shift drum is rotationally fixed on a housing side and simultaneously axially moveable.

10. The shifting arrangement according to claim 1, wherein the actuating element is moveable into a second shifting position from the neutral position, and the shifting sleeve is axially moveable between the first position and a third position, wherein a second free gear is connected to the shifting sleeve in a positively joined manner in the third position.

11. The shifting arrangement according to claim 1, wherein the actuating element is moveable into a second shifting position from the neutral position, and a second shifting sleeve is coupled to the actuating element in order to assume a first position, in which a second free gear is rotatable relative to a shaft when the actuating element is in the neutral position, and assume a second position, in which the shifting sleeve connects the second free gear to the shaft in a rotationally fixed manner when the actuating element is in the second shifting position.

12. The shifting arrangement according to claim 11, wherein the shaft which carries the second free gear also carries a gear which meshes with the first free gear.

13. The shifting arrangement according to claim 1, wherein the clutch assembly comprises a disc clutch having a plurality of first discs received in a first disc carrier and a plurality of second discs received in a second disc carrier connected with the shifting sleeve.

14. The shifting arrangement according to claim 1, wherein the actuating element has a rotary degree of freedom and an actuating body is rotatable with the actuating body and in contact with an actuating contour which is axially moveable coupled to the rotation in order to drive the movement of the clutch assembly between the first and the second position.

15. The shifting arrangement according to claim 14, wherein the shifting arrangement comprises at least two actuating bodies.

16. The shifting arrangement according to claim 14, wherein the actuating contour comprises a ramp, along which the actuating body is moveable.

17. The shifting arrangement according to claim 14, wherein the actuating element is moveable into a second shifting position from the neutral position, and wherein the actuating contour is formed in order to drive a movement of the clutch assembly from the first position into the second position when the actuating element is moved out of the neutral position into the second shifting position.

18. The shifting arrangement according to claim 1 further comprising a control element for driving the movement of the actuating element in one degree of freedom.

19. A transmission comprising:
a shaft;
a first shifting arrangement including:
a first shifting sleeve moveable between a first position wherein a first free gear is rotatable relative to the shaft and a second position wherein the first shifting sleeve connects the first free gear to the shaft in a rotationally fixed manner;
a first clutch assembly moveable between a first position wherein a first pair of clutch elements are rotatable relative to one another, and a second position wherein the first pair of clutch elements are rotationally coupled; and
a first actuating element moveable between a neutral position and a first shifting position through an intermediate position wherein in the neutral position the first shifting sleeve and the first clutch assembly are in their respective first positions, wherein in the intermediate position, the first shifting sleeve is in the second position and the first clutch assembly is in the first position, and wherein in the first shifting position the first shifting sleeve and the first clutch assembly are in their respective second positions;
a second shifting arrangement having:
a second shifting sleeve moveable between a first position wherein a second free gear is rotatable relative to the shaft and a second position wherein the second shifting sleeve connects the second free gear to the shaft in a rotationally fixed manner;
a second clutch assembly moveable between a first position wherein a second pair of clutch elements are rotatable relative to one another, and a second position wherein the second pair of clutch elements are rotationally coupled; and
a second actuating element moveable between a neutral position and a second shifting position through an intermediate position wherein in the neutral position the second shifting sleeve and the second clutch assembly are in their respective first positions, wherein in the intermediate position, the second shifting sleeve is in the second position and the second clutch assembly is in the first position, and wherein in the second shifting position the second shifting sleeve and the second clutch assembly are in their respective second positions; and
an auxiliary shaft carrying a first fixed gear which is in engagement with the first free gear of the first shifting arrangement, and a second fixed gear, which is in engagement with the second free gear of the second shifting arrangement.

20. The transmission of claim 19 further comprising an input shaft carrying two hollow shafts which are concentric to the shaft, the first free gear and the second free gear each meshing with a gear of one of the hollow shafts.

* * * * *